US006757589B1

(12) United States Patent
Parker et al.

(10) Patent No.: US 6,757,589 B1
(45) Date of Patent: Jun. 29, 2004

(54) SERVICE PANEL WITH UTILITY CONTROLLER

(76) Inventors: Phil A. Parker, Rt.2, Box 2264, Naples, TX (US) 75568; Tom S. Dunn, 6109 Sandydale, Dallas, TX (US) 75248

(*) Notice: Subject to any disclaimer, the term of this patent is extended or adjusted under 35 U.S.C. 154(b) by 0 days.

(21) Appl. No.: 10/310,491

(22) Filed: Dec. 5, 2002

Related U.S. Application Data

(63) Continuation-in-part of application No. 09/662,522, filed on Sep. 14, 2000.
(60) Provisional application No. 60/155,179, filed on Sep. 21, 1999.

(51) Int. Cl.[7] .................. G05D 11/00
(52) U.S. Cl. .................. 700/282; 137/624.11
(58) Field of Search .................. 137/624.11, 39, 137/624.12; 340/870, 870.01; 439/191–192; 700/282

(56) References Cited

U.S. PATENT DOCUMENTS

| | | | | |
|---|---|---|---|---|
| 1,115,092 A | | 10/1914 | Neahr | |
| 1,145,764 A | | 7/1915 | Fuller | |
| 2,856,474 A | | 10/1958 | Norris | |
| 3,372,251 A | | 3/1968 | Bowman et al. | |
| 3,417,212 A | | 12/1968 | Driscoll | |
| 3,543,096 A | | 11/1970 | Bedford | |
| 4,262,687 A | | 4/1981 | Kobayashi | |
| 4,263,928 A | | 4/1981 | Kobayashi et al. | |
| 4,519,657 A | * | 5/1985 | Jensen | 439/191 |
| 4,841,287 A | * | 6/1989 | Flig et al. | 340/690 |
| 5,267,587 A | | 12/1993 | Brown | |
| 5,274,527 A | | 12/1993 | Retzlaff | |
| 5,331,619 A | | 7/1994 | Barnum et al. | |
| 5,440,477 A | * | 8/1995 | Rohrberg et al. | 700/83 |
| 5,861,683 A | * | 1/1999 | Engel et al. | 307/38 |

* cited by examiner

*Primary Examiner*—Leo Picard
*Assistant Examiner*—Alexander Kosowski
(74) *Attorney, Agent, or Firm*—Slater & Matsil, L.L

(57) ABSTRACT

A utility controller and a service panel combination for limiting access to authorized persons. A sub-region of the service panel contains at least one electrically-operated (e.g., solenoid-operated) valve that is connected to service utilities (e.g., water or gas) piping so as to control flow therethrough. Another sub-region (i.e., a utility controller region) contains electrical controls for controlling the valve(s) and communicating with other services such as a remote transmitter, or an auxiliary monitoring system (e.g., a fire alarm system). The controller facilitates provision of numerous features including: emergency shutdown by anyone while permitting reset only by authorized personnel; modular construction so as to facilitate installation of the system. Various jumper terminals and connecting wires provide for programming of the system to accommodate a variety of applications.

27 Claims, 53 Drawing Sheets

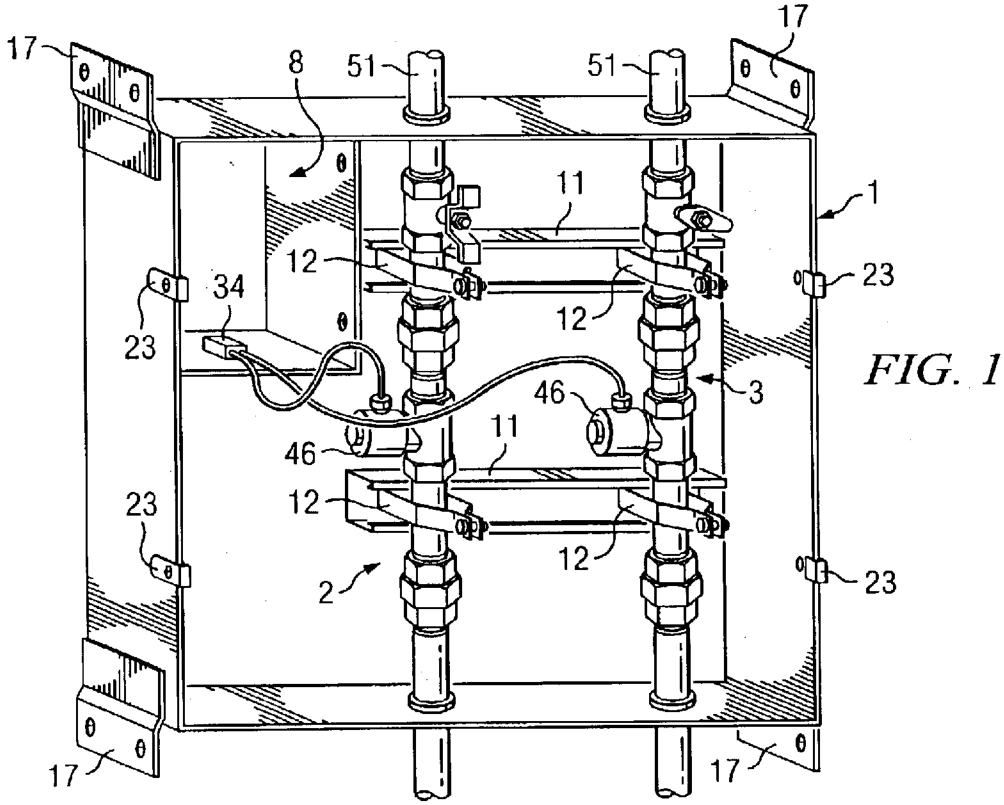
FIG. 1
FIG. 1A
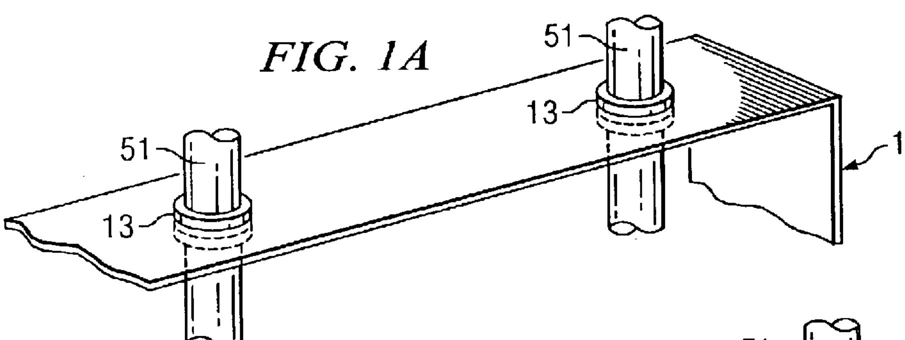
FIG. 1B
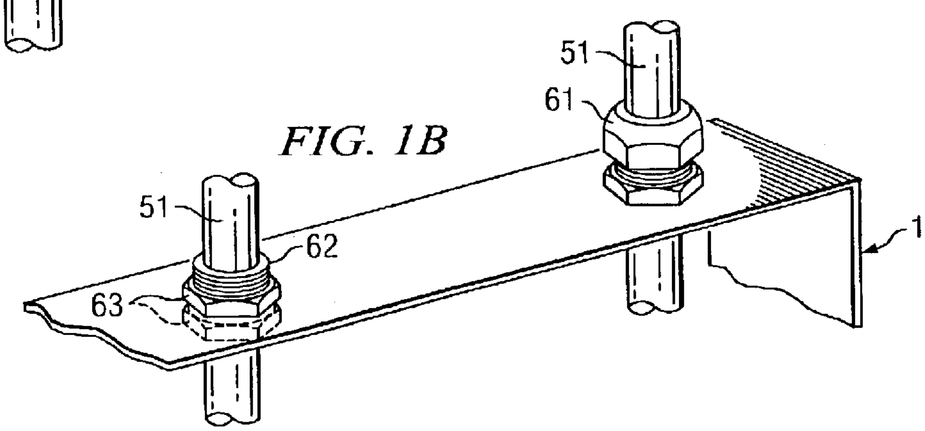

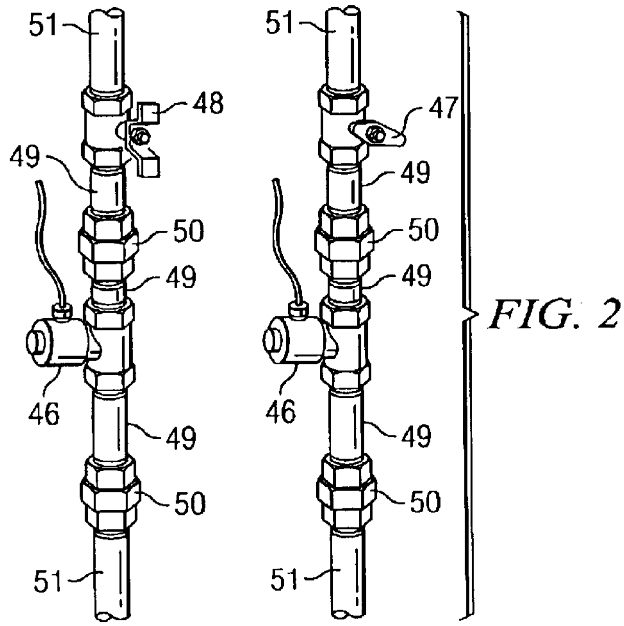
FIG. 2
FIG. 3
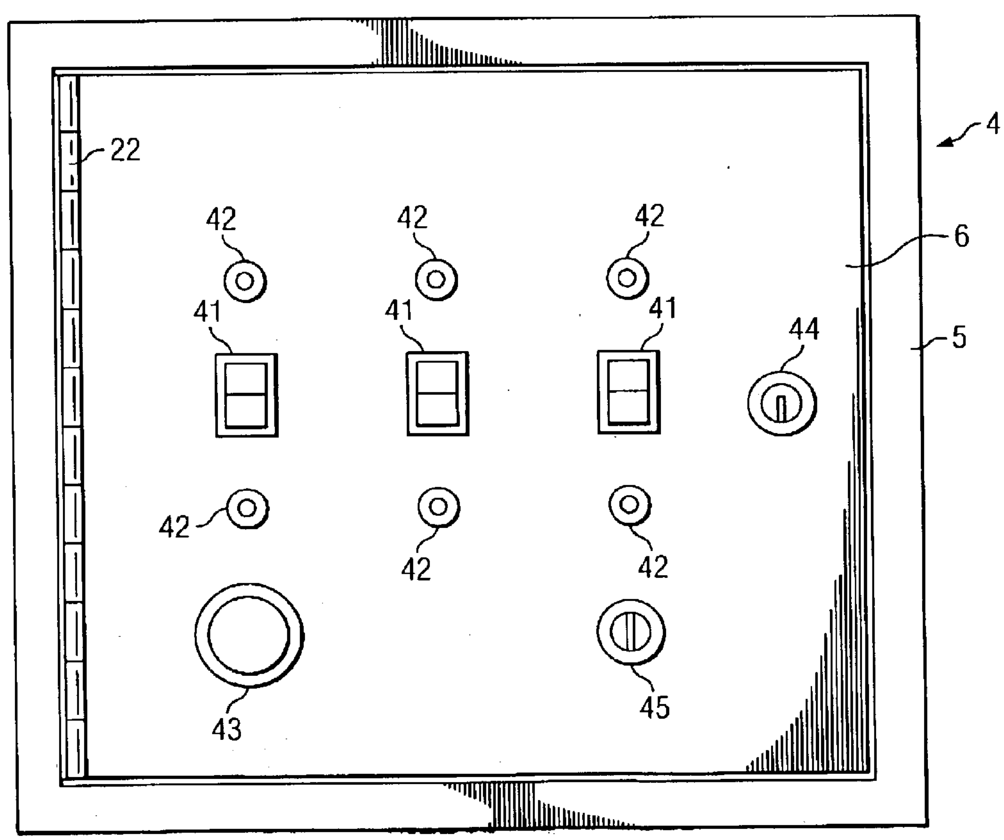

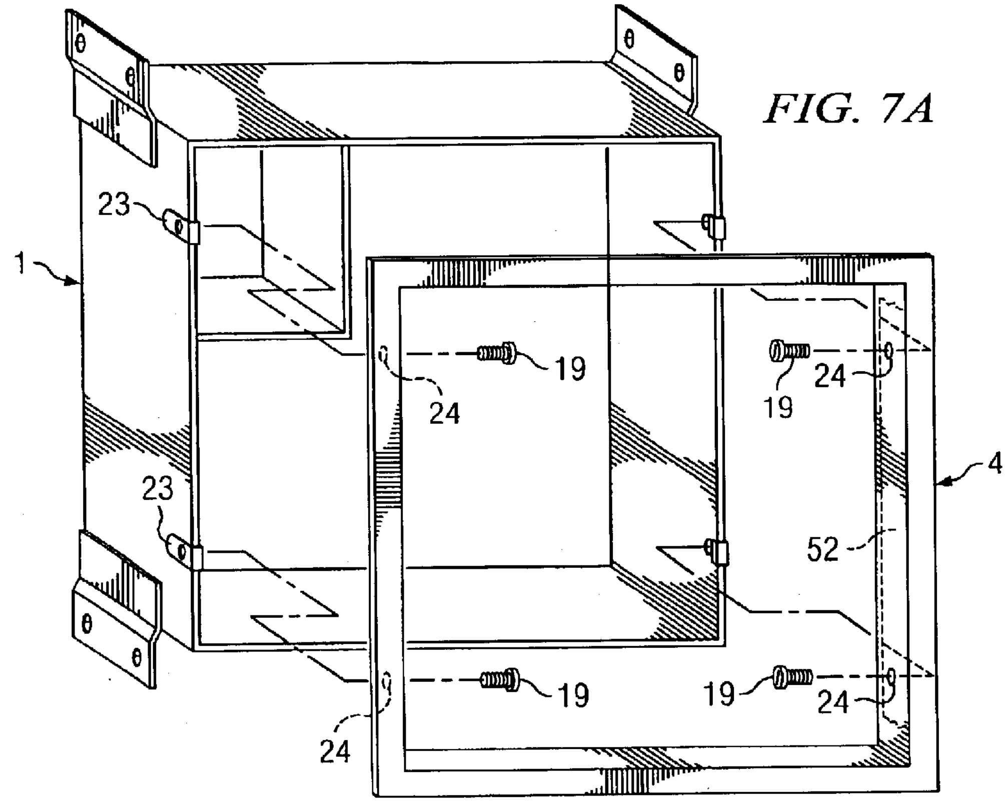
FIG. 7A
FIG. 8
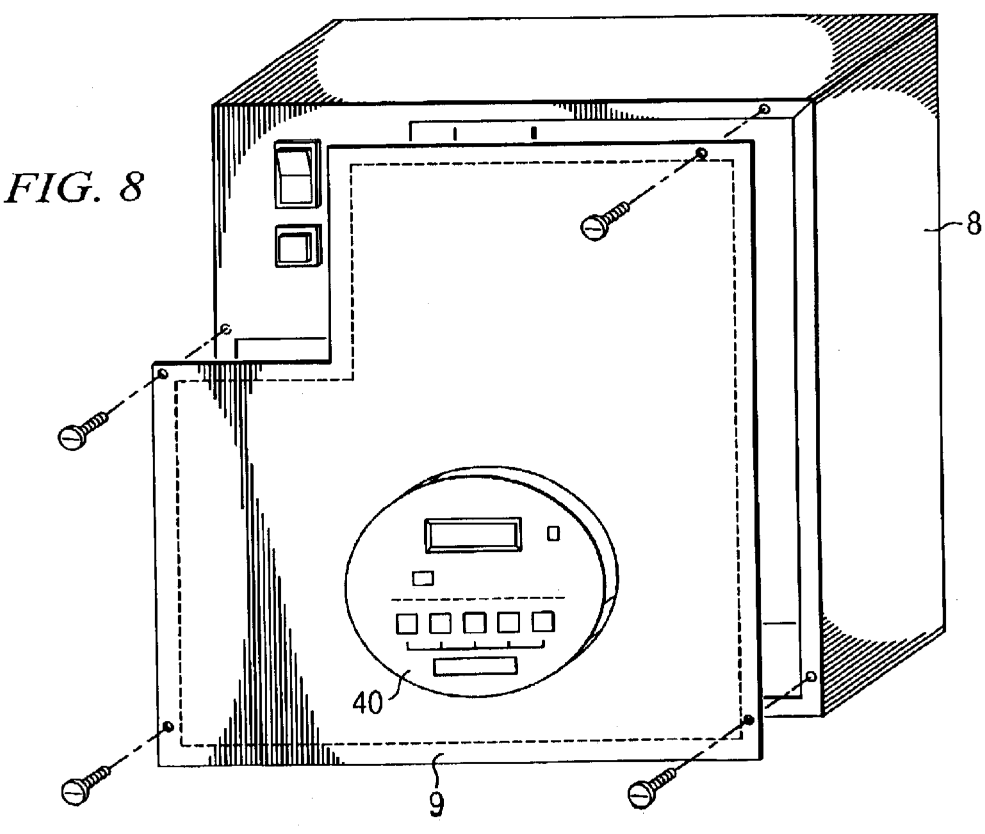

FIG. 9
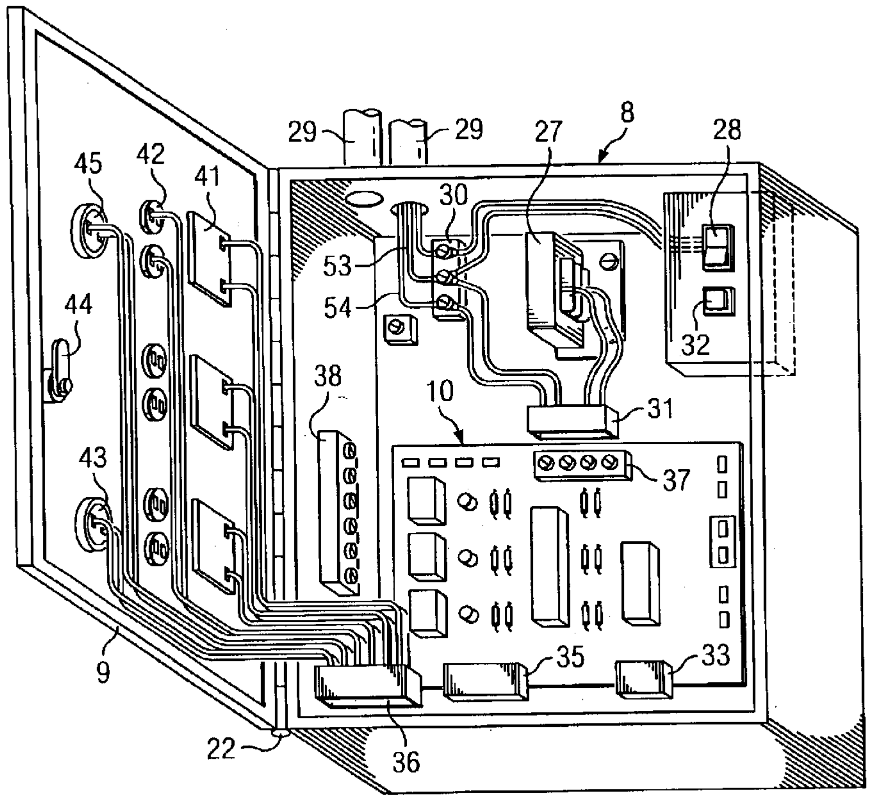
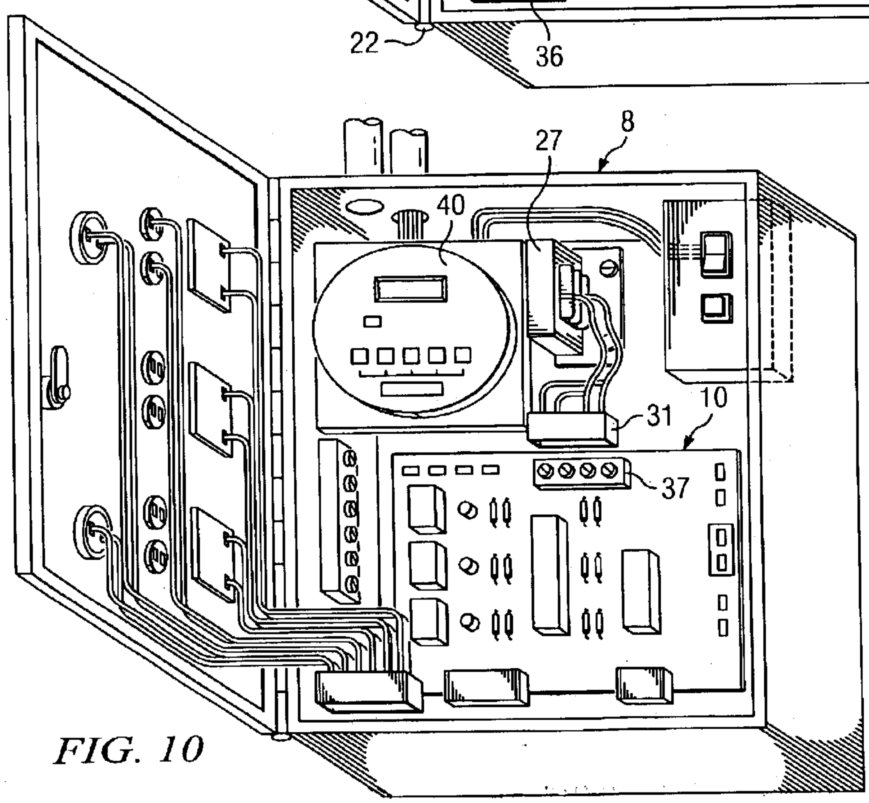
FIG. 10

32
30
110 VAC
GND
110
VAC
28
110 VAC
27
26
24 VAC
26
31
FIRE ALARM
EMS
58
39
37
10
57
56
35
34
33
(110 VAC)
SOLENOID 1
SOLENOID 2
REMOTE RELAY
38
43
45
42
42
36
41
SW3
SW2
SW1

FIG. 11
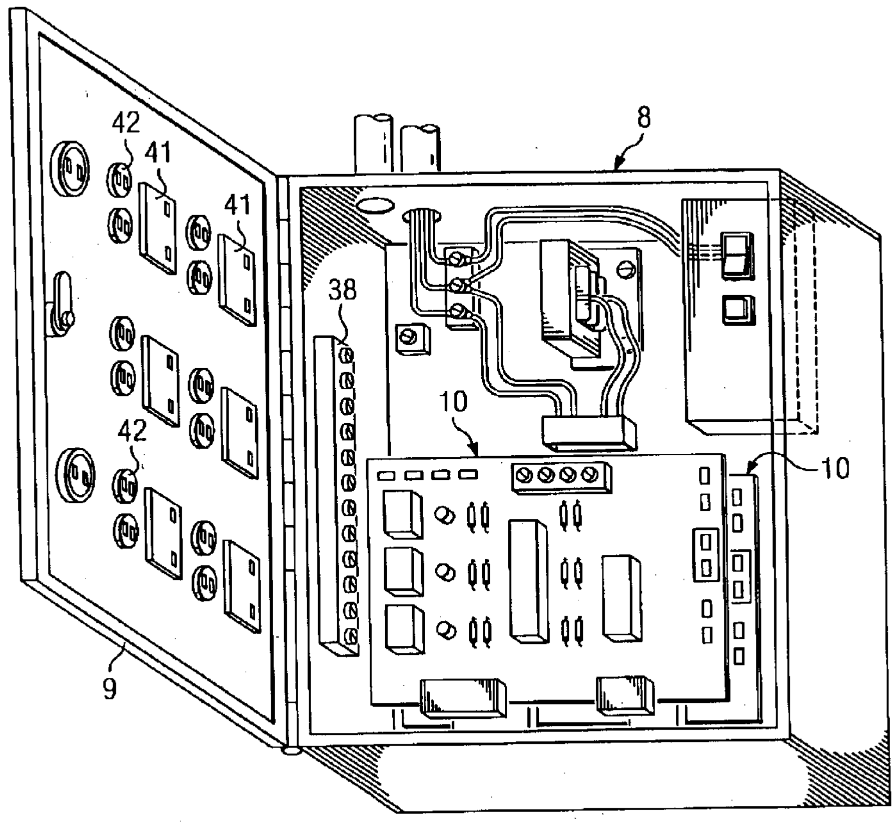
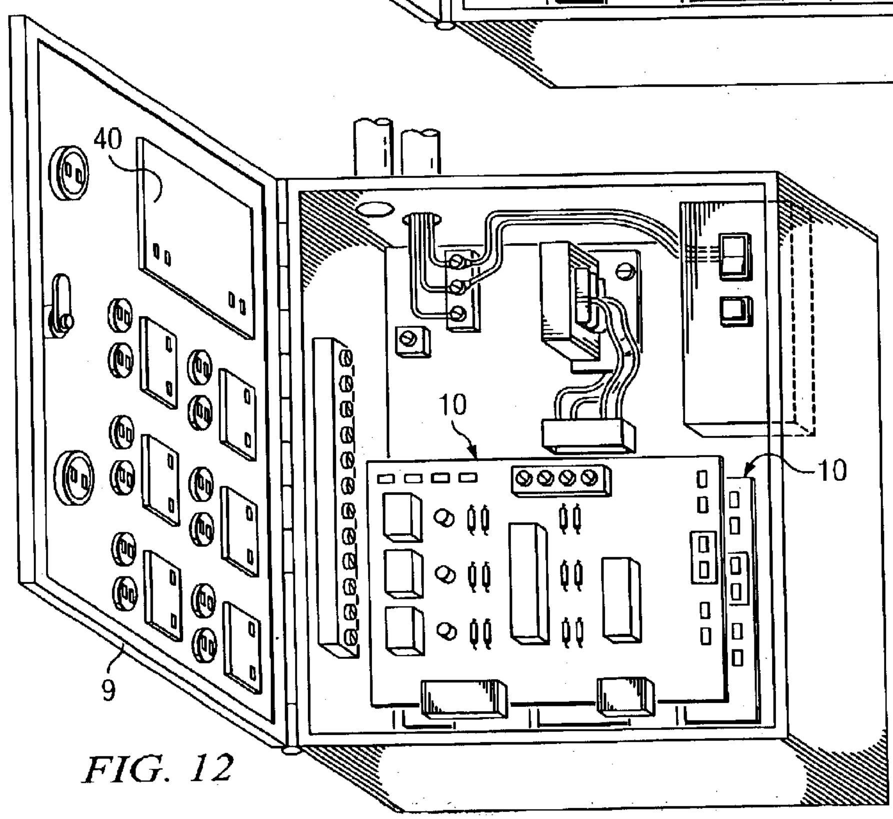
FIG. 12

FIG. 15
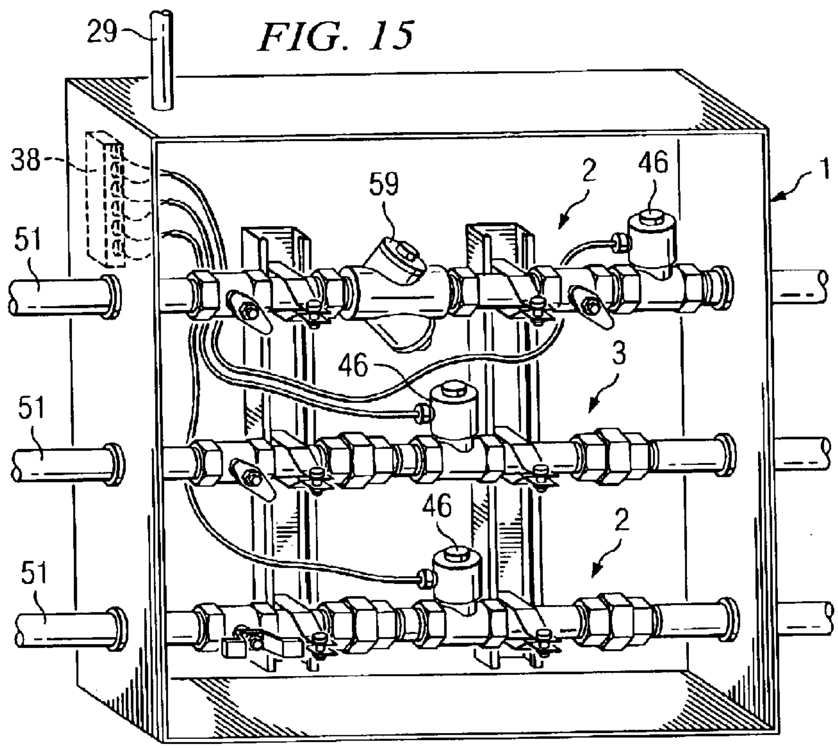
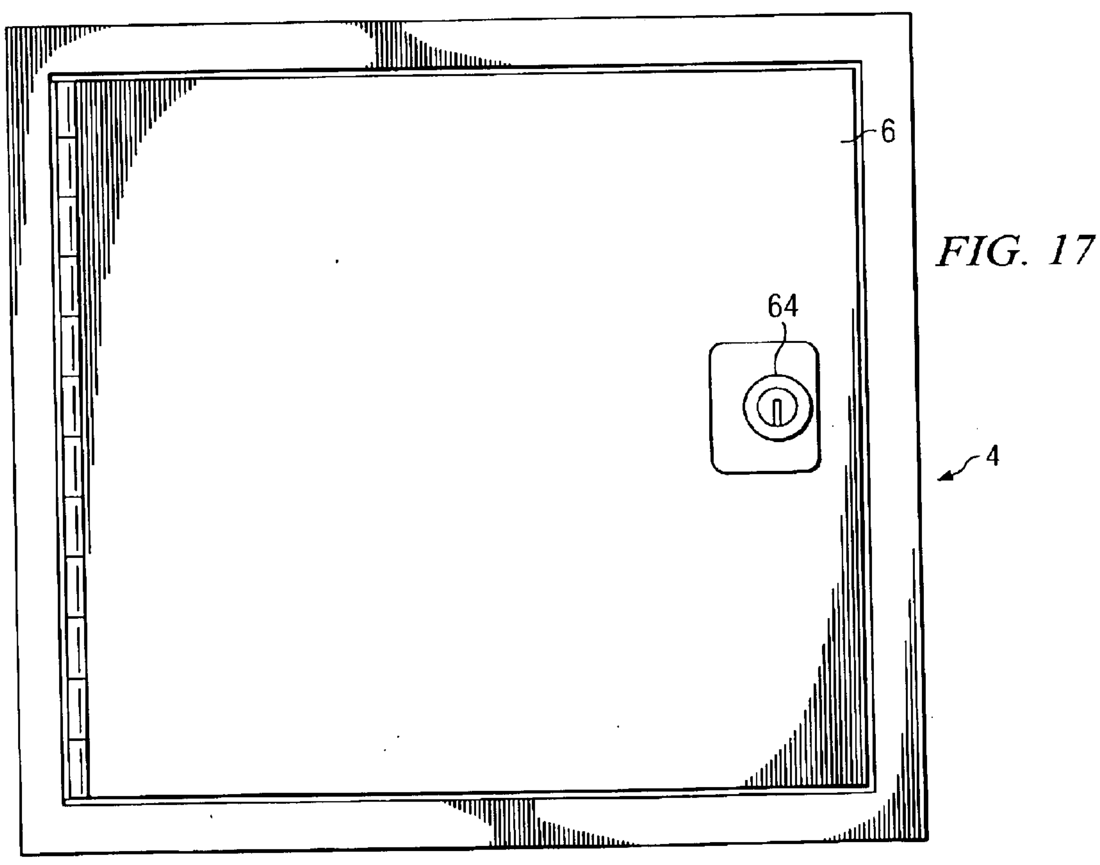
FIG. 17

FIG. 20
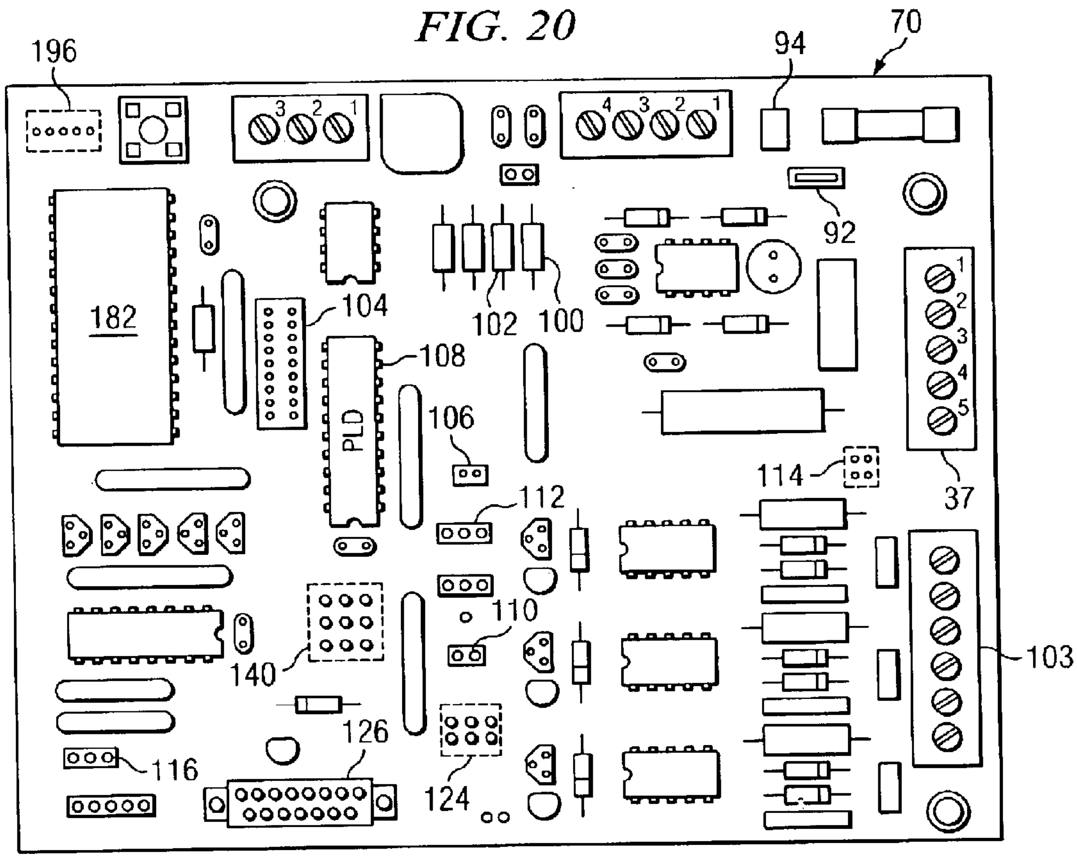
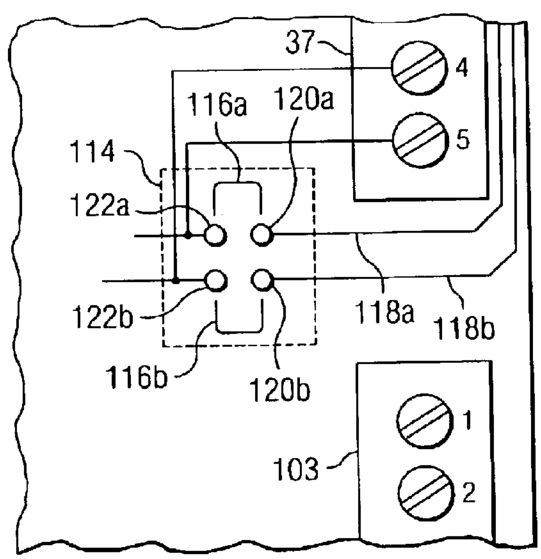
FIG. 20A

*FIG. 20B*
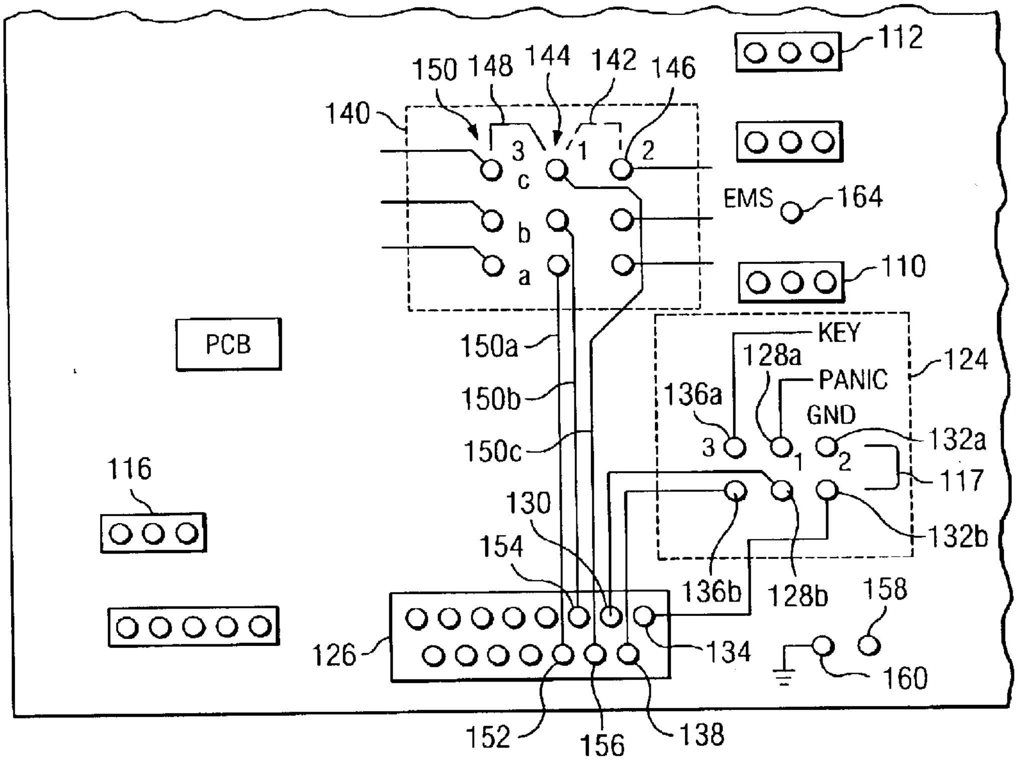
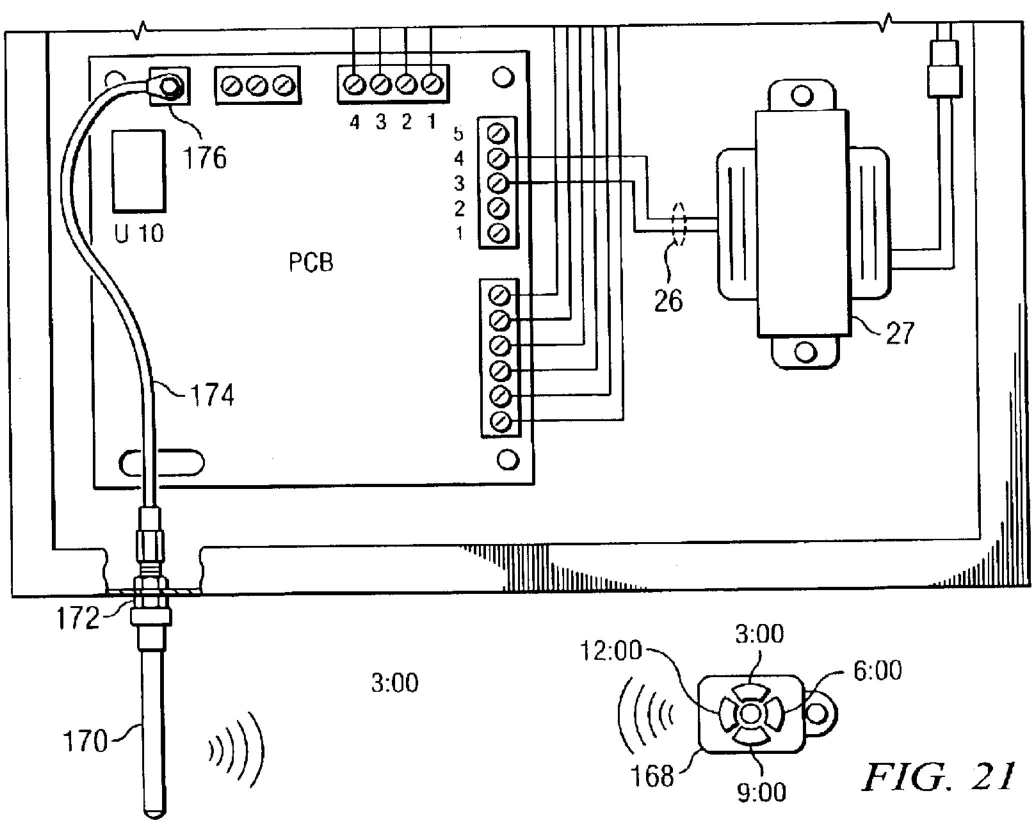
*FIG. 21*

FIG. 28A
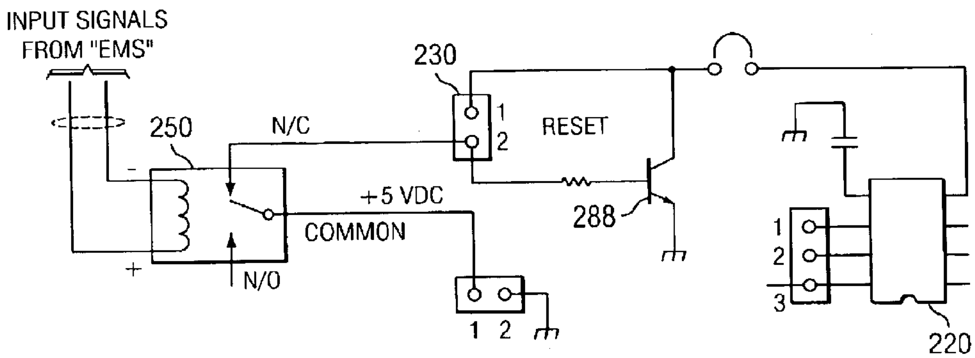
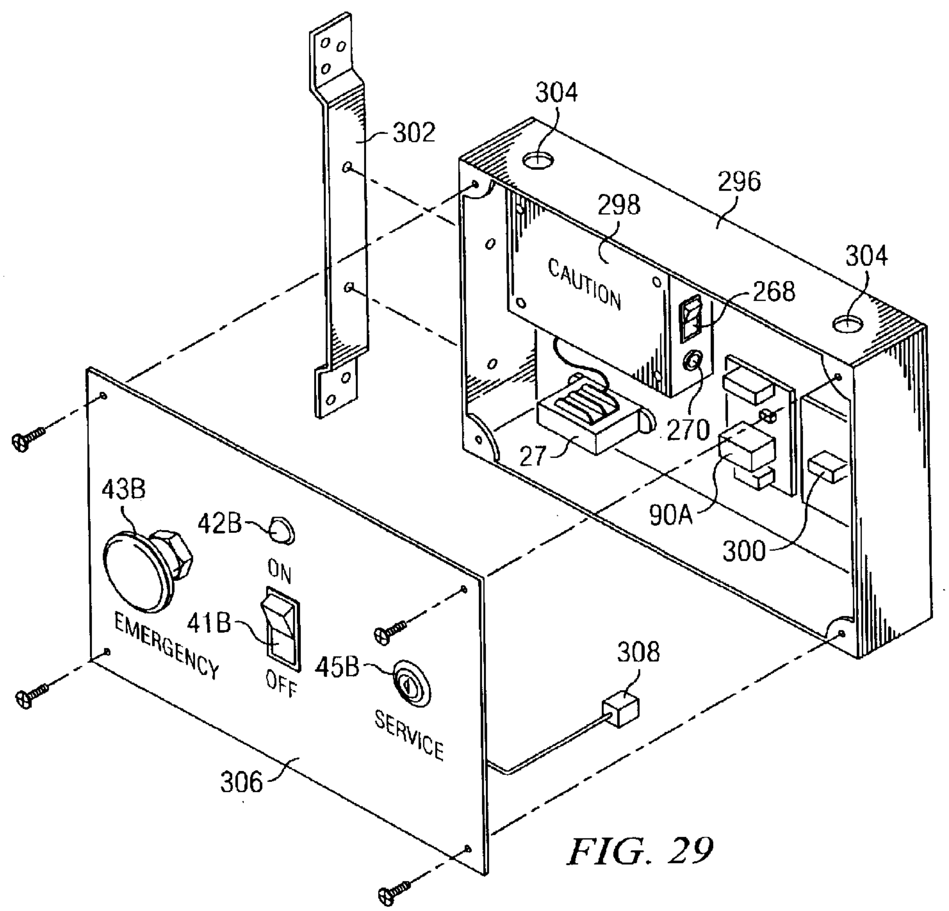
FIG. 29

SERVICE PANEL WITH UTILITY CONTROLLER

CROSS-REFERENCE TO RELATED APPLICATIONS

This application is a continuation-in-part of and claims the benefit of prior filed co-pending U.S. application Ser. No. 09/662,522, filed on Sep. 14, 2000, and U.S. Provisional Application No. 60/155,179 filed on Sep. 21, 1999, which applications are incorporated herein by reference.

BACKGROUND OF THE INVENTION

This invention relates to controlling utility services within buildings and more particularly to the logical control of such utility services.

Logical control of utility services within buildings has heretofore been proposed, illustrative of which are the proposals of U.S. Pat. Nos. 5,267,587 granted to Geoffrey P. Brown on Dec. 7, 1993 and 5,331,619 granted to Thomas G. Barnum, et al. on Jul. 19, 1994.

In the fields of plumbing and electrical, it is typically required that various services within building structures be provided with a means of control so that individual areas receiving these services can be isolated from other areas of the building for the purposes of repair.

A common method for this isolation of electrical services is a wall switch or an electrical breaker located within a service panel that is located at some remote location within the building. These switches and breakers typically control lights, electrical outlets and various pieces of equipment.

The common method for the isolation of plumbing services is a cut-off valve that is typically located above ceiling panels or concealed within a wall and accessed through a service panel. If the service is natural gas, then the cut-off valve can be located upon the roof. Cut-off valves control water to plumbing fixtures and equipment or gas to appliances.

In the field of construction of a building containing science laboratory rooms such as a school facility, it often is practical to control these services with another technique. This technique typically utilizes electrically activated contacts, relays, and solenoid valves. These electrical control apparatuses are typically controlled or activated by the turning ON or OFF of an electrical switch thereby energizing or de-energizing the apparatus. These switches can be located on a wall or concealed within a cabinet such as within an instructor's desk.

This alternative method of controlling these services regulates accessibility to the services, such that a classroom instructor can determine those times when the students in the classroom need the various services. When a service is needed, the switch can be turned to the ON position and access to the service is granted. On the other hand, when a service is not needed, the switch remains in the OFF position and access is denied. This alternative control method helps to prevent accidental or unauthorized use of the service. However, there are several disadvantages to the use of this type of control means. For instance, for maintenance purposes, if the cut-off valve and solenoid valve to the plumbing service is positioned in a concealed ceiling space, then it becomes necessary to first determine the location of the valve and then find a ladder or other device to gain access to the valve. If an emergency arises, it may be virtually impossible to close the valve within a short period of time. Also, if these valves are located upon the roof, there is the need to first gain access to the roof before any maintenance can be performed.

Because the service and solenoid valves are remotely located away from the controlling switch, it is necessary to install wiring from the controlling switch to the control valve. Therefore, detailed coordination between the electrical wiring and the plumbing is needed. The exact locations of the valves and the voltage necessary to activate the solenoid valves must be coordinated.

In addition, as is often the case in the installation of natural gas services, it is necessary that the concealed gas piping and valve apparatus be within a secondary containment enclosure. In such a case, when the gas service is controlled by an electrical solenoid, it is essential that not only the pipe and valve be sealed within the enclosure but also that the electrical conduit and wiring connections be likewise sealed. To properly accomplish this requirement, it is necessary that the other conduit connector be airtight, but also, the wiring within the conduit must be sealed airtight.

In the case of remote control of the electrical service to the classroom, typically a remote set of contacts or a relay is utilized to control the electrical outlets. This relay may be located within an access panel or box and located within the ceiling space. An electrical switch located within the room activates the relay.

Since it is the intent of this technique of controlling the various services to the classroom to restrict access to the services, then it becomes necessary to provide a method to deny or regulate access to the controlling switch. In other words, if the instructor does not choose to permit the use of a service such as the cold water outlets in the room, then the electrical control switch should be left in the OFF position. If it is desired that the activation of this switch be strictly enforced, then this switch must be located within a locked and/or concealed containment area such as the instructor's desk.

However, under these described conditions if an emergency arose it would become necessary for the instructor to first unlock the containment area before the switch could be turned OFF and the service deactivated. Also, if the instructor were to be called away from the classroom momentarily, then there would be no means of deactivating the service in the event of an emergency.

Not only would this configuration create a potential hazard, but also it restricts future repositioning and arrangement of the classroom. For instance, since the instructor's desk has electrical switches that are firmly connected with wiring through electrical conduits, it is impossible to move or reposition the desk without first disconnecting these conduits.

To help prevent such emergency situations electrical panic-type push buttons are often positioned near the exit to the classroom. These panic buttons are typically connected to a building fire alarm system. Though these panic buttons may deactivate the services during emergency situations, it does become necessary to provide the wiring so that the remotely-located solenoid valves and electrical relays can be disengaged.

Also to be considered is a situation whereby the instructor fails to deactivate a service at the end of the classroom day. In such an event, the service would remain active through non-use periods. If any emergency arose during these times, then there would be no way to prevent a catastrophe.

To explain such a situation, suppose that near the end of the school day a student inadvertently leaves a cold water faucet open at a sink, and suppose that the drain to this sink has become clogged preventing the drainage of the water from the sink, by the beginning of the next school day a tremendous amount of water damage could occur within the classroom. Further, if the event occurred prior to an extended weekend or holiday, then this damage could likely extend to the entire school.

Now suppose that rather than a water outlet there was left open a gas valve. The results of such an event could be catastrophic. Clearly, a better method to control these services to school science classrooms needs to be found.

There presently exists a means to remotely control and activate the various "HVAC" systems located within the building. This method is commonly referred to as "EMS" or energy management system. Though this "EMS" does have the capability to regulate time intervals when services can be activated, presently there does not exist a common link between the "EMS" and the activating switches for science classroom services.

BRIEF SUMMARY OF THE INVENTION

The service panel with utility controller according to the invention hereof comprises an access service panel to contain the control components, the cut-off valves, the various pipe fittings, solenoids, relays, switches, wiring, connectors and locks; all of the major components needed to control and activate the various services that are utilized in a typical school classroom while ensuring the safety of the students in the classroom.

More specifically, the utility controller of this invention comprises an enclosure having an interior region. Access to the interior region is limited such as, for example, by a cover with a keyed lock. There is also included at least one utility actuator that can be switched between an "ON" state and an "OFF" state in response to a control signal. The availability of utility is controlled by the actuator. Control circuitry typically carried on a printed circuit board is located within the interior region and is coupled to the actuator for providing the control signal. The printed circuit board generates the control signal in response to receiving either an ON or OFF request signal that results from activating a readily accessible ON/OFF utility switch.

The control circuitry further includes a multiplicity of jumper terminals which are selectively connected to program the operation of various features available at a utility controller. A key switch provides limited access and is used to enable the utility switch. There is also included a readily accessible emergency shut-off control switch for providing a shutdown signal to the control circuitry. When the emergency shut-off switch is activated, a control signal is sent to the utility actuators to switch any and all of the utilities that are available (ON) to the OFF condition. The shutdown control switch also disables the utility controller until it receives a "reset" signal. The reset signal is provided by a reset switch located in the interior region such that only individuals having a key to the cover lock can access the reset switch.

According to another embodiment, the printed circuit board also includes RF circuitry for receiving RF transmissions from a hand-held transmitter for remotely controlling the controller.

Object and advantages of the present invention include: providing an accessible service panel with a logic controller containing the major components needed for the control of the various services typically utilized in school science classrooms; providing a service panel with a logic controller where the components are pre-selected and pre-assembled to insure compatibility in the installation and further permitting ease in the installation process; and providing a service panel with a logic controller having the means to insure the safety of the students occupying the classroom.

Further objects and advantages are to provide a service panel that restricts the unauthorized use of the various services to the science classroom. The door-mounted indicators provide for ease in determining the services that are activated. Because a key is needed to activate but not deactivate the services, usage of the service panel is made simple. Restricted access to the interior compartment of the service panel is further limited to authorized maintenance personnel. This feature prevents inadvertent injury to non-authorized persons. It further prevents potential damage to the interior components of the service panel. However, according to one embodiment, because the plumbing cut-off and solenoid valves are located within the panel compartment, their maintenance is made easy.

Since control and access to the panel is restricted, the service panel with utility controller can be located in plain sight and near the exit to the classroom. Therefore, the panic button mounted upon the door of the service panel will deactivate the services in the event of an emergency. This panic button can also be connected to the building fire alarm system, thus notifying authorities in the event of an emergency. Further, after the pressing of the panic button, it is necessary to reset the utility controller prior to reactivation of the services. Therefore, since the reset switch is located within the service panel, the possible reactivation during an emergency is avoided.

Because the utility controller of this invention also includes the means to regulate the time of day that the service panel can be activated and deactivated, the risk that a service is inadvertently left active is avoided.

Another further advantage is that, according to one embodiment, the utility controller is located within the service panel, which also houses the electronic controller and other electrical components. This unique design prevents potential water damage to the component due to leakage in water service piping.

Further, requirements that natural gas piping be within a secondary containment enclosure are also achieved. For example, according to one embodiment, although the utility controller has exposed electrical wiring that enters the box through non-sealed conduit, it also has a gasketed door that, once closed and secured, seals it from the main service panel. The service panel having a gasketed door panel thus becomes the required secondary containment enclosure.

The electrical relay for control of electrical outlets may be remotely located, however, the control switch and necessary wiring and other control components may still be centrally located with the switches for the other various services.

Further, since the service panel and utility controller may be provided as individual components, the service panel with pre-assembled piping, the door assembly, and the utility controller, there is a reduced possibility of potential damage to various components during the rough-in stages of the construction of the building. In other words, components are assembled as needed rather than at one time which is the case in many other applications.

Also, because the service panel and utility controller contain pre-wired components with disconnect switches, there is ease in maintenance.

Further objects and advantages of the invention will become apparent from the consideration of the drawings and ensuing description.

BRIEF DESCRIPTION OF THE DRAWINGS

FIGS. 1A through 1F show various aspects of the service panel;

FIGS. 7 and 7A show the service panel during the various stages of construction and assembly;

FIG. 8 shows the use of an optional conventional digital timer to regulate times of permissible operation of the service panel;

FIGS. 9 and 9A detail the utility controller when mounted remotely from the service panel along with the respective wiring diagram;

FIG. 10 shows the remotely-mounted utility controller with the addition of the digital timer;

FIGS. 12 and 12A show the remotely-mounted utility controller with the digital timer added;

FIG. 15 is another alternative method of utilizing the service panel as a master control service panel;

FIG. 17 is an alternate view of the door panel assembly when the utility controller is mounted remotely;

FIGS. 20, 20A and 20B illustrate the full PC board and enlarged portions respectively used with the utility controller of FIG. 19;

FIG. 21 generally illustrates an embodiment of the invention that includes a remote transmitter and associated circuitry;

FIG. 29 illustrates a junction box for use with a controller programmed to operate as described with respect to FIGS. 28, 28A and 28B.

DETAILED DESCRIPTION OF THE INVENTION

Figure 1C:
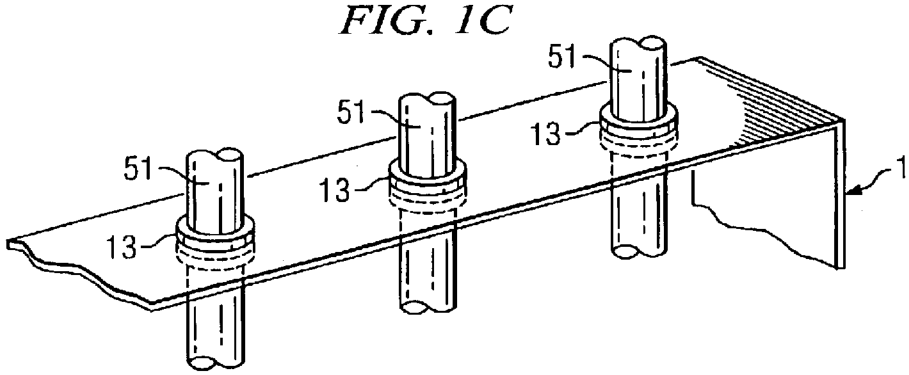
Figures 1, 6A:
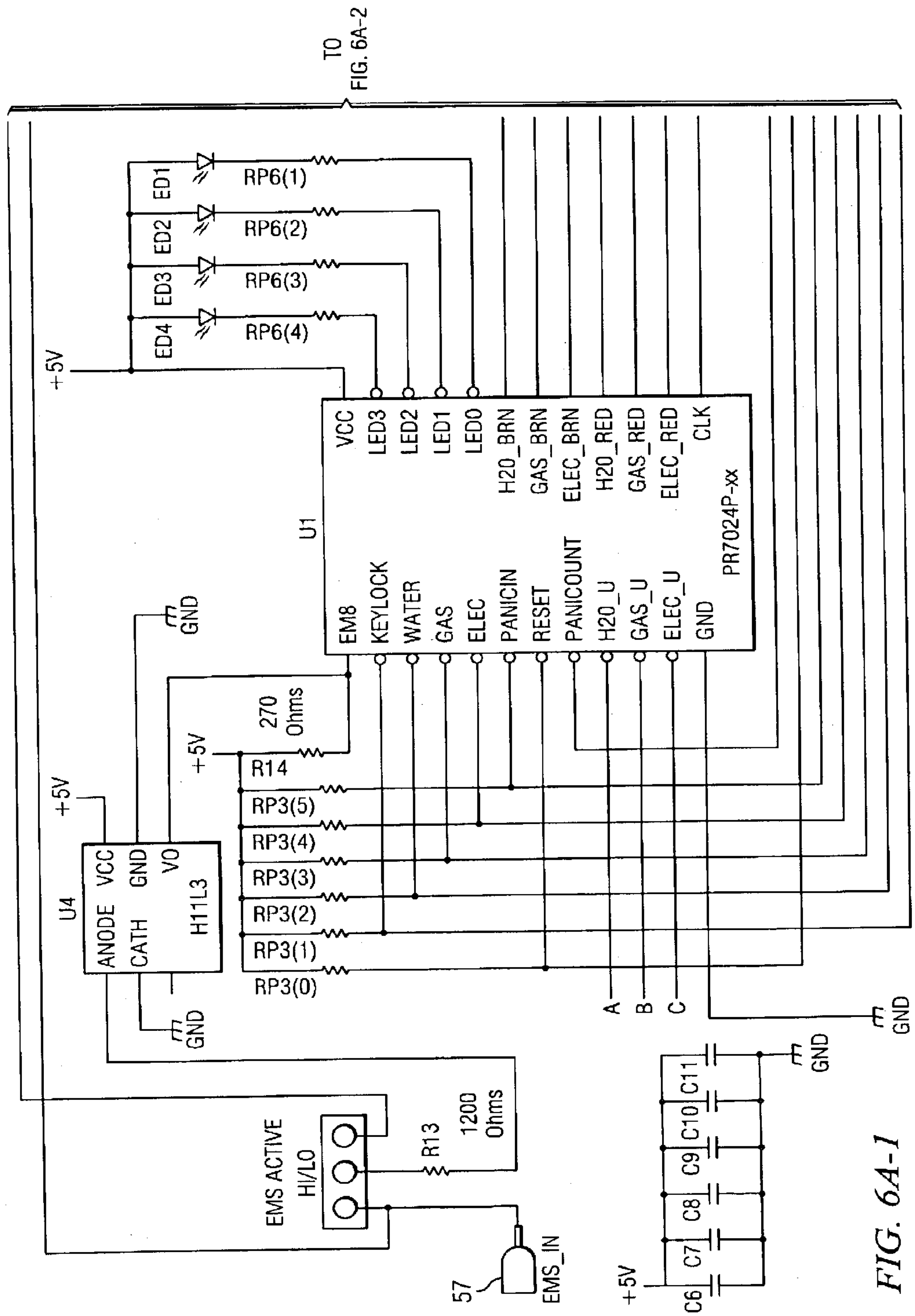
FIG. 1 shows the service panel.
FIGS. 6A through 6E show the electronic controller and the wiring diagrams for the controller. Due to the complexity of the electronic controller, the reader will note that in many figures, an image of the controller will appear for reference purposes only without an attempt to fully describe the controller. The drawing figures are illustrated in that fashion so that the reader will fully understand the placement and the electrical connections between the controller and other components of the laboratory service panel.

The invention is a service panel having an integral utility controller for controlling the various services typically utilized in a science classroom. The panel, doors and other containment components are preferably constructed of welded sheet metal. They contain the various components needed for the control of these services. FIG. 1 through FIG. 1C shows various views and aspects of the service panel 1.

As shown in FIG. 1, the interior of the service panel 1 houses the water cut-off valve assembly 2 and the gas cut-off valve assembly 3. These assemblies are secured in place to a section of channel strut 11 with two-piece pipe clamps 12. Channel strut 11 is secured to the rear of the service panel. Wiring to solenoids 46 is assembled and terminated with solenoid plug 34. Utility controller 8 is positioned in the upper portion of the service panel. Retaining clips 23 are positioned along the sides. Mounting brackets 17 are positioned at each corner of the service panel 1.

As demonstrated in FIG. 1A, the entry points of service piping 51 as it penetrates service panel 1 are sealed airtight by the use of rubber grommets 13. Likewise but not shown, the existing holes at the base of the service panel utilize the same grommets.

Further, as demonstrated in FIG. 1B, a sleeving threaded nipple 62 secured to service panel 1 with locking nuts 63 are used at the entry points of the service piping 51 as it penetrates the service panel. As before mentioned, this technique is utilized when it is necessary to provide airtight sleeving around the gas service piping. A liquid tight fitting is used to seal the penetration of the water service piping as it enters the service panel. This technique will be discussed further in other figures of the description of the invention.

FIG. 1C is similar to the view shown in FIG. 1A except having three sets of service piping 51. In this illustration, each of these pipes is sealed airtight by the use of rubber grommets 13.

Figure 1D:
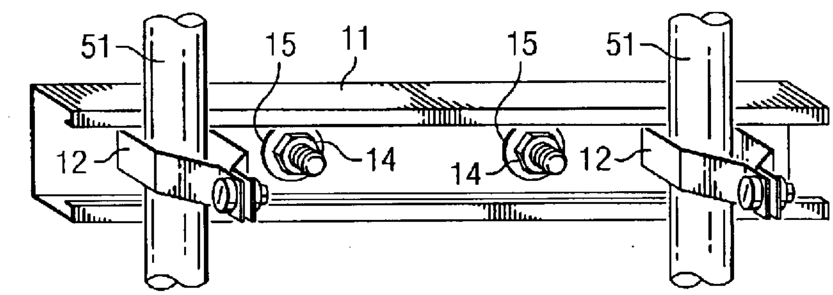

FIG. 1D is an isometric view of channel strut 11 detailing the technique used to secure the service pipes 51 to the strut with two-piece pipe clamp 12. The strut is secured to the back of the service panel with threaded nuts 14 and flat washers 15.

Figure 1E:
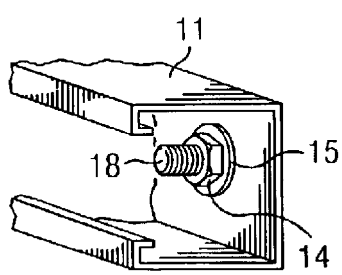

FIG. 1E is an isometric view of a section of the channel strut. This view demonstrates the method used to secure channel strut 11 to threaded studs 18 with flat washer 15 and threaded nut 14. These threaded studs are secured to the back panel of the service panel.

Figure 1F:
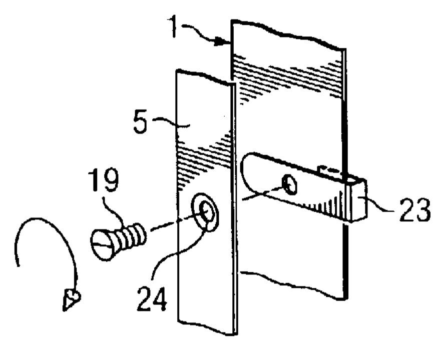

FIG. 1F is an isometric view of the retaining clip 23 utilized to secure the door panel assembly to the service panel 1. The retaining clip is placed over the edge of the service panel side to provide taped threads whereby machine screw 19 can be inserted through mounting hold 24 in doorframe 5 hence securing the door panel assembly to the service panel.

Figures 2, 6A:
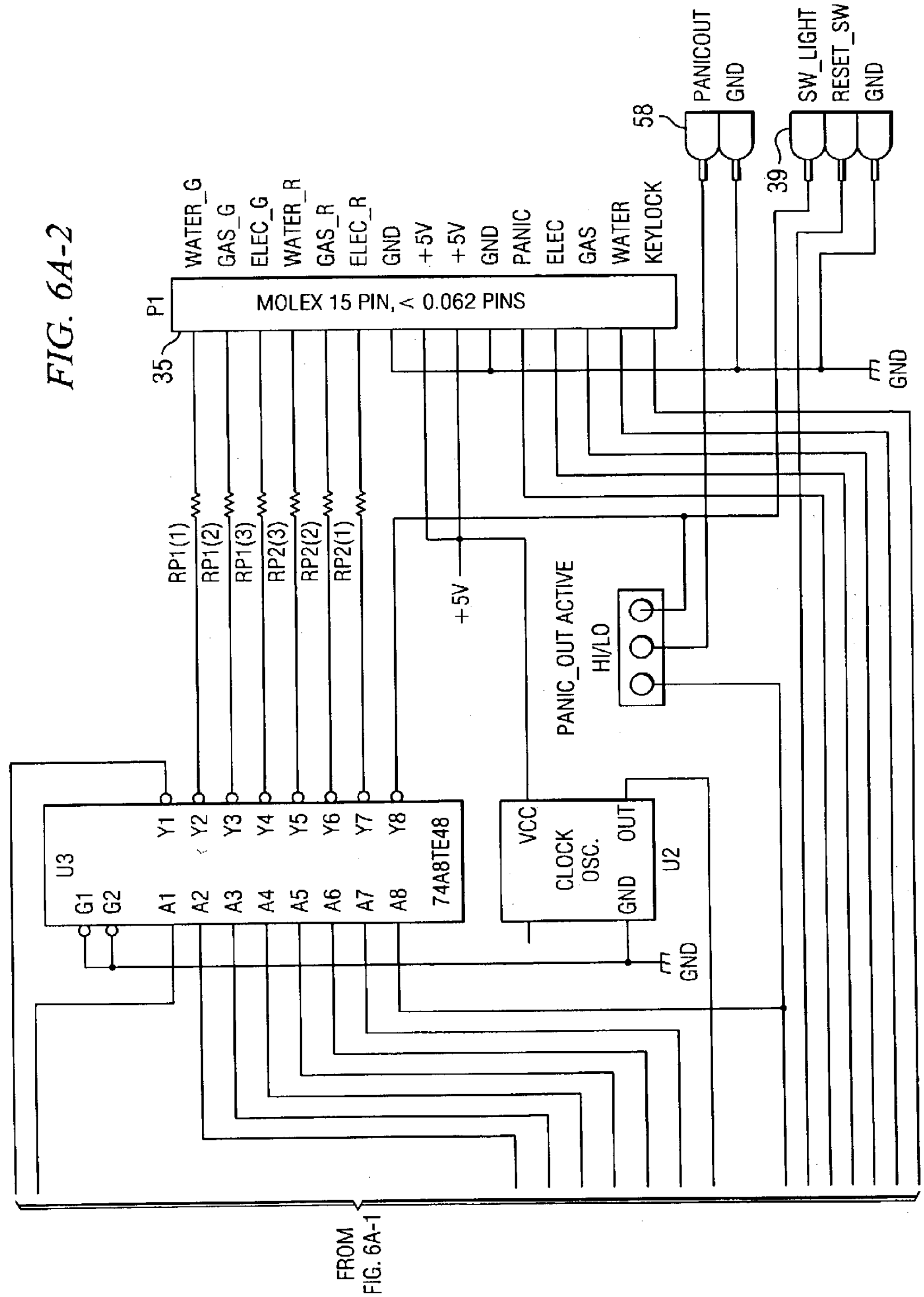
FIG. 2 shows the cut-off assemblies.

Turning to the exploded view, FIG. 2 of the water cut-off assembly 2 and the gas cut-off assembly 3, the water cut-off valve 48, the solenoid 46, assorted lengths of threaded pipe nipples 49, and two threaded unions 50, comprise the water cut-off assembly. In turn, the gas cut-off valve 47, the solenoid 46, assorted lengths of threaded pipe nipples 49, and two threaded unions 50, comprise the gas cut-off assembly. Each solenoid has wire leads.

Now turning to the door panel assembly 4, FIG. 3 shows a plane frontal view of door panel assembly 4. Door panel 6 is affixed to doorframe 5 with continuous hinge 22. On the surface of the door panel are mounted three control switches 41 for controlling the different services. These switches are typically rocker type being normally open, single pole, single throw. One switch controls the electrical service, the second controls the domestic cold water service while the third controls the gas service. Above each control switch is an indicator (LED) 42 that shows whether the service is in the active state or not. Below each control switch is a second indicator (LED) 42 to indicate if the service was active during a scheduled shutdown. A keyed lock 44 is mounted at the side opposite to the continuous hinge. Keyed switch 45 is positioned on the lower area of the door panel. This keyed switch is a normally open key activated single pole, single throw switch with momentary contact having the capability of being removed only from the OFF position. Adjacent to this keyed switch is located panic button assembly 43. This panic button is of a conventional design that is typically utilized in similar conventional applications. It is a normally open single pole momentary push button switch. Because of its common usage in the electrical industry, no further description is provided. All switches, lights and locks are mounted to the door panel using common means and methods as provided by the manufacturers of these components.

Figure 3A:
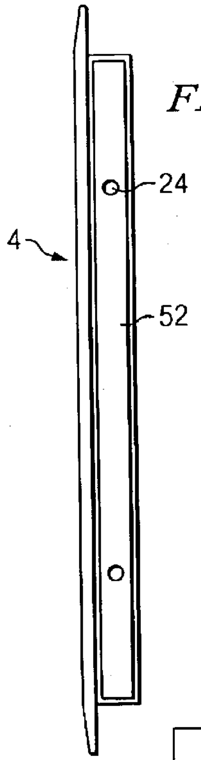
FIGS. 3 through 3E show the door panel assembly.

FIG. 3A is a side sectional view of the door panel assembly 4. Gasket material 52 is affixed to the exterior edges of doorframe 5. Mounting holes 24 are positioned along the inner surface of the doorframe.

Figure 3B:
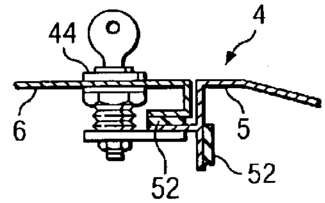

FIG. 3B is another sectional view of door panel assembly 4. Keyed lock 44 is displayed in the locked position securing door panel 6 to doorframe 5. Gasket material 52 is adhered to the outer edge of doorframe 5. Gasket material 52 is likewise adhered to the inner of door panel 6.

Figure 3C:
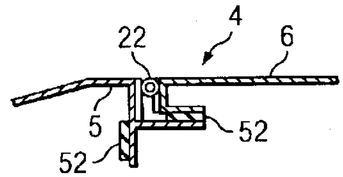

FIG. 3C is a sectional view of door panel assembly 4 with door panel 6 in the closed position. This view demonstrates the mounting of the door to the frame with continuous hinge 22. Gasket material 52 is adhered to the inner frame of door panel 6 thereby when the door is closed an airtight seal is gained. Gasket material 52 is likewise adhered to the outer edge of doorframe 5. This gasket will make the control panel airtight when the door panel assembly is mounted upon the control panel. This mounting technique will be discussed further in FIG. 7.

Figure 3D:
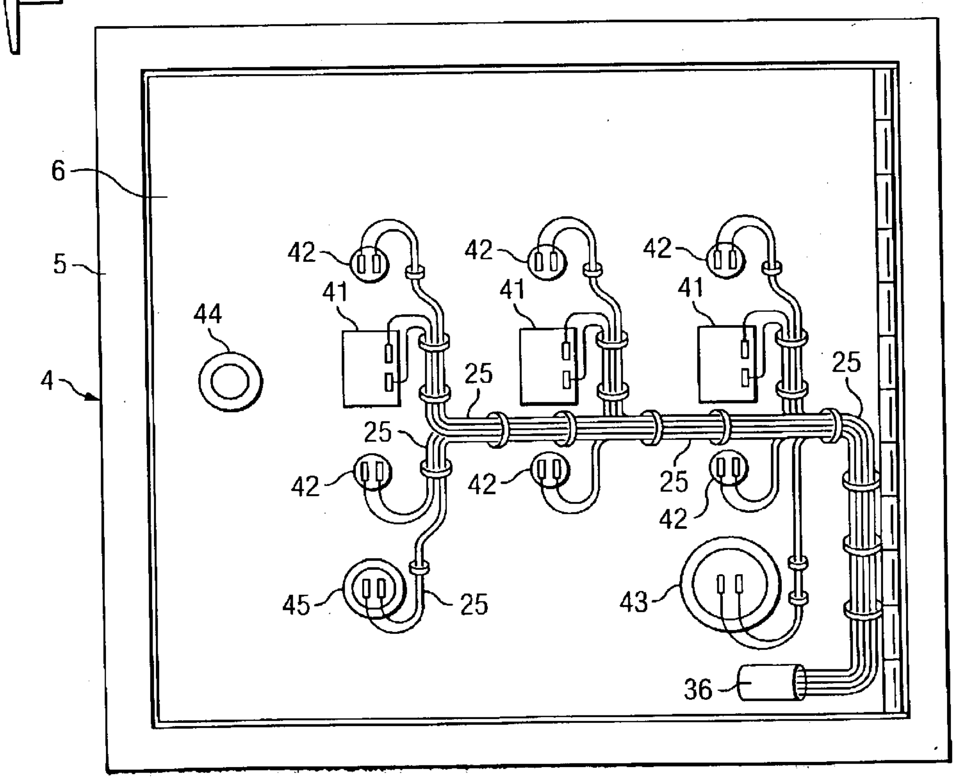

FIG. 3D shows a plane back view of door panel assembly 4. Low voltage wiring to control switches 41, keyed switch 45, panic button assembly 43, and indicators (LED) 42 are visible. A wiring harness 25 collects these low voltage wires. They are terminated with door panel plug 36.

Figure 3E:
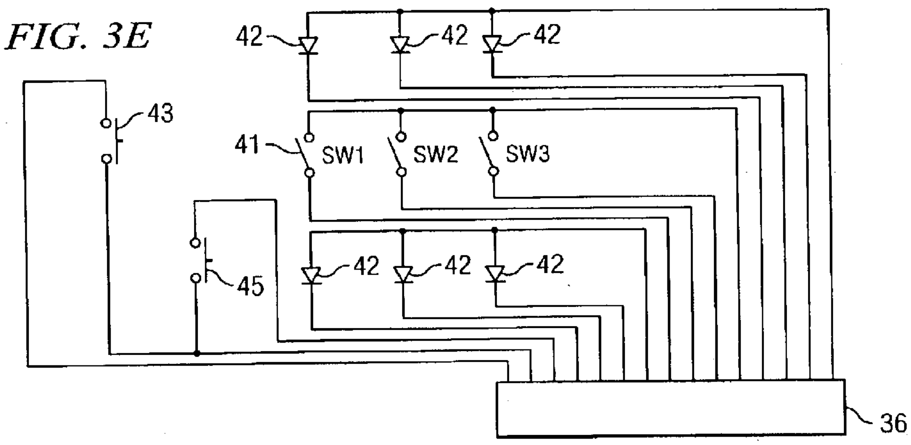

FIG. 3E is the wiring schematic for door panel assembly 4. The three control switches 41 having a common lead wire with individual service wire that continues back to the door panel plug. The same is true of the wiring technique for the two sets of three indicators (LED) 42. Likewise, the panic button assembly 43 and keyed switch 45 have a similar wiring configuration.

Figure 4:
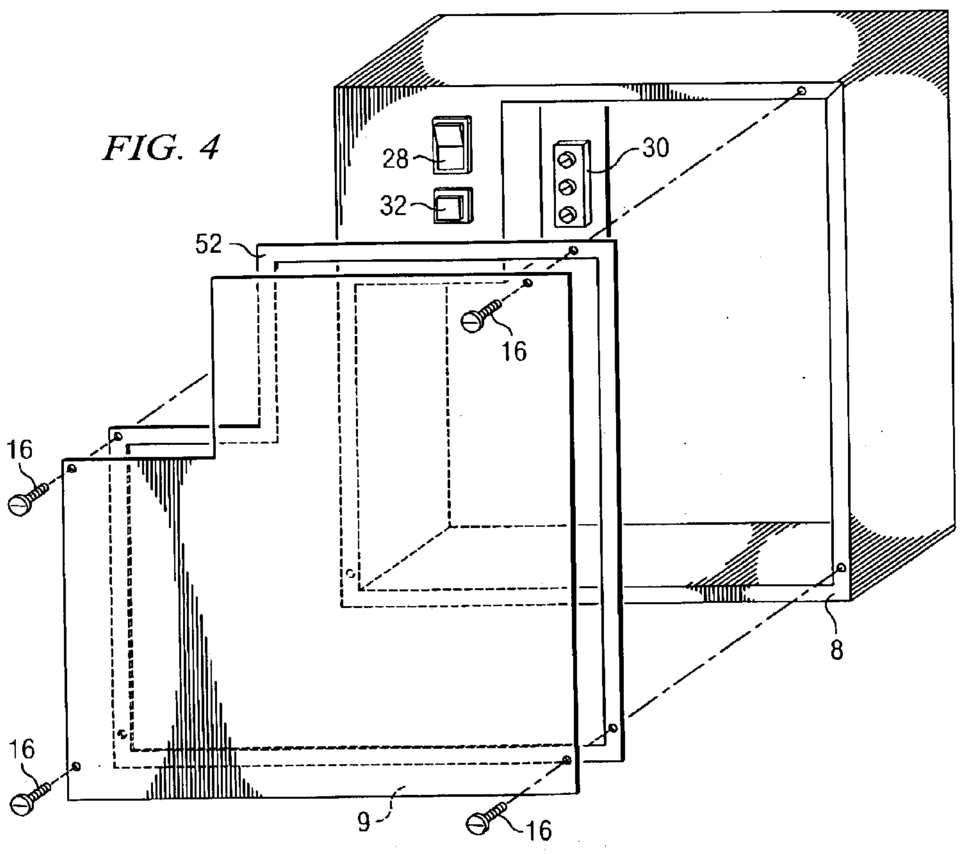
FIGS. 4 through 4C show the utility controller.

FIG. 4 shows a frontal view of the assembly of secondary door 9 onto utility controller 8. The secondary door is affixed with sheet metal screws 16 and sealed with gasket material 52. On the surface of the utility controller is combination switch l circuit breaker 28 and reset switch 32. The positioning of these switches along with the offset cut of the surface of the secondary door permits the door to be secured in place while allowing accessibility to these switches. Power terminal 30 is viewed in the recessed portion of the utility controller.

Figure 4A:
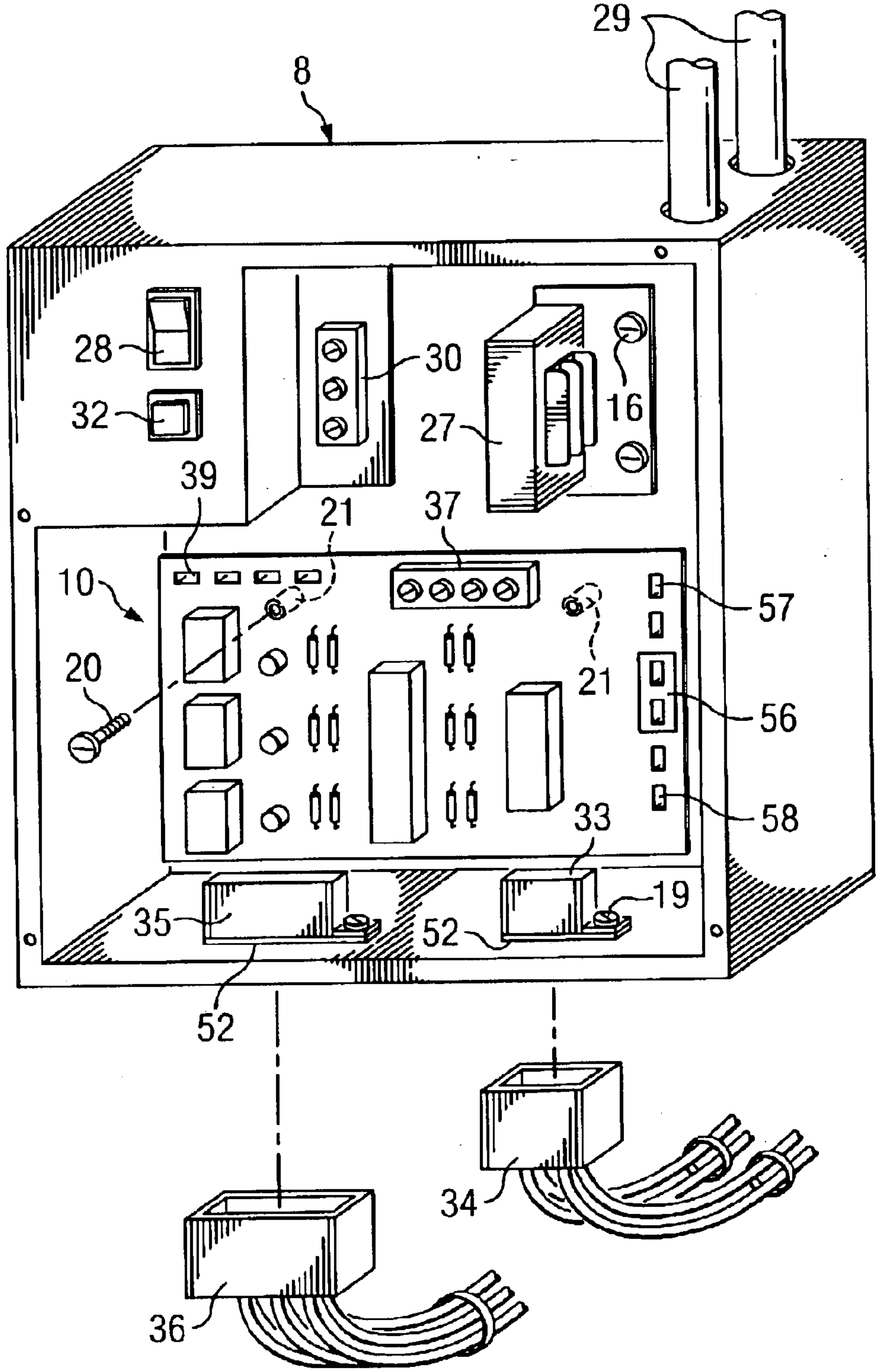

Now turning to the interior of the utility controller, FIG. 4A is an interior isometric view of the utility controller 8 displaying the mounted electric controller 10. Low voltage transformer 27 is secured in the upper portion of the secondary box with sheet metal screws 16. Power terminal 30 is located on a recessed shelf of the surface of the utility controller. Mounting spacers 21 are positioned on the back of the box. Mounting screws 20 are inserted through the surface of the electronic controller 10 and into the mounting spacers. Also viewed are the two openings in the top of the box. Electrical conduit 29 is affixed to these openings by conventional means. The front opening facilitates the entry of the line voltage wiring while the rear opening permits entry of low voltage wiring. Solenoid terminal 33 and door panel terminal 35 which are integral parts of the electronic controller 10 are positioned through holes in the base of the utility controller. Gasket material 52 is sandwiched between these terminals and the utility controller and machine screws 19 are utilized to make them secure. This mounting technique further secures the electronic controller in its mounted position. Once secured to the box, solenoid plug 34 and door panel plug 36 can be inserted into their respective terminals. These plugs are the matched opposite end of their respective terminal. The wiring connections for terminals 30, 37, 35, 33, 39, 56, 57 and 58 are further detailed on FIG. 4B and discussed in the operation section of the specifications.

Figure 4B:
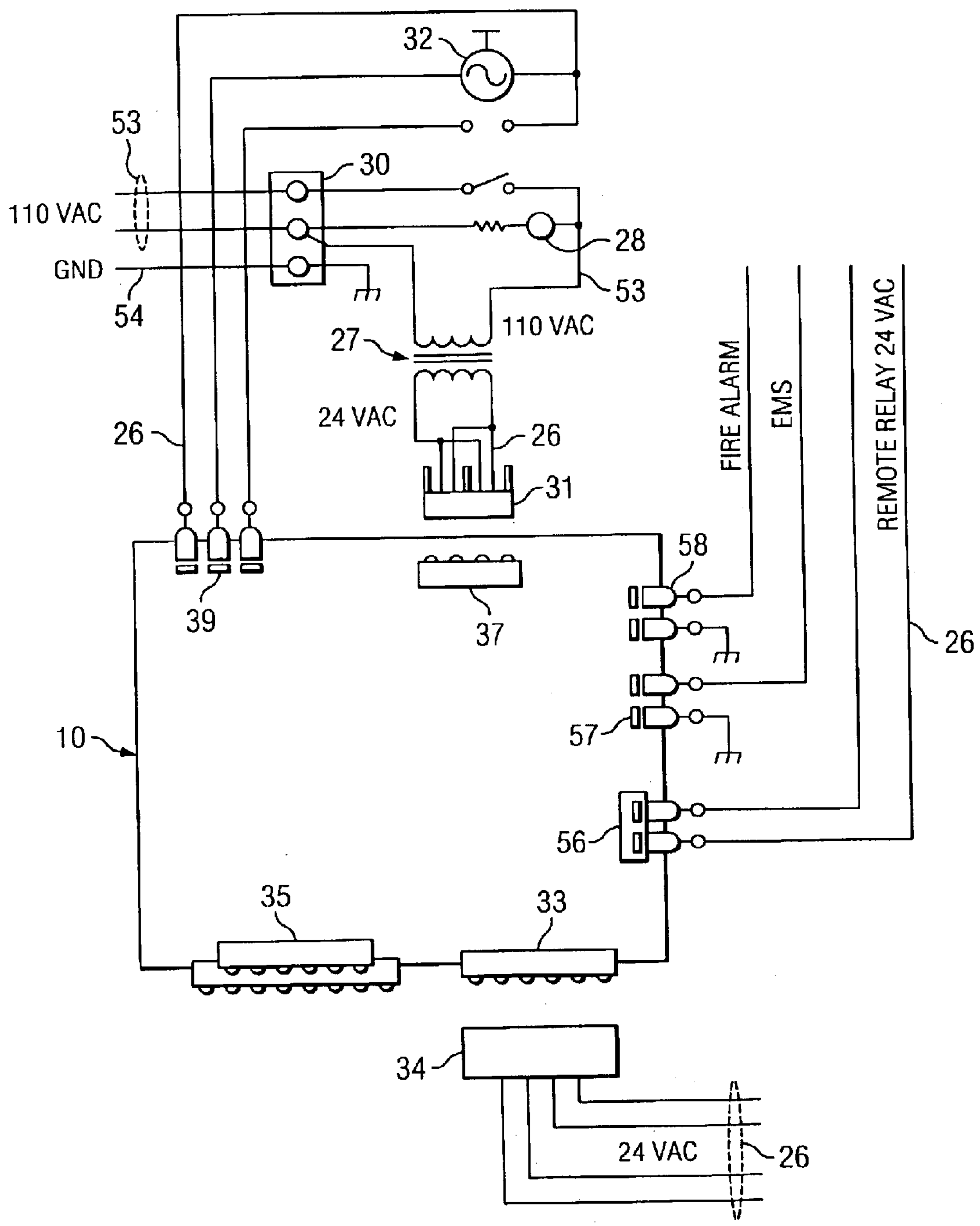

FIG. 4B and further figures show the various wiring diagrams for the utility controller. To avoid repetition in the description of the preferred embodiment as well as alternate embodiments of the invention, detail is given for the wiring diagram for the preferred embodiment while only modifications are described for the various additional and alternative embodiments.

FIG. 4B shows the wiring diagram when 24 VAC is used to activate the solenoids and remotely-located electrical relay. Wiring from the building fire alarm is field-connected to fire alarm terminal 58. Likewise, wiring from the "EMS" (energy management system) is field-connected to "EMS-"terminal 57. Low voltage wiring 26 is field-installed and extended from remote relay terminal 56 to a remotely-relocated and field-installed electrical relay. Line voltage wiring 53 and grounding wire 54 are field-installed and connected to power terminal 30. The line wire is routed through combination switch/circuit breaker 28. A common line is also connected to this switch so that the ON/OFF indicator light of this switch will be illuminated when in the ON position. Line voltage wiring 53 is thus routed through this switch to low voltage transformer 27 while the common lead is connected directly to the transformer. Low voltage wiring 26 is connected from this transformer to controller power terminal 37 with power plug 31. Power plug 31 is a polarized plug insuring proper fitting to the terminal. Because this embodiment of the invention utilizes low voltage current to activate the solenoids and remote electrical relay, leads on the power plug are interconnected. Low voltage wiring 26 is extended from reset terminal 39 to reset switch 32. Two leads with a single ground are used. This allows the normally open single pole momentary reset push button switch to reset the electronic controller from the panic state to the shutdown state when pressed. As will be discussed in more detail hereinafter with respect to the "sequential state controller"diagram of FIG. 5, the panic condition is the "1111" state and the shutdown condition is the "0000" state. The LED within the button of the reset switch remains illumination until reset occurs at which time it loses illumination. Solenoid plug 34 is connected to solenoid terminal 33. Low voltage wiring 26 thus extends to the solenoids. Door panel terminal 35 receives door panel plug 36 (not shown).

Figure 4C:
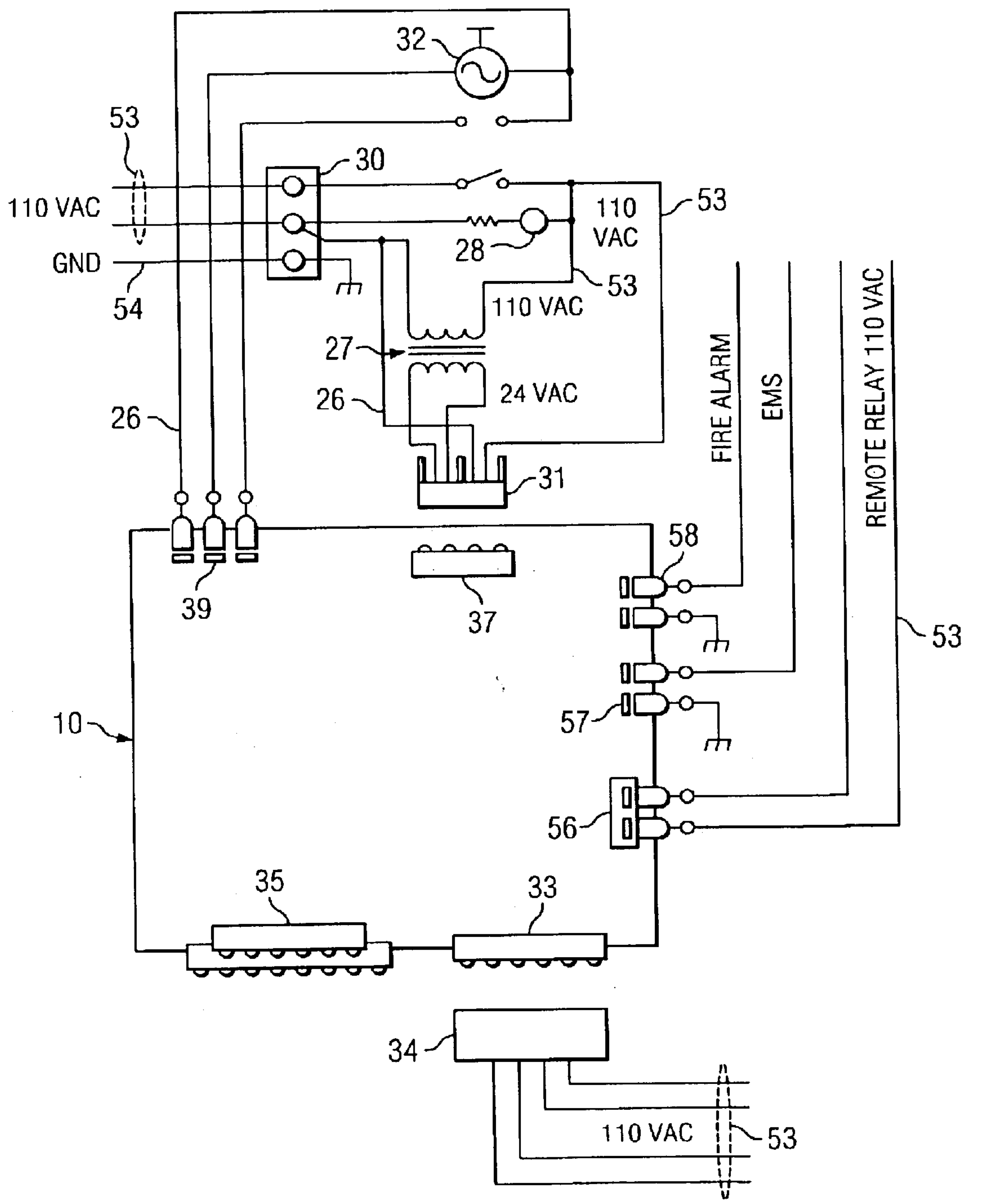

FIG. 4C shows the wiring diagram for utility controller 8 when 110 VAC is used to activate the solenoids and remotely-located electrical relay. In this embodiment, line voltage wiring 53 extends from combination switch/circuit breaker 28 to one set of contacts on power plug 31. In this instance, these leads are not interconnected with the low voltage wiring 26 from low voltage transformer 27. Line voltage wiring 53 thus extends from solenoid plug 34 and remote relay terminal 56.

Figure 5:
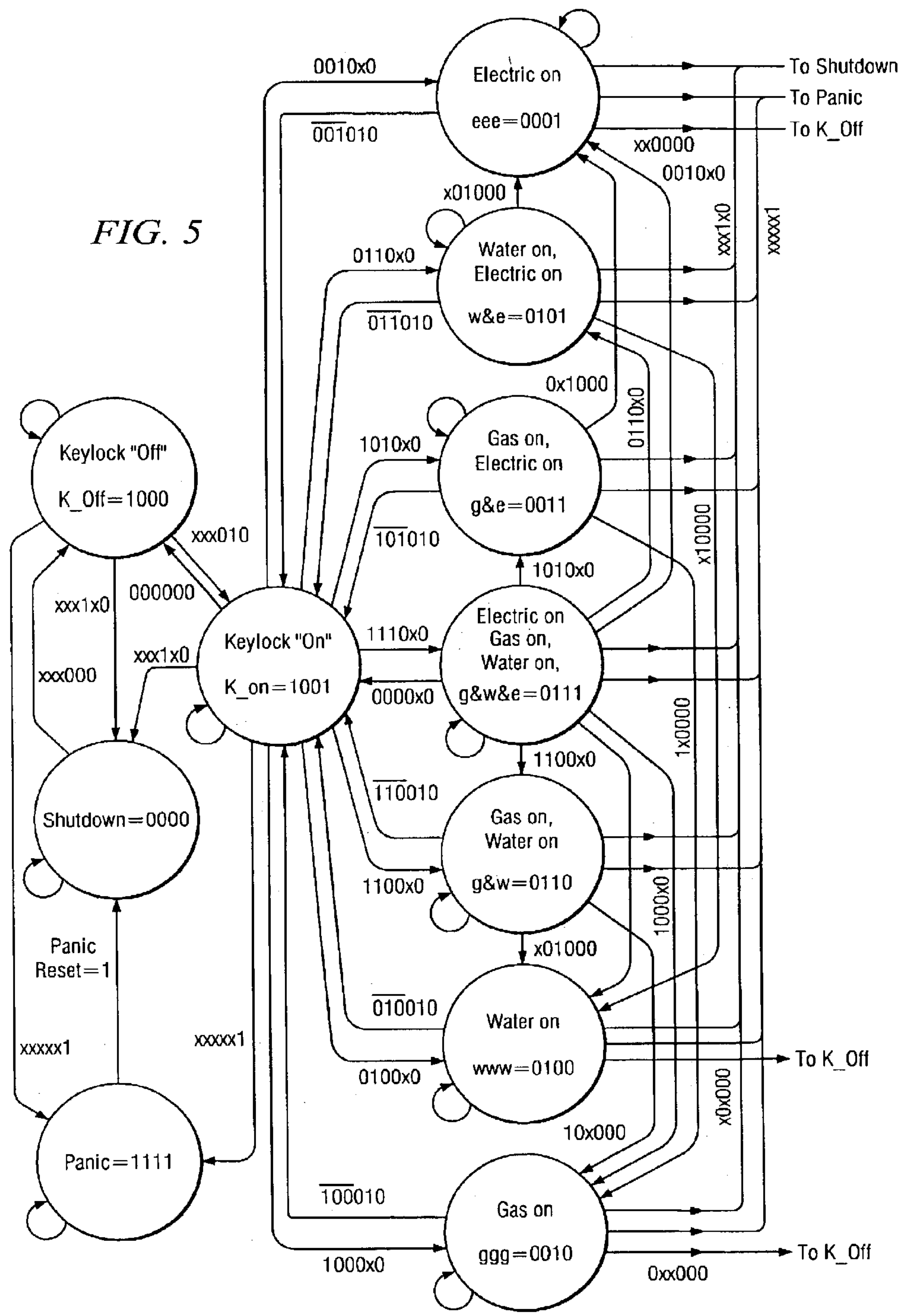
FIG. 5 is a sequential state controller diagram for the electronic controller.

FIG. 5 is the aforementioned sequential state controller diagram for the controller. To facilitate understanding thereof, it should be noted that operation of the utility controller or the laboratory service panel is achieved by moving from one logical "state"to another, based on inputs to the system. As inputs to the system change, the state of the system changes. If no inputs are changing the system remains in the current state. There are sixteen (16) different states used in this system, which are encoded using four (4) digital bits. The encoding is as shown in Table 1 below.

TABLE 1

| Decimal | MSB-LSB | State Name | Outputs Turned On |
|---|---|---|---|
| 0 | 0000 | Shutdown | None |
| 1 | 0001 | EEE | Electric relay |
| 2 | 0010 | GGG | Gas relay |
| 3 | 0011 | G & E | Gas & Electric relays |
| 4 | 0100 | WWW | Water relay |
| 5 | 0101 | W & E | Water & Electric relays |
| 6 | 0110 | G & W | Gas & Water relays |
| 7 | 0111 | G & W & E | Gas, Water & Electric relays |
| 8 | 1000 | K_off | None |
| 9 | 1001 | K_on | None |
| 10 | 1010 | Delay2 | Water relay |
| 11 | 1011 | Delay1 | Water & Electric relays |
| 12 | 1100 | Shut2 | Water relay |
| 13 | 1101 | Shut4 | Electric relay |
| 14 | 1110 | Shut1 | Water & Electric relays |
| 15 | 1111 | Panic | Alarm output |

The circuits preferably employed are a "Moore"type, with the output conditions based current state the sequential state controller is in, and not on a combination of the current put conditions. This aids in preventing asynchronous noise from causing states to change. The components used in the "logic" section are shown below in Table 2

TABLE 2

| Reference Designator | Component Type | Function Provided |
|---|---|---|
| U1 | ICT7024 | Programmable logic device |
| LED[1–4] | LED | Light emitting diodes, with internal current limiting resistors |

Indicators (LED1, LED2, LED3 and LED4) provide a visual indication of the present state. Since the sink current (Iol) of the logic device (U1) is much greater than the source current (Ioh) the LED's are lighted by switching the cathode of the LED to Vol. The anode is directly connected to the +5V supply line. These LED's have internal current limiting resistors to allow them to operate directly off +5V supplies.

The inputs to the sequential state controller are the three utility switches, the enabling key switch, the panic button (41, 45 and 43, respectively in FIG. 3), and the energy management system input (EMS). The inputs to the logic device are controlled so that the entire device is synchronous. The sequential state controller diagram in FIG. 5 shows the progression through the states as a function of the input variables.

Figures 1, 6B:
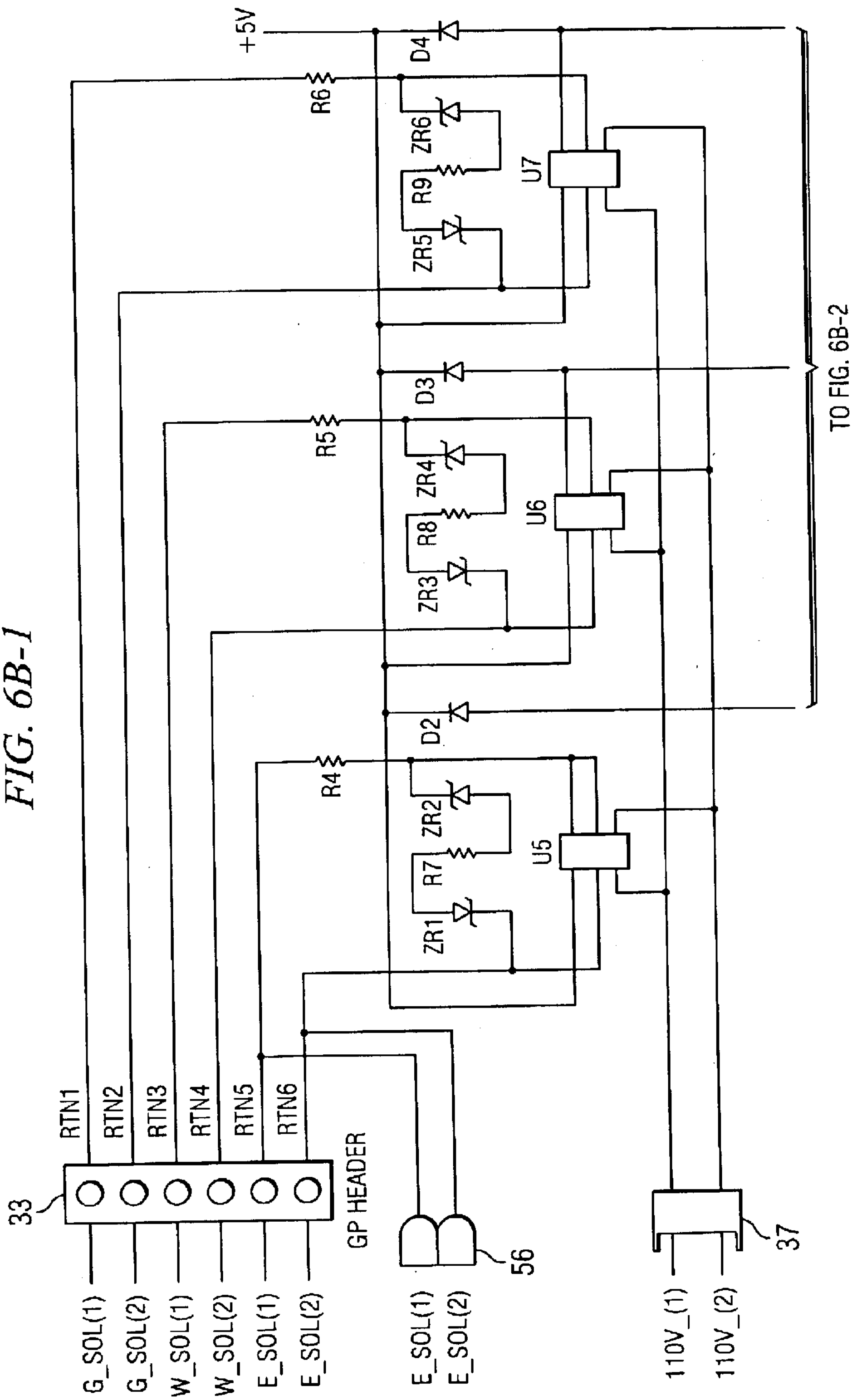
Figures 2, 6B:
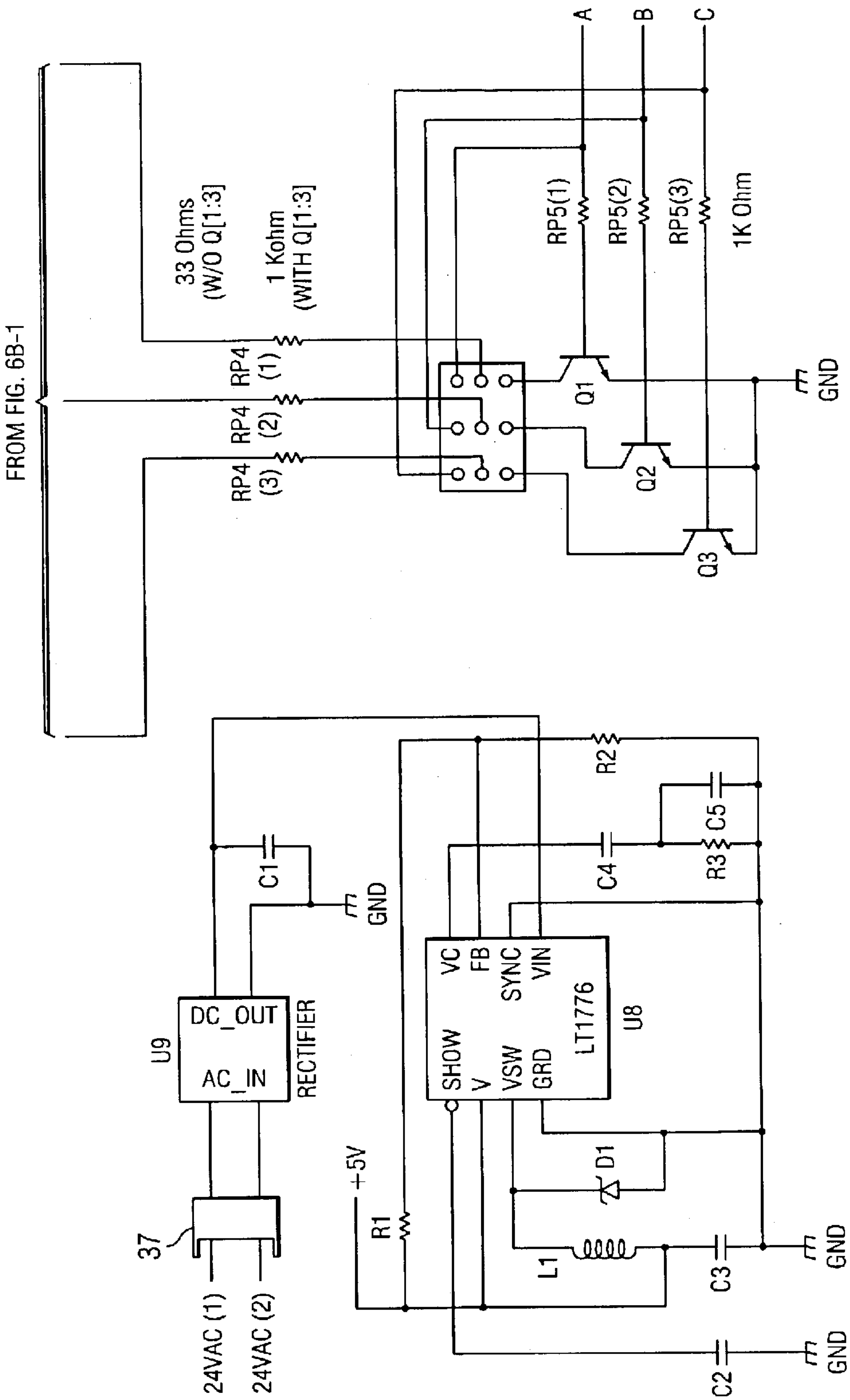

FIGS. 6A and 6B are the wiring diagrams for the electronic controller. The lines labeled "A-B-C" on each of the figures are connected. Solenoid terminal 33, remote relay terminal 56, and controller power terminal 37 are displayed on FIG. 6B. A can be seen, the remote relay terminal is interlocked with the solenoid terminal. This enables the usage of the electronic controller as a controller for three solenoids rather than the preferred two solenoids and a remotely-located electrical relay in the event that building criteria mandates such. Controller power terminal is displayed as two separate terminals but in actuality is a single four-pin polarized terminal. FIG. 6A displays the remaining terminals positioned on the electronic controller. Those are the "EMS" (energy management system) terminal 57, fire alarm terminal 58, reset terminal 39 and door panel terminal 35. Adjacent to terminal 57 is "EMS Active". This jumper enables the electronic controller to function without an "EMS"signal by reversing 5+VDC to 5−VDC. The panic out active serves the same function by permitting an active low signal rather than active high to be sent to the fire alarm when the panic button is pressed. Reference Alphanumerics denote the primary components of the circuit board.

Figure 6C:
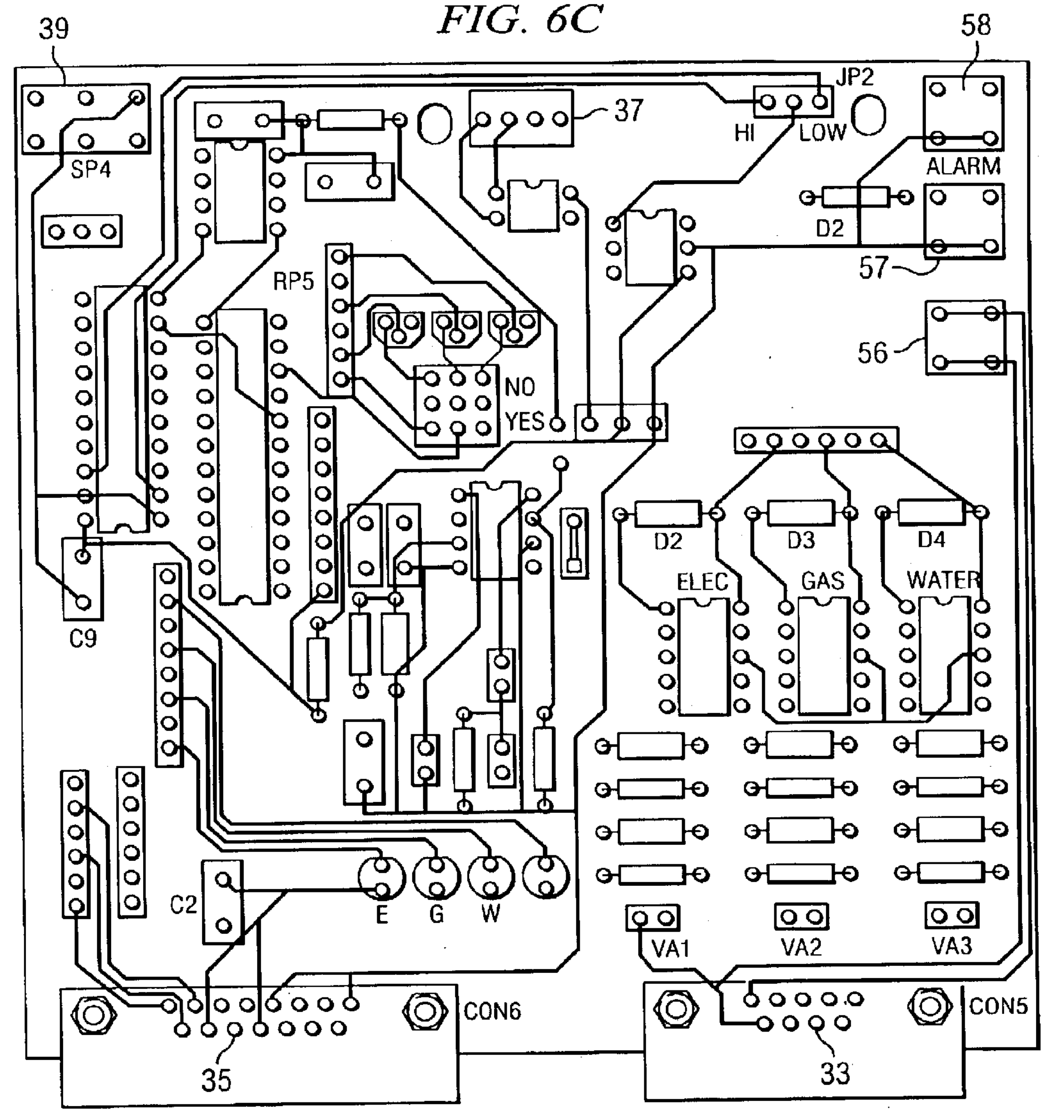

FIG. 6C is a view of the printed circuit board of the electronic controller. All terminals referenced on FIG. 6A and FIG. 6B are numbered respectively.

Figure 6D:
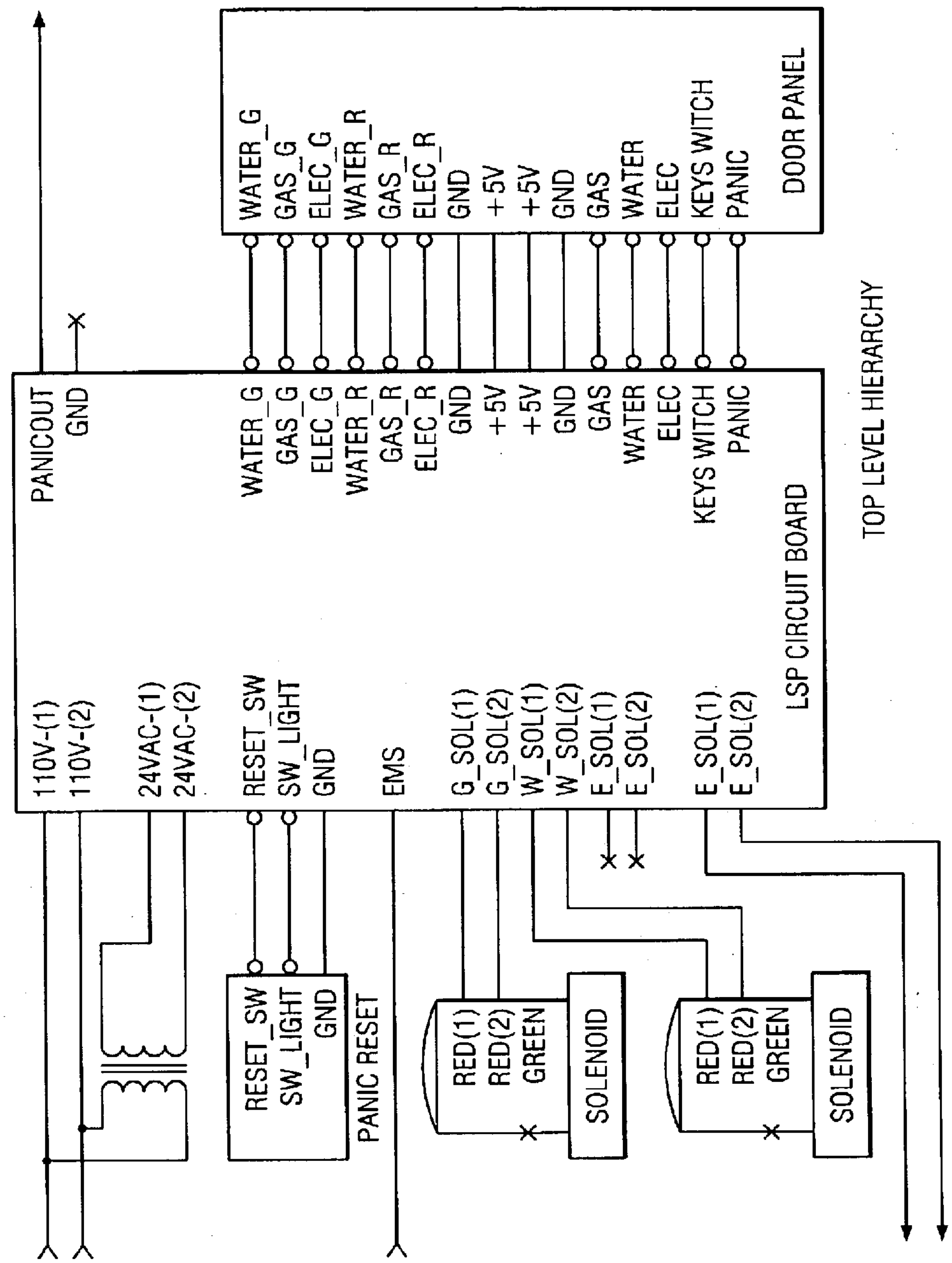

FIG. 6D is a diagram of the TOP LEVEL HIERARCHY of the electronic controller when 110 VAC is used to activate the solenoids and electrical relay.

Figure 6E:
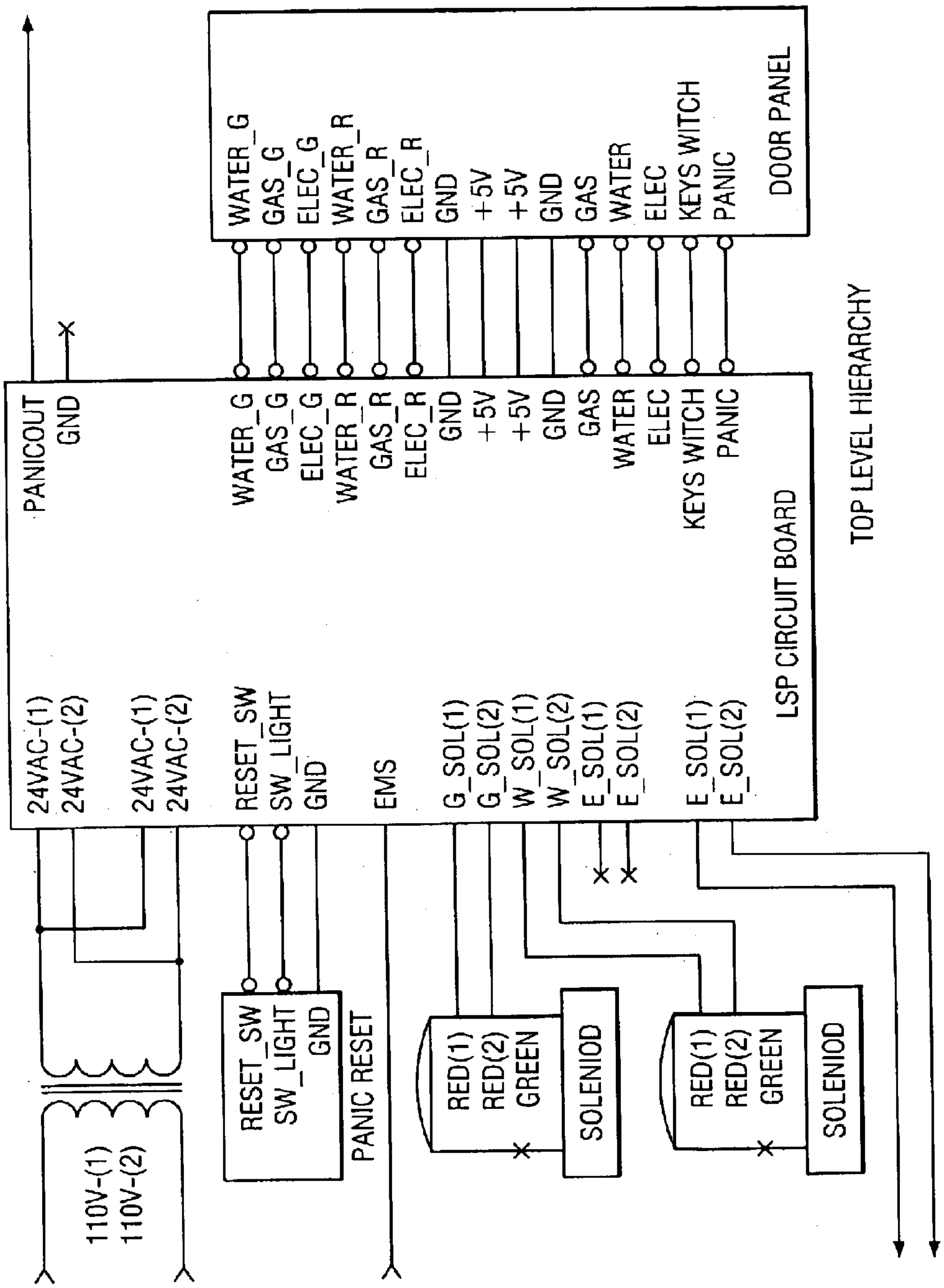

FIG. 6E is a diagram of the TOP LEVEL HIERARCHY of the electronic controller when 24 VAC is used to activate the solenoids and electrical relay.

Figure 7:
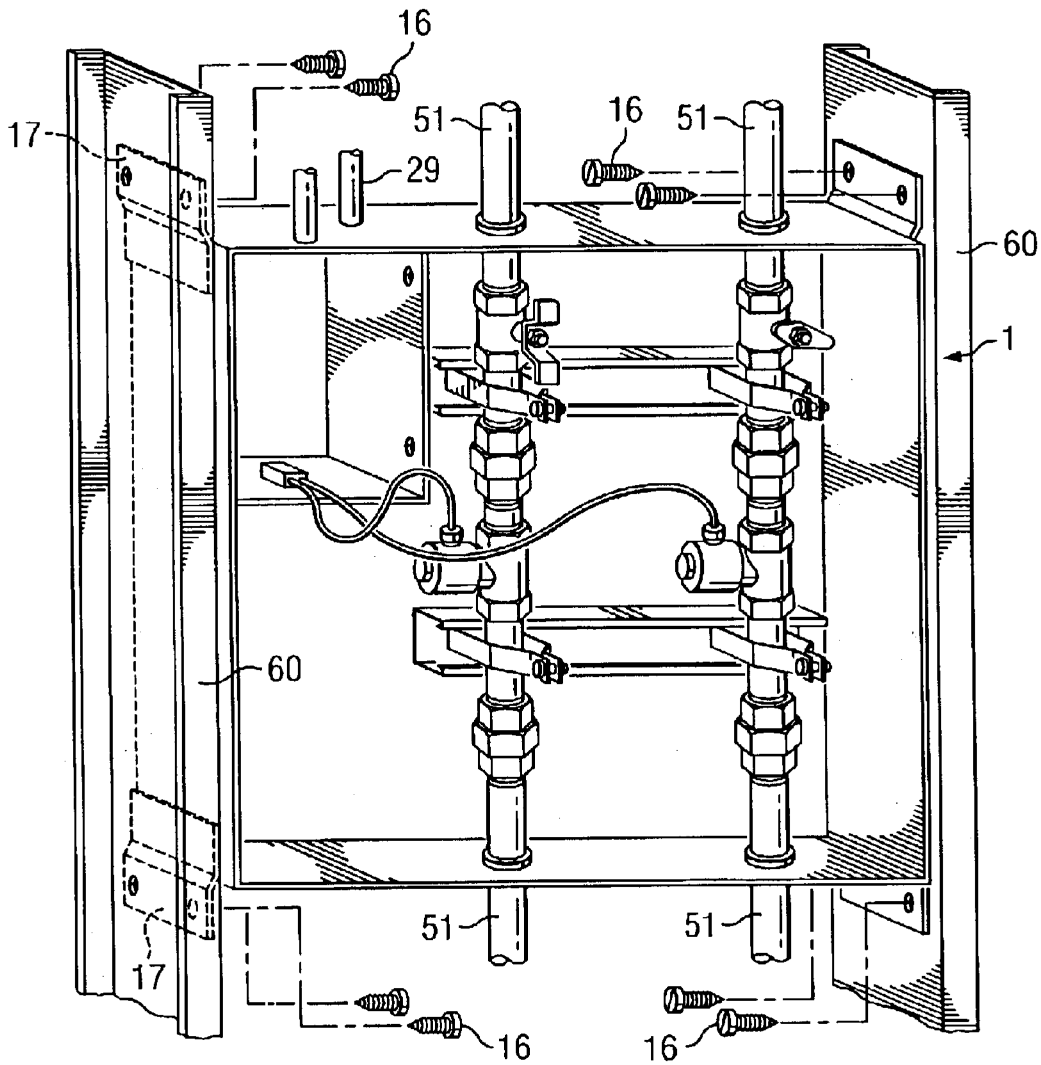

FIG. 7 and FIG. 7A illustrate the stages of installation of the service panel. FIG. 7 shows the technique for the mounting of service panel 1 to the metal wall framing studs 60 during the rough-in phase of construction. Sheet metal screws 16 are inserted through the holes in mounting bracket 17 at either side of the service panel and screwed into the studs. Electrical conduit 29 is field-installed at the top of the service panel. Service piping 51 is connected to their respective cut-off assembly 2 and/or 3.

FIG. 7A demonstrates how door panel assembly 4 is mounted onto service panel 1. Machine screws 19 are inserted through mounting holes 24 and tightened into retaining clips 23 located at either side of the service panel.

Figure 8A:
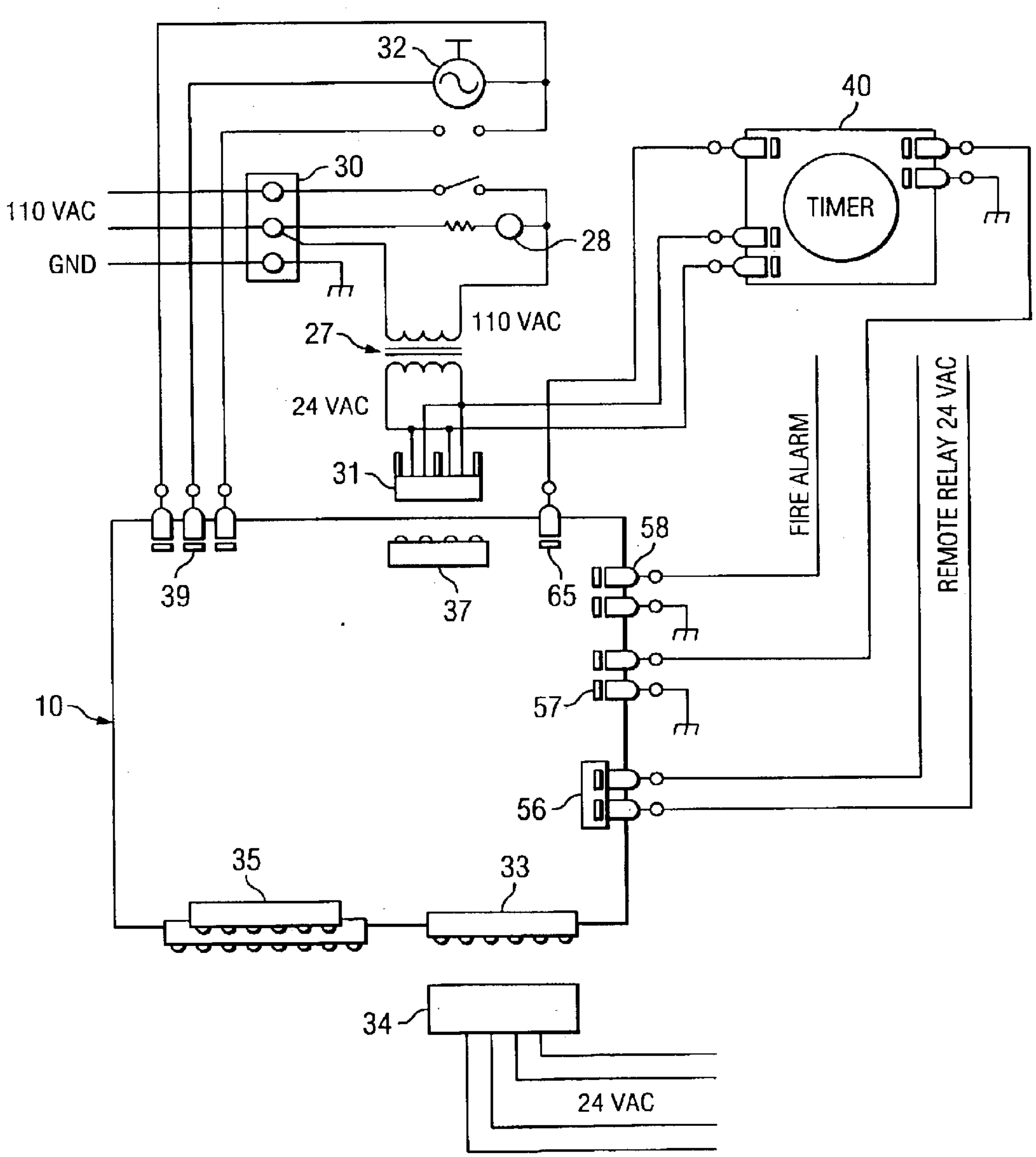
FIG. 8A displays the wiring diagram when the digital timer is utilized.

There are, of course, instances where a school building or facility does not have "EMS". In those cases and as illustrated in FIG. 8 with respect to another embodiment, an optional conventional digital timer 40 is mounted on the secondary door 9. This timer will activate and deactivate the service panel and utility controller at the programmed time intervals. Because this timer is located within the service panel at utility controller 8, unauthorized times of activation cannot be programmed. FIG. 8A illustrates the wiring for this optional conventional timer. Alternative DC power terminal 65 provides a DC signal that can be routed through the digital timer. When the timer determines a permissible operation time, then the DC signal is sent through "EMS" terminal 57 thereby activating the electronic controller.

There are various possibilities with regard to the many uses of the service panel of this invention and utility controller. The utility controller can be mounted remotely from the service panel. FIG. 9 demonstrates such a remote positioning. In this configuration, secondary door 9 is affixed to utility controller 8 with a continuous hinge 22. Line voltage wiring 53 and ground wire 54 enters the box through electrical conduit 29 and connected to power terminal 30. In this configuration, the power source for the solenoids and remote electrical relay is 110 volts A/C. Power plug 31 provides the 110 volt current as well as the low voltage power to the electronic controller at power plug 31, which in turn is inserted at controller power terminal 37. Solenoid terminal 33 and door panel terminal 35 are positioned vertically from electronic controller 10. Unlike previous illustrations, this alternate positioning of these terminals permits ease in connecting door panel plug 36. Control switches 41 and indicators (LED) 42 along with keyed switch 45 and panic button assembly 43 are positioned on secondary door 9. The utility controller is secured by means of keyed lock 44. Though not shown, solenoid plug 34 is connected to secondary terminal 38. From this terminal, field wiring is extended through electrical conduit 29 to the service panel. Combination switch/circuit breaker 28 and reset switch 32 along with low voltage transformer 27 are positioned within the utility controller. A grounding lug is used to ground the box.

Figure 9A:
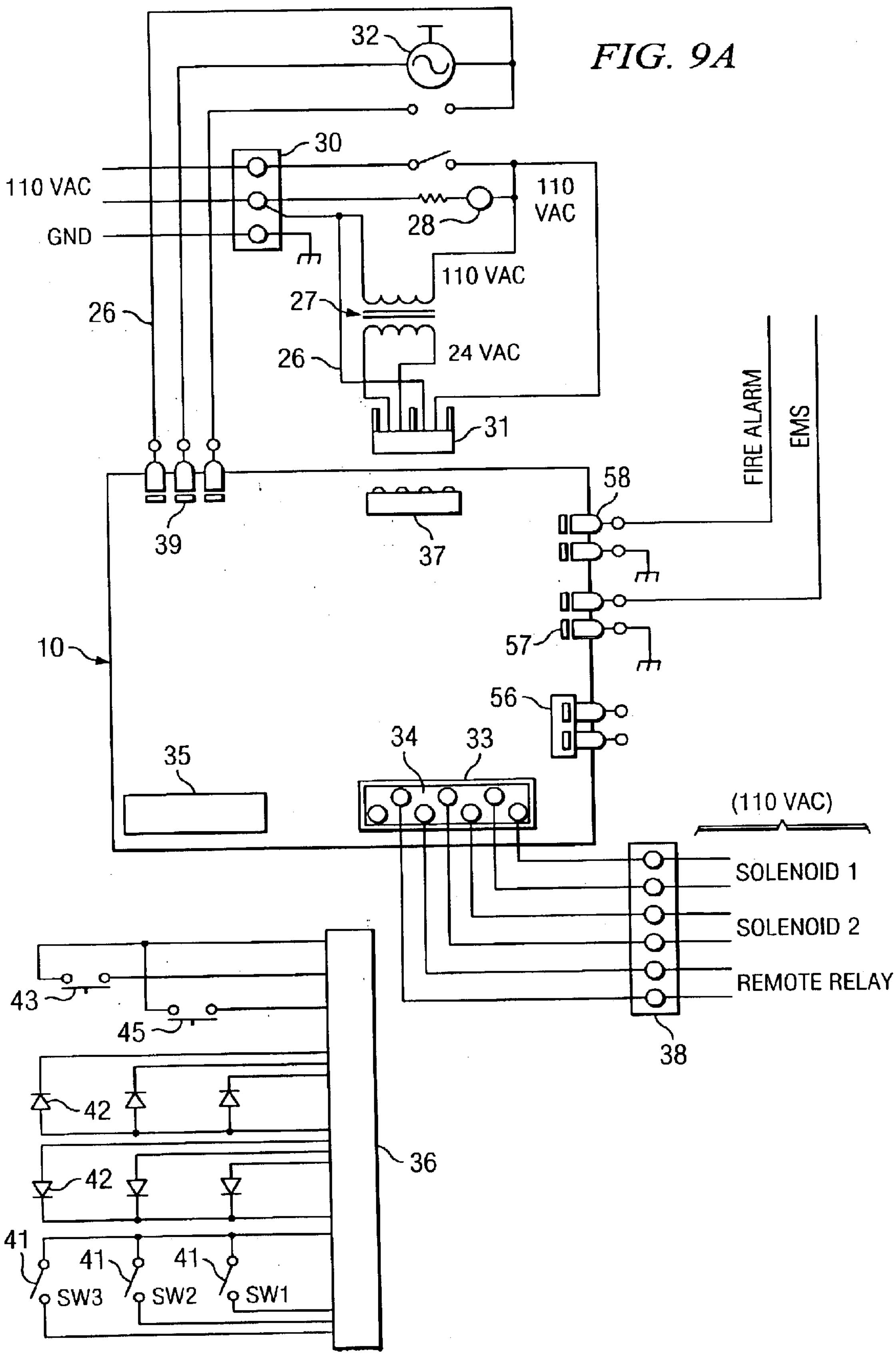

FIG. 9A is the wiring diagram for this alternate configuration and explains in detail this alternate means of utilizing the utility controller. As shown, remote relay terminal 56 is not used in this instance. Rather, power to control a remote relay is obtained through solenoid terminal 33. Solenoid plug 34 extends all control wires to secondary terminal 38 for field-connection to the remotely-located electrical relay and solenoids. Door panel plug 36 receives wiring from the three control switches 41, the six indicators (LED) 42 as well as panic button assembly 43 and keyed switch 45. When inserted into door panel terminal 35, these switches and lights will be interfaced with the electronic controller 10.

An optional conventional digital timer can likewise be used to regulate and control times of activation when the utility controller is located remotely from the service panel. FIG. 10 illustrates the positioning of the conventional digital timer 40 within utility controller 8. This FIG. demonstrates the power source for the solenoids and remote electrical relay being provided at power plug 31 by the low voltage transformer 27. This plug likewise is connected to electronic controller 10 at controller power terminal 37.

Figure 10A:
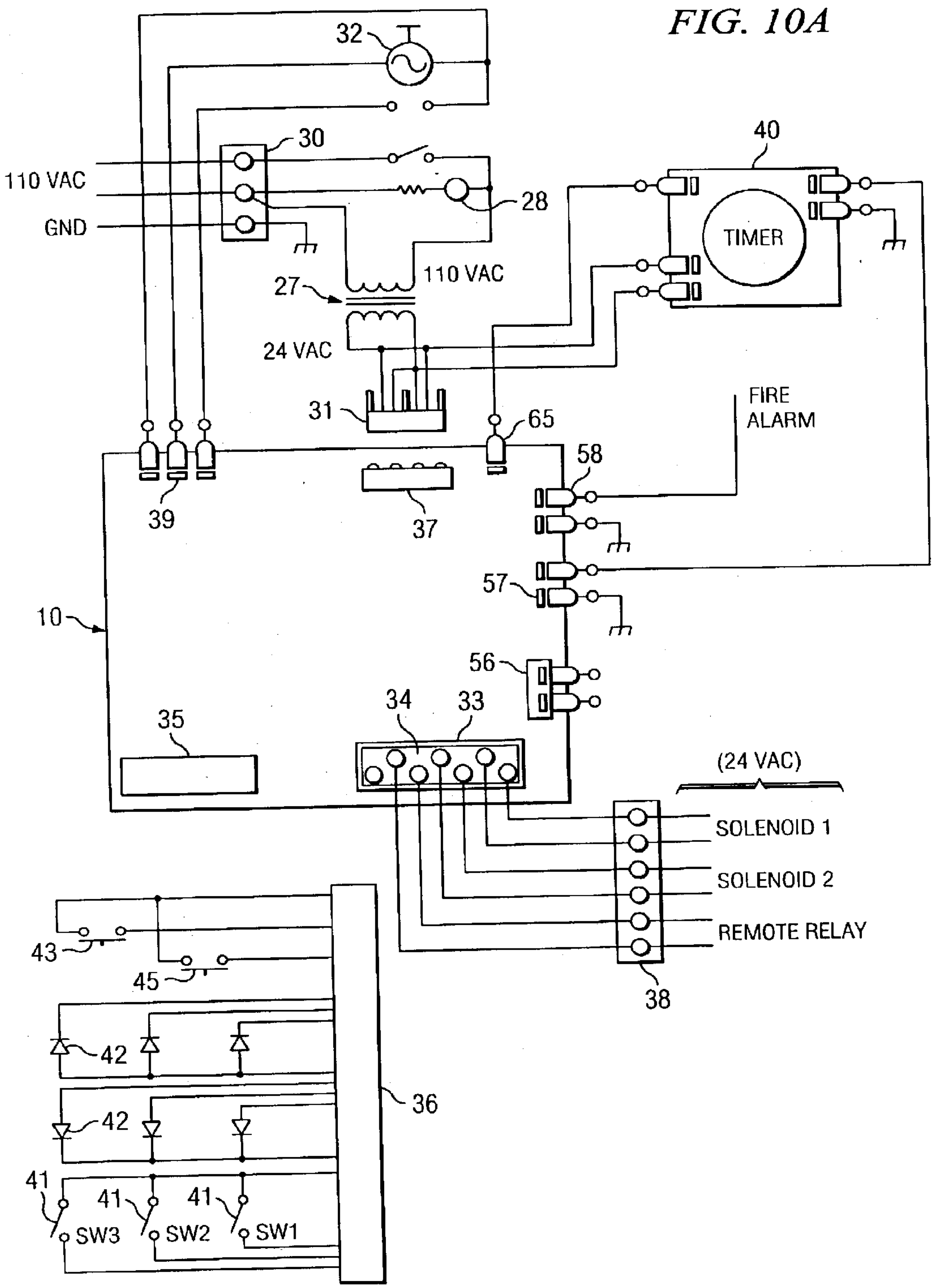
FIGS. 10A through 10C show the various methods whereby the digital timer will regulate the permissible operation times.

FIG. 10A is the wiring diagram for this alternate configuration. As detailed in prior figures, the digital timers provide a DC signal to the "EMS"0 57 during permitted time intervals. The timer is powered by 24 VAC.

Figure 10B:
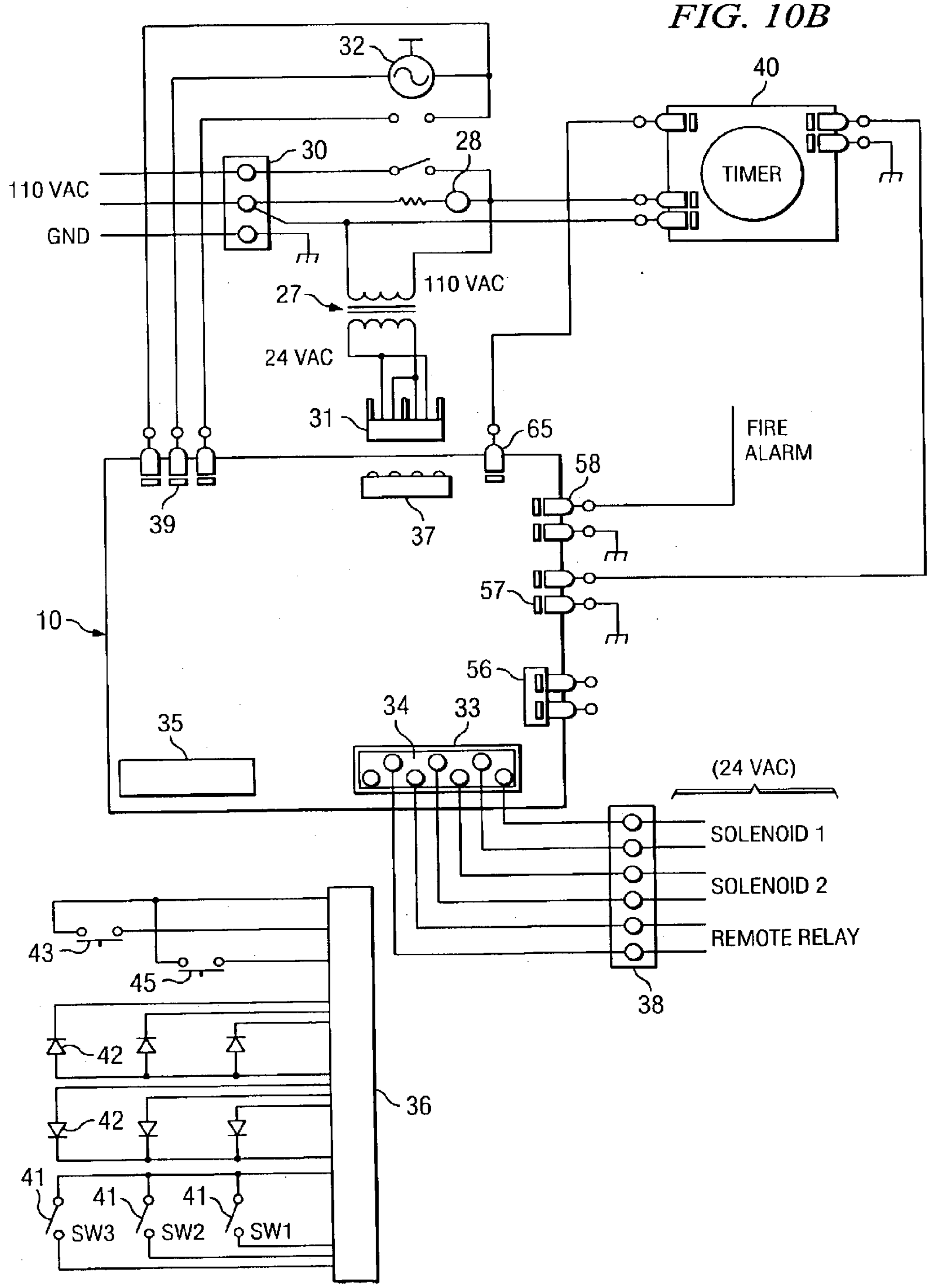

FIG. 10B is similar to FIG. 10A except that in this instance the timer is powered by 110 VAC.

Figure 10C:
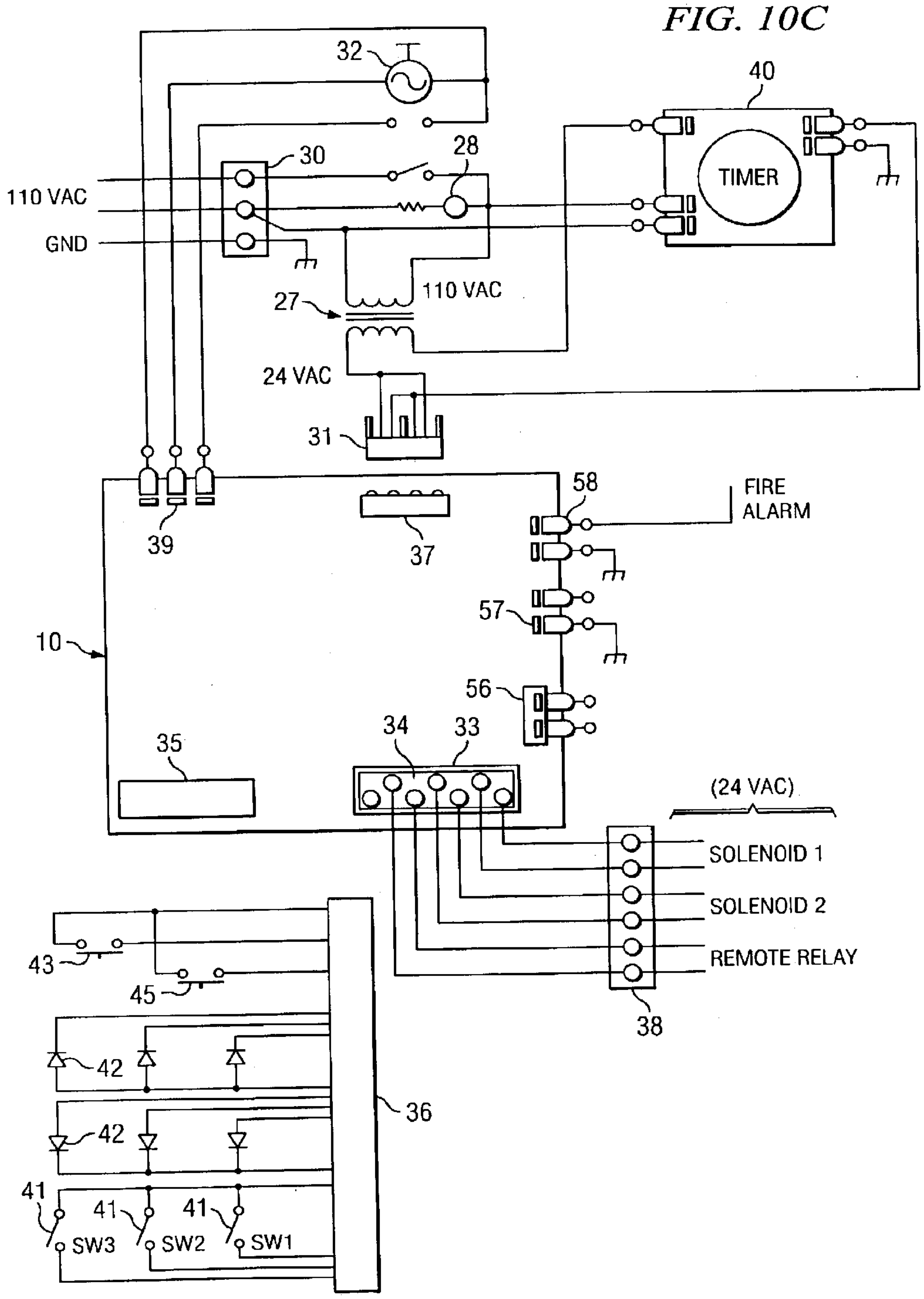

FIG. 10C likewise is similar to the two previous figures. However, in this instance, the timer is powered by 110 VAC but does not receive a DC signal from the electronic controller. The timer merely controls the electronic controller by denying the low voltage current to operate thereby disabling the controller and services during no permitted time intervals. When this method of controlling the controller is utilized, the second set of indicators (LED's) would not function as intended to notify the user in the event that a service was left active when a scheduled shutdown occurred.

As illustrated in FIG. 11, more than one electronic controller 10 is positioned within the same utility controller 8. Sufficient control switches 41 and indicators (LED's) 42 are positioned on secondary door 9 so as to permit the individual control of each controlled service. In this alternate embodiment, secondary terminal 38 contains sufficient connection points for the number of services controlled. With the exception of the added number of electronic controllers and required control switches, all other components are similarly shown in FIG. 9.

Figure 11A:
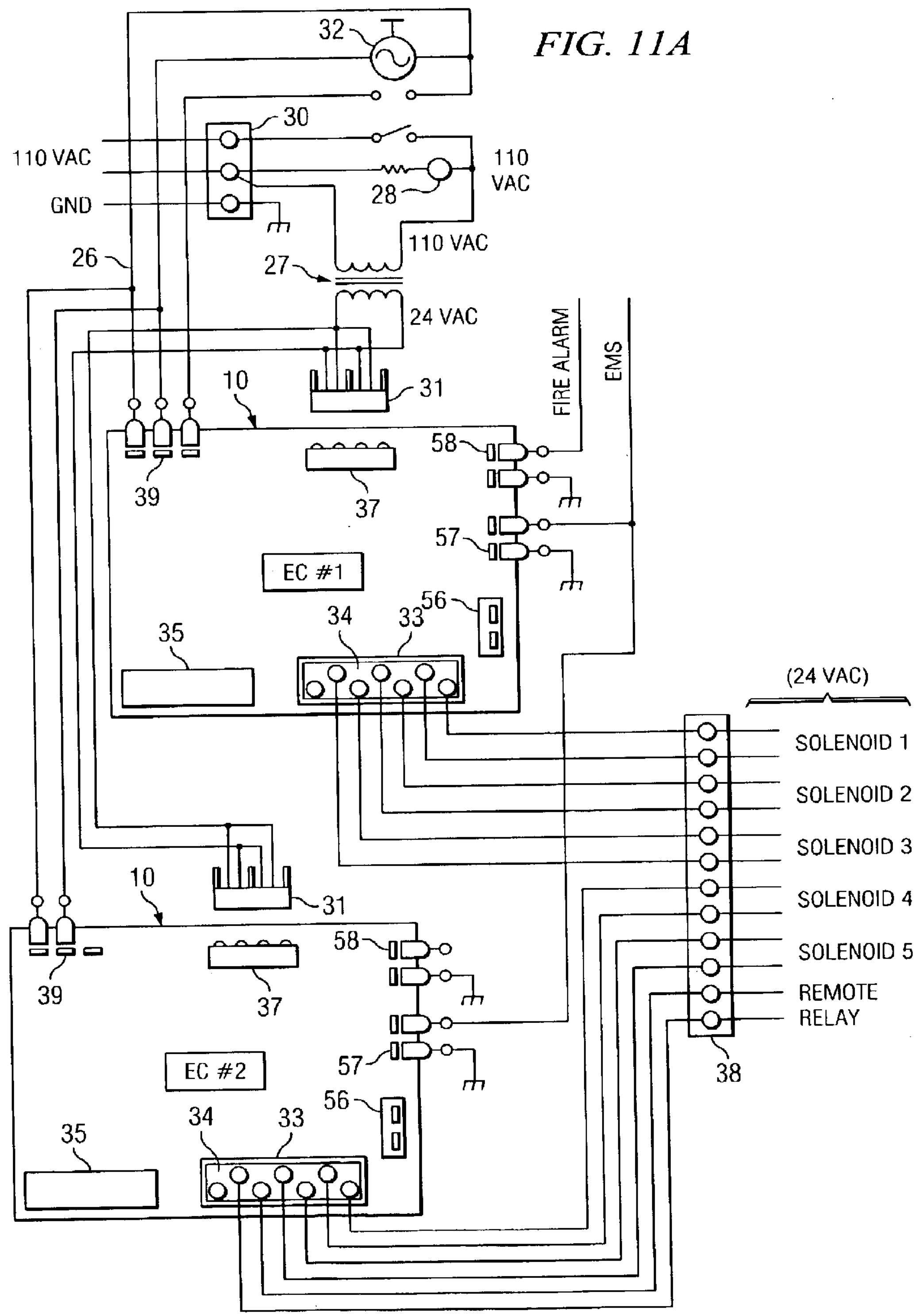
FIGS. 11 through 11C show the remotely-mounted utility controller with more than one electronic controller mounted within.

FIG. 11A is the wiring diagram for this alternate configuration, and as can be seen this configuration has two electronic controllers "EC #1" and "EC #2". Power to the controllers is provided through power plug 31 to each controller power terminal 37. Output current to activate the remote solenoids and electric relays are gathered at secondary terminal from each respective solenoid plug 34. These wires provide low voltage control current to solenoids within a remotely-mounted service panel. This control wiring is field-installed. Reset terminals 39 are parallel wired to reset switch 32 with only one controller providing the DC signal needed to illuminate the LED. "EMS"wiring, along with fire alarm wiring, is connected to each controller. Remote relay terminals 56 are not utilized.

Figure 11B:
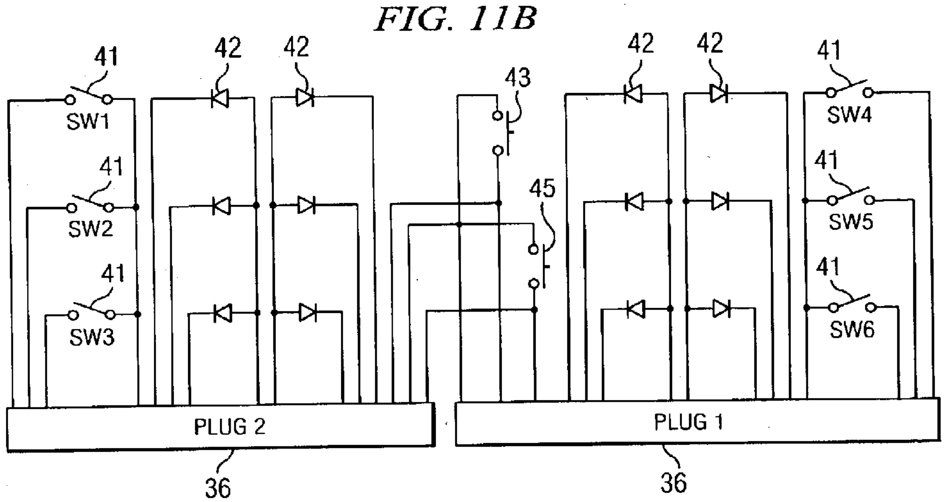

FIG. 11B is the wiring diagram for the secondary door. Each controller will be interconnected to the respective control switches 41 and the indicators (LED) 42 with the respective door panel plug 36. Keyed switch 45 and panic button assembly 43 are wired parallel to each door panel plug.

Figure 11C:
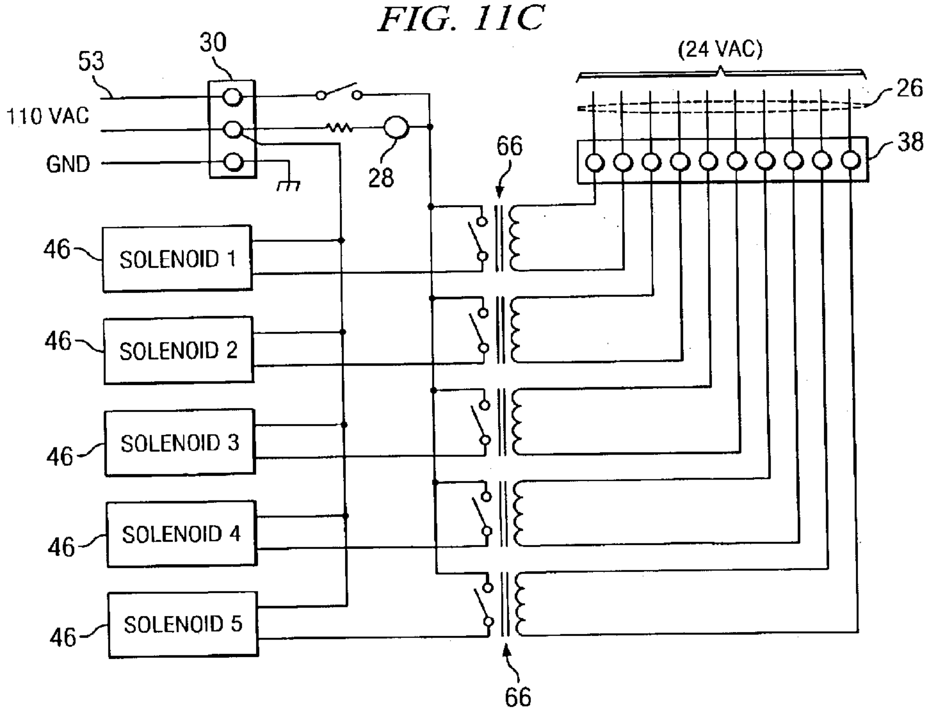

FIG. 11C demonstrates how low voltage wiring provided by the remotely-mounted utility controller is connected to solenoids 46 within the service panel. These low voltage wires are field-connected to a secondary terminal 38. From there, connections are extended to a series of remote relays 66. These relays are normally open, single pole relays having a 24 VAC coil. Energizing the relay activates the respective 110 VAC solenoid 46. Similar to utility controller wiring, field-installed line voltage wiring 53, as well as a grounding wire 54 are connected to power terminal 30. Combination switch/circuit breaker 28 provides the ON/OFF electric capability for the service panel power.

FIG. 12 illustrates another embodiment of the invention. Though similar to that shown in FIG. 11, an optional conventional digital timer 40 is placed on the secondary door 9.

Figure 12A:
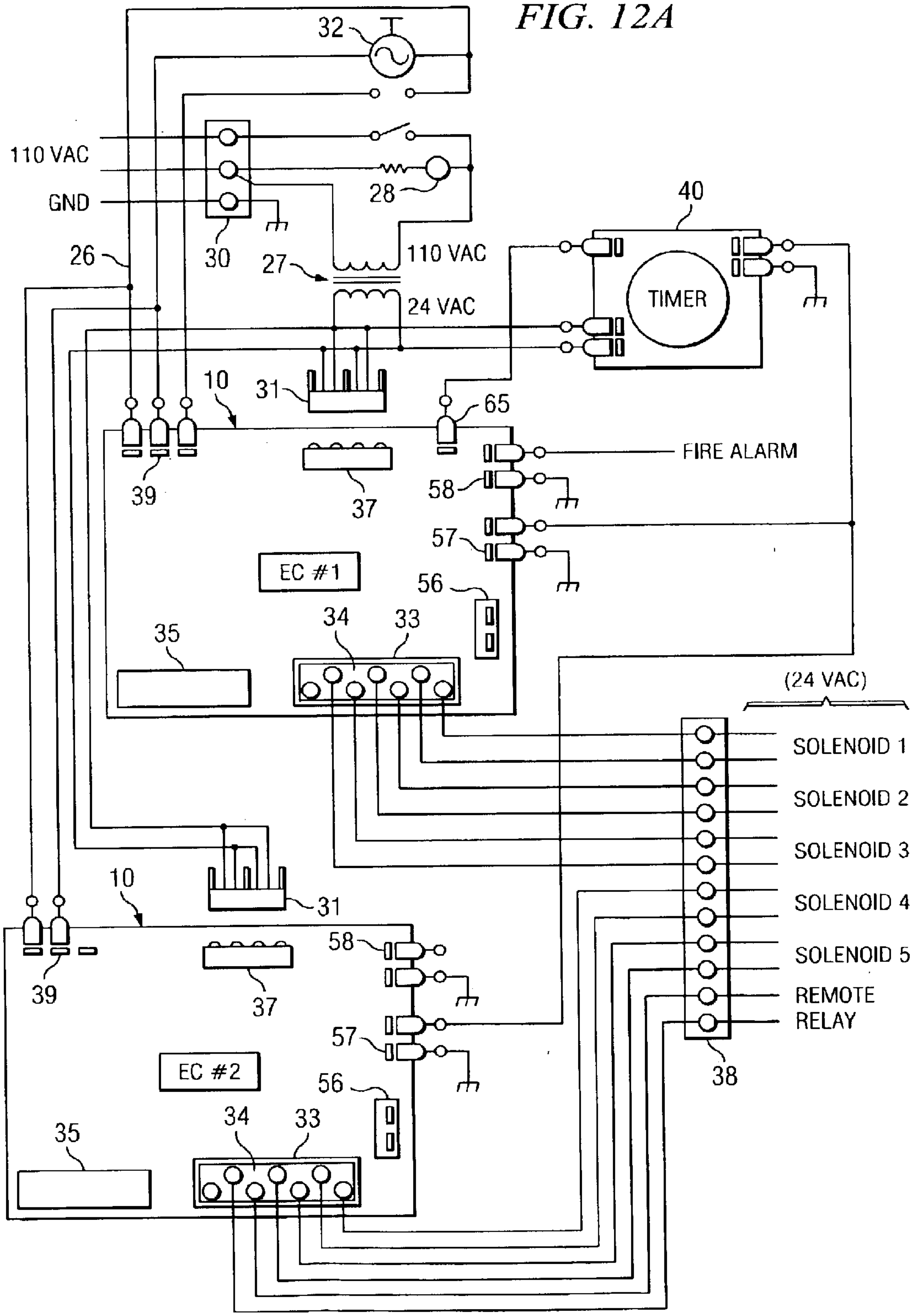

FIG. 12A is the wiring diagram for this alternate configuration. The conventional digital timer 40 utilizes DC current originating from alternative DC power terminal 65 to service as the "EMS"signal.

Figure 16:
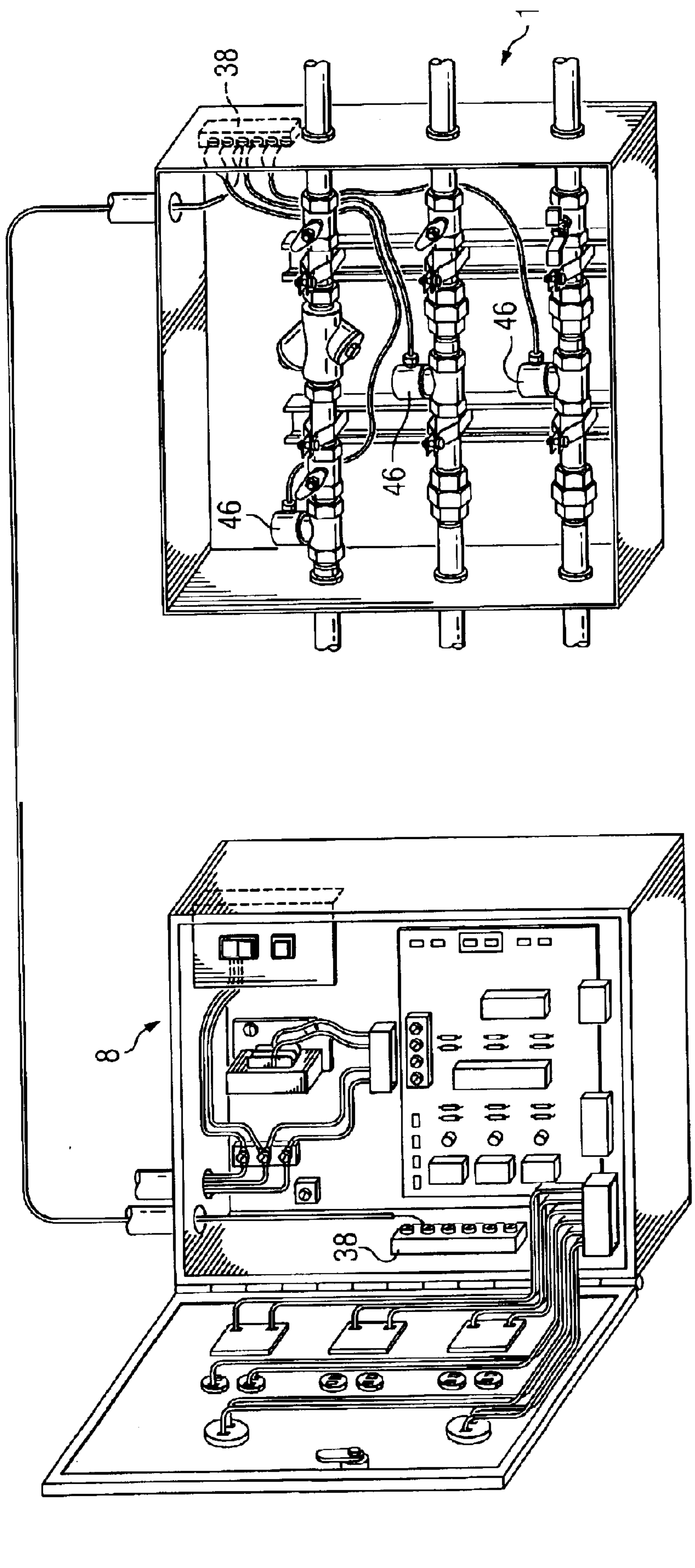
FIG. 16 displays the wiring technique for the service panel with the utility controller being mounted remotely.

FIG. 16 demonstrates the basic wiring and panel configuration when utility controller 8 is mounted remotely from the service panel 1. In this illustration, line voltage control wiring originates at secondary terminal 38 within the utility controller and is field-installed by craftsmen from it to the service panel and terminated at secondary terminal 38. Solenoids 46 are wired to the corresponding terminal post. Though not shown for clarity, a door panel assembly 4 is mounted onto the service panel to conceal the interior apparatus.

FIG. 17 illustrates a modified door panel assembly 4 used when the utility controller 8 is remotely mounted from the service panel 1. Door lever with lock 64 permits the door panel 6 to be locked and secured while permitting ease in opening the door when unlocked. The door lever with lock is of common construction intended for such purposes.

Figure 18:
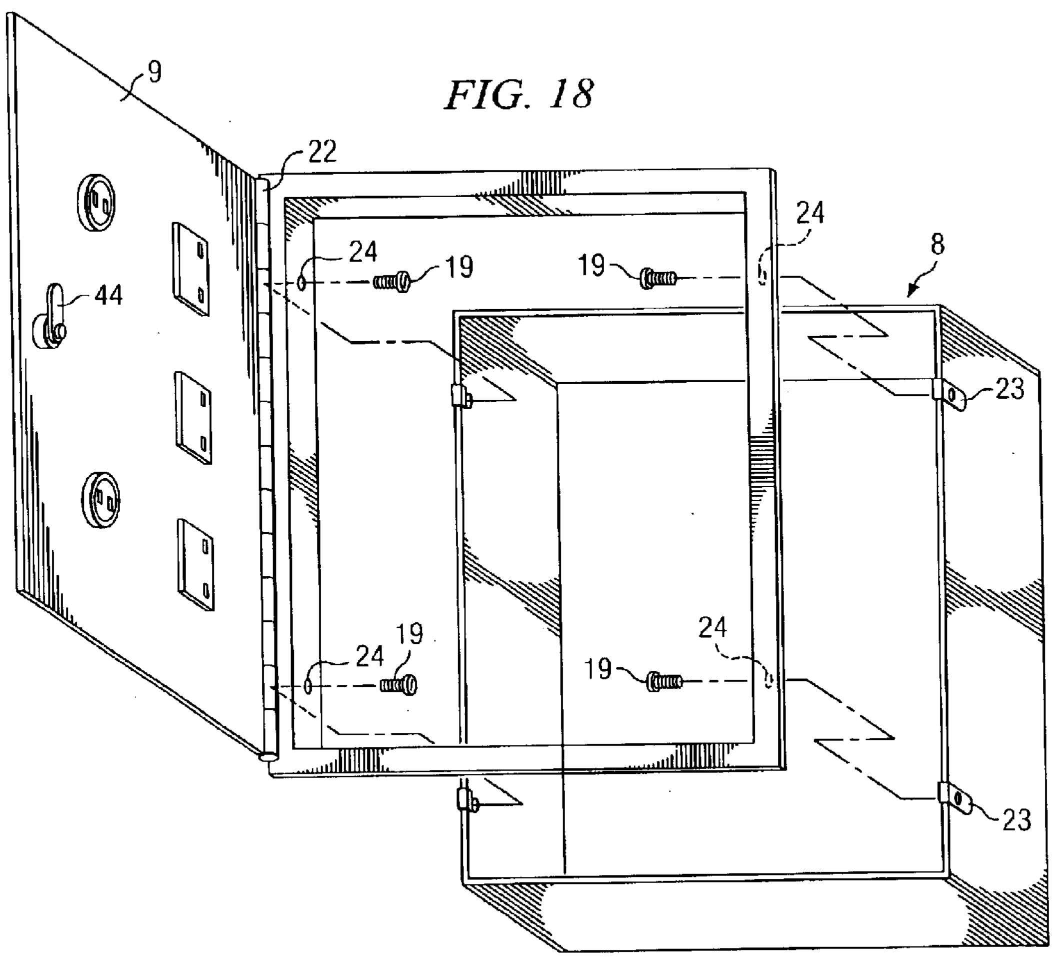
FIG. 18 is an alternative embodiment of the door panel used for the utility controller.

FIG. 18 illustrates a modified secondary door 9 used with utility controller 8 when building criteria dictates that there be a finished wall edge at the secondary door. Similar to door panel assembly 4, this modified secondary door has a doorframe without flange and mounting holes 24. Retaining clips 23 are positioned over mounting holes located on the utility controller. The secondary door assembly is then secured with machine screws 19. A continuous hinge 22 attaches the door to the frame and a keyed lock 44 secures it in place.

From the description, the many advantages of the present invention can be seen.

It is a very practical apparatus that will provide the means to control the various services typically needed in a science classroom.

It prevents unregulated use of the controlled services.

It prevents unauthorized entry to the secured compartment.

It will automatically disengage during non-scheduled periods.

It will sound an alarm in case of emergency.

Although a person of authority must activate a service, it permits persons without that authority to deactivate the service.

It will indicate an improper shutdown of controlled utility services if the "EMS" shuts down the utility controller while a switch is in the active state.

The manner of installing and operating the service panel with utility controller is unique to previous applied methods and apparatuses.

As illustrated in FIG. 7, the service panel is mounted in the wall cavity during the rough-in phase of construction. This permits the connection of each service pipe to the cut-off assemblies. The line voltage wiring is also installed with required conduit during this phase. However, no other electrical or finished components are installed.

FIG. 7A shows the final step to complete the assembly of the service panel. Once the field electrical connections are made within utility controller 8, the utility controller can be installed and then closed. Once door panel assembly 4 is mounted onto the service panel, the final wiring connections are made by inserting the door panel plug 36 into the door panel terminal 35. The combination switch/circuit breaker is turned to the ON position, then the panel is locked.

As illustrated in FIGS. 4B and 4C, respectively, either low voltage wiring 26 or line voltage wiring 53 is connected to the electronic controller 10. These wires extend through field-installed electrical conduit 29 to a field-installed junction box located in the ceiling space above the laboratory service panel. From this point, the electrician would extend the wiring to an electrical relay that he provides and mounts in a separate service panel. This remote electrical relay will control the various electrical outlets within the science classroom. Also, "EMS" wiring is extended through conduit to the "EMS". Likewise, wiring is extended to the building fire alarm system.

Once installation and assembly are completed, the service panel with utility controller is ready to be placed in service.

To activate the individual services that are controlled by the service panel and utility controller, the "EMS" must first be in the active state. Once that is done, it is necessary that the keyed switch be turned to the ON position. At this point, control switches become active and individual services can be energized.

The turning ON of these switches energizes a relay located on the electronic controller. This relay in turn energizes the service control mechanism. In the case of the electrical service, this mechanism is a field-installed electrical relay remotely located in a separate service panel.

The water and gas are activated by the solenoids located within the control panel. This design feature enables ease in maintenance and service to the systems because manual cut-off valves 48 and 47 as shown on FIG. 2 are within the service panel. Further, because there is easy access to the cut-off valves, the plumbing services can be interrupted during extended periods of non-use of the school facility.

The service panel is secured from unauthorized entry by the keyed lock. Access is gained by unlocking and opening the door panel. Once opened, the combination switch/circuit breaker is turned OFF prior to any maintenance procedures.

Once the control switch energizes services, the momentary keyed switch returns to the OFF position and is removed without disrupting the active services. These services will remain active as long as the control switch remains in the ON position. Once a control switch is turned OFF, then the service returns to the non-active state. To re-energize the service, it is necessary to re-insert the key and again turn the switch to the ON position. This design feature prevents unregulated use of the individual services.

As before mentioned, the means by which the utility controller regulates the time intervals for the service panel to be active or inactive is by this inner connection to the "EMS". Since a conventional "EMS" will turn ON and OFF such equipment as heating and cooling air units or "HVAC", it is practical for the same signal sent to activate this equipment to likewise activate, or in like deactivate, the service panel and utility controller. The electronic controller is the means by which this becomes possible.

Also as shown in FIG. 6A, if the panic button assembly 43 is pressed, the controller will go to the "1111" state and requires it to be reset to the "0000" state before any services can be activated. This resetting is accomplished by the pressing of reset switch 32. Because this reset switch is located behind the door panel 6, it becomes necessary for authorized personnel to first unlock and open the panel door and then to press the reset switch.

Thus, it is seen that the service panel with utility controller of the present invention provides a practical means of controlling the various services needed in a science classroom while providing a high level of security and safety for the students that occupy the classroom. Further, the presence of the panic button ensures that in the event of an emergency, an alarm can be sent and because the reset button is located within the secured service panel, any emergency will not go unnoticed. The advantages of this design becomes clear by following these two examples:

Example 1: Suppose that while performing a science experiment, a student accidentally sets his note pad on fire. The panic button is pressed and the fire alarm sent. Clearly, it would be inappropriate for anyone other than someone of authority to determine that the condition that brought on the alarm no longer existed.

Example 2: Now suppose that a student elects to be mischievous while the instructor is away from the classroom. The student presses the panic button and sends the alarm. It seems reasonable to assume that the administrator of the school would want to know from which classroom the false emergency originated. Because the students as well as the instructor are denied access to the interior of the service panel, then the guilty student is prevented from resetting the panel. Hence, this design feature serves as a deterrent to this form of mischief.

The "EMS" feature is an assurance that the service panel with utility controller can only be activated during pre-specified times. Typically, the "HVAC" in school buildings are monitored and controlled by an "EMS". These "HVAC" systems are activated just prior to the commencement of the school day and deactivated at the end. The same signal used to activate the "HVAC" likewise enables the utility controller. However, the utility controller has an added safety feature. "HVAC" should turn ON and OFF on command. The utility controller is designed to be activated only by demand. For instance, if one control switch on the door panel is left in the ON position at the end of the classroom day, a deactivate signal from the "EMS" will deactivate the utility controller thereby deactivating the service panel. However, assuming that the next active interval is one hour prior to the commencement of classes, then the "HVAC" would be energized or become active. But the service that was left in the ON position would not likewise become active. This is due to the design of the source code of the electronic controller. It will be appreciated from the state controller diagram of FIG. 5, a deactive signal from the "EMS" returns the logic program to the "0000" state. In this state, it is necessary to re-energize the controller by inserting the key into the keyed switch and turning it to the ON position. In this described situation, the classroom instructor would learn that a control switch was left in the ON position because the lower indicator would be illuminated.

There may be instances where a school building does not have a fire alarm system. Because the design of the electronic controller is such that this is permitted, the service panel with utility controller will function properly. All controlled services will be deactivated by the pressing of the panic button and the panel will require a reset before it becomes active, only an alarm signal will not be sent.

Further, if desired, by building design that the panic button assembly be committed, then its absence will have no adverse affect in the operation of the service panel and utility controller. In such a case, the ability to deactivate the service panel by pressing a panic button will be denied. However, in some instances, building design that a panic button assembly be field-mounted in a remote location but still connected to the service panel necessitates it. This remotely-located panic button when connected to corresponding pins at door panel plug 36 will readily be integrated into the system just as though it were an integral part of the service panel and utility controller.

Figure 14:
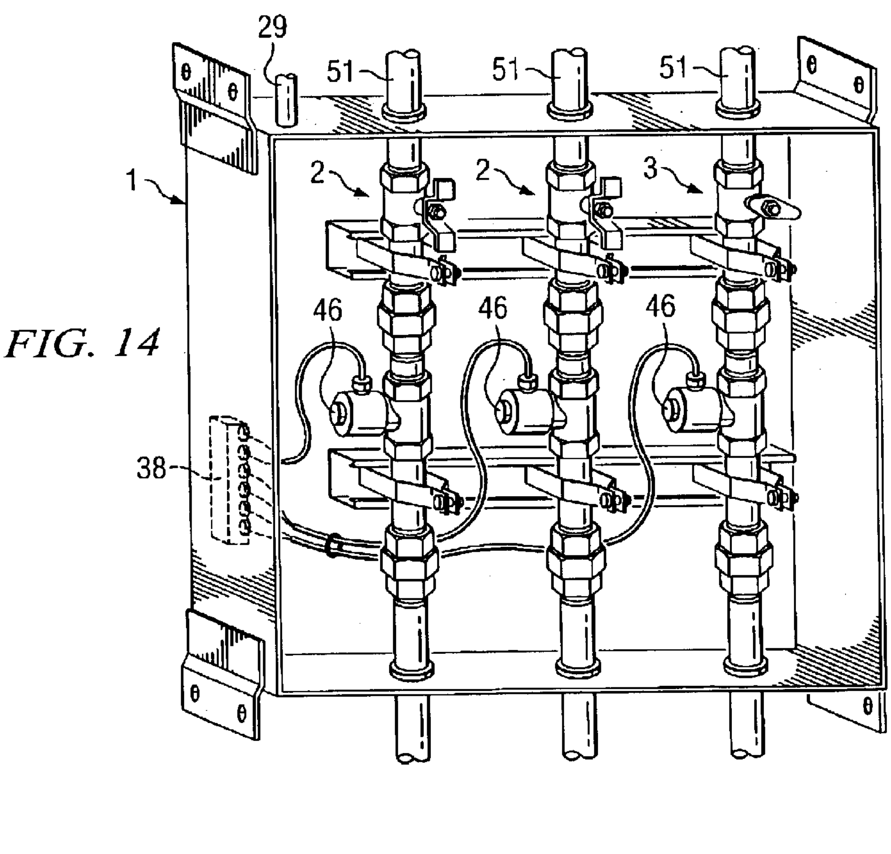
FIG. 14 shows this same variation but with three cut-off assemblies within the service panel.

Though the services described are the most commonly used services in school science classrooms, it should not be construed that the use of the invention be limiting in scope. For example, any gaseous or liquid service can be controlled. As illustrated in FIG. 14, three (3) services are controlled in the service panel 1. In this figure, the service piping 51 represents a gas cut-off assembly 3, and two (2) water cut-off assemblies 2, one which provides cold water to the science room while the other provides hot water. The service panel is of sufficient size to permit the three (3) piping assemblies. However, by enlarging the service panel, a fourth or even a fifth cut-off assembly can be easily added. A virtually unlimited number of services can be controlled by the utility controller. These added assemblies can control services such as oxygen or nitrogen. Control wiring is field-installed from a remotely-located utility controller (not shown) through electrical conduit 29. These control wires, either low voltage or line voltage, are connected to secondary terminal 38. As illustrated, each solenoid 46 is wired to the corresponding terminal post. Though not shown for clarity, a door panel assembly 4 is mounted onto the service panel to conceal the interior apparatus.

Also, because the electronic controller is modular in nature, a series of service panels can be electronically linked so as to provide controlling service to a seemly unlimited number of individual services.

Figure 13:
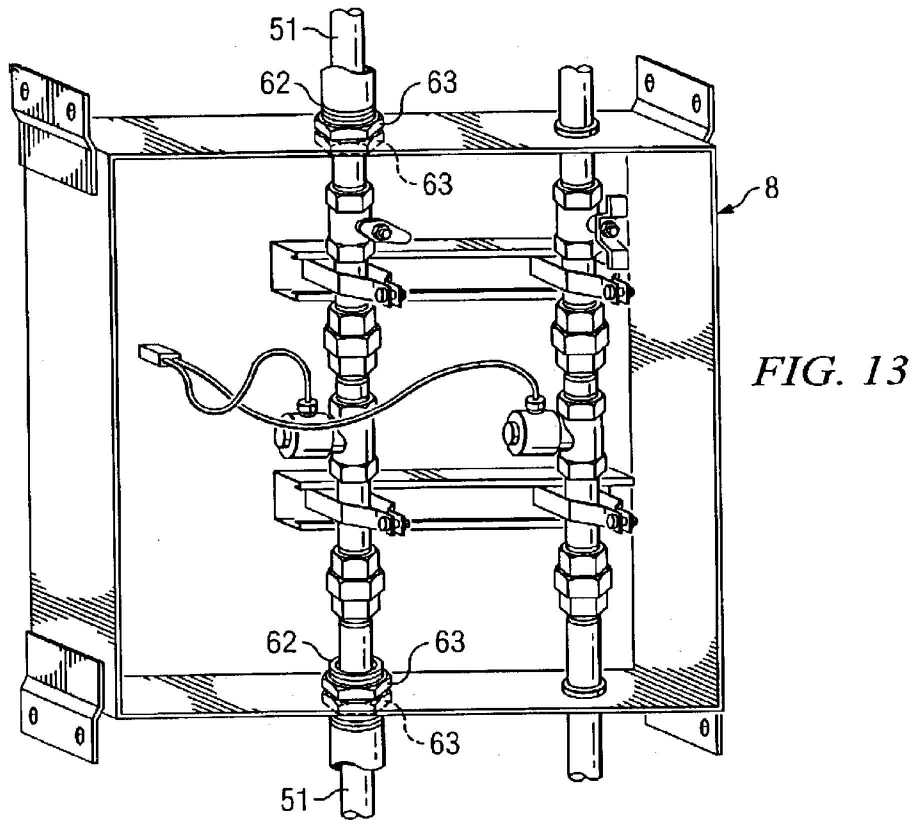
FIG. 13 shows a variation of the service panel with the utility controller mounted remotely.

As before mentioned, often it is the requirement of a building that natural gas piping be sleeved. This sleeving permits potentially dangerous gas that might leak from the gas service piping to be expelled to the outside of the building. This method of installing natural gas piping is a common occurrence. As demonstrated in FIG. 13, a threaded nipple 62 is affixed to service panel 1 with two (2) locking nuts 63. These locking nuts are common electrical lock nuts. The threaded nipple and locking nuts are of sufficient size to permit passage through the sleeving material of a natural gas service piping 51. The external sleeving which is field-installed by craftsmen is typically steel or plastic pipe and fittings. The threaded nipple permits either material to be used. This alternate embodiment of the service panel permits this sleeving.

As is frequently the case, it is advantageous to provide a remotely-located master control panel to control the services to a group of closely-located science rooms. This master control service panel is typically located in a central location. The service panel easily adapts for such master control. As demonstrated in FIG. 15, the service panel 1 of sufficient size houses a common backflow preventer 59. In this modified version of a water cut-off assembly 2, the solenoid 46 is positioned after the backflow preventer. The second assembly is a gas cut-off assembly 3 while the third represents another water cut-off assembly 2 providing hot water to the science room. The service piping 51 is arranged horizontally within the service panel. Control wiring is field-installed from a remotely-located utility controller through electrical conduit 29. These control wires, either low voltage or line voltage, are connected to secondary terminal 38. As illustrated, each solenoid 46 is wired to the corresponding terminal post. Though not shown for clarity, a door panel assembly 4 is mounted onto the service panel to conceal the interior apparatus.

Another embodiment of the invention enables in-the-field modifications of the operating configuration of the system of this invention. Additionally, auxiliary and remote circuits can be added, thus enabling the control of various apparatuses such as exhaust fans, fume hoods, etc. For example, these auxiliary circuits can serve to activate exhaust fans for the purposes of purging an area during an emergency. Another embodiment, includes a radio frequency "RF" hand-held remote control which permits the user to activate and deactivate the various circuits from a remote position. According to still another embodiment, the separation of the utility controller from the controlled devices is advantageously exploited to allow even greater flexibility. Components of the system in the following discussed embodiments which are the same as in the preceding discussed embodiments will be identified by the same reference numbers.

Figure 19:
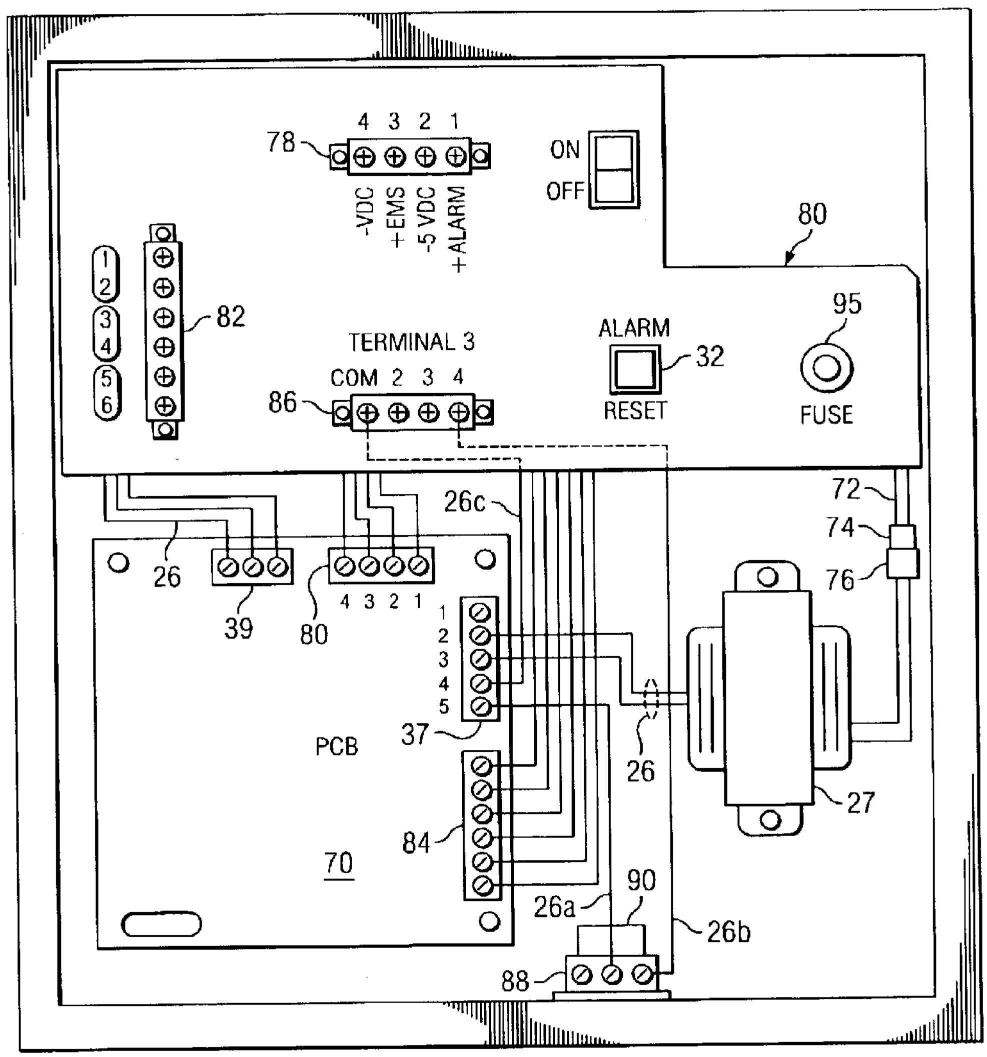
FIG. 19 illustrates alternate embodiments of a utility controller according to the teachings of the present invention.

Referring now to FIG. 19, the component layout and wiring configuration of the utility controller of this invention is generally discussed. A more detailed discussion of the various features of the utility controller is included hereinafter. As shown, low voltage transformer 27 is advantageously located adjacent to electronic controller printed circuit board "PCB" 70. Line voltage (such as for example 110V) wiring leads 72 terminate at transformer socket 74 which is connected to mating transformer plug 76. Low voltage wiring from the reset switch 32 is connected to reset terminal 39 in the same manner as discussed above with respect to FIGS. 4A and 4B. Wiring from integrated systems terminal 78 is terminated at integrated systems connector 80 on PCB 70. Alarm outputs may, for example, be connected to posts 1 and 2, and an "EMS" (Energy Management System) input may be connected to posts 3 and 4 of system connector 80. Wiring from the output terminal 82 terminates at output connector 84 on PCB 70.

Low voltage wiring 26 from the transformer is connected to power terminal 37 on the power controller PCB 70. Low voltage wiring for the auxiliary terminal 86 originates at pin 5 on terminal 37, and is connected to output terminal 88 at pulse relay 90 by wire 26A. The pulse relay 90 is mounted onto a printed circuit board and positioned at the base of the enclosure. A second lead 26B extends from the output terminal 88 which is connected to the normally opened terminal of relay 90, and terminates at one of three output posts at terminal 86. Low voltage wiring 26C also originates at post 4 of terminal 37 and is routed to the common post (1) at auxiliary circuit terminal 86. Integrated systems, output circuits, and, if applicable to the configuration, auxiliary circuits may be in-the-field connected to terminals 78, 82, and 86 respectively.

FIG. 20 is a representative image of printed circuit board "PCB" 70 illustrating locations on the board of the various components. The components, excluding those for the RF circuitry, are listed in Table 3. The RF components appear in Table 4. Connection 92 provides for a 5 VDC output for use by the operator of the controller for in-the-field connections for various add-on components. Connector 94 likewise permits additional 5 VDC and ground outputs. As will be discussed later, connector 96 provides for future integration of a secondary control device to be integrated with the system such as an input from an alarm system.

As mentioned above, the enhancements of this embodiment enables in-the-field modifications to the operating configuration of the device. Referring to Table 3 and FIG. 20, the optical isolator 98 is an AC "alternating current" style so as to permit both 5 VDC and 24 VAC "EMS" enabling signals. Resistors 100 and 102 are connected in parallel. Jumper terminal 104 allows input connections to both resistors. Dependent upon the requirements of the desired setup, a jumper may be provided across jumper terminal 104 to change the resistive value to the input signal for the two independent signals. Placing the jumper across the pins on jumper terminal 104 configures the PCB 70 for 5 VDC or VAC input while omitting it configures it for 24 VAC "EMS" input.

TABLE 3

PCB Components

| Reference Designator | Component Type | Function Provided |
|---|---|---|
| 108 | ICT7540 | Programmable logic device "PLD" |
| | LED | Light emitting diodes, with internal current limiting resistors |
| | Crystal Oscillator | Generates buffered clock output |
| | Zener diode | Voltage clamp |

TABLE 3-continued

PCB Components

| Reference Designator | Component Type | Function Provided |
|---|---|---|
| | Resistor | Energy dissipation |
| | PTC Resistor | Auto resetting fuse |
| | MOV | Surge Suppressor |
| | Resistor pack | Green LED intensity control |
| | Resistor pack | Red LED intensity control |
| | 74AC540 | Octal current driver, 64 mA |
| | Optical Isolator | Isolation from external signal inputs |
| | Resistor | Current limiting resistor, values determined by EMS signal being received from external EMS controller |
| | Resistor | Pull-up resistor, for use with open collector output of U4 |
| | Diode | Flyback diodes |
| | Resistor | Resistor Array |
| | Resistor | Resistor Array |
| | Resistor | Resistor Array |
| 180A, 180B, 180C | NPN | Transistor switch |
| | 5 VDC | DPDT Output Relays |
| | Regulator | Switch regulates incoming high voltage DC to low voltage DC |
| | Rectifier | Converts incoming AC voltage to an unfiltered DC voltage |
| | Diode | Schottky freewheeling diode |
| | Inductor | Power inductor |
| | Resistor | Part of R1/R2 voltage divider, selected to determine U8 output voltage |
| | Resistor | Part of R1/R2 voltage divider, selected to determine U8 output voltage |
| | Resistor | Frequency compensation resistor |
| | Capacitor | Low ESR capacitor, providing input bypassing |
| | Capacitor | Decoupling capacitor for shutdown pin of U8 |
| | Capacitor | Frequency compensation capacitor |
| | Capacitor | Frequency compensation filter capacitor |
| | Capacitor | Output bypass capacitor |

The two posts on jumper terminal 106 enable the user to configure how the reset switch 32 functions after a panic state has been initiated. By placing a jumper across the appropriate posts on jumper terminal 106, the door panel keyed switch, like the reset switch will advance, the "PLD" (Programmable Logic Device) 108 from the panic shutdown state "1111" as shown in FIG. 5 to the shut-down, but active state "0000". Omitting the jumper configures the controller so that reset from the panic state must be initiated within the enclosure at the reset switch.

Connector 110 permits another remotely-located panic button assembly which is wired to the PCB 70 to be integrated with the system. Pin 1 routes ground to the remote panic button assembly, and returns a ground signal to pin 2. Thus, as will be discussed later, by pressing the remotely-located panic button, the controller logic is advanced to the panic state in the same manner as pressing the panic button on the panel assembly.

Jumper connector 112 enables in-the-field configuration of the operation of the panic button on a hand-held remote operator. Placing a jumper across the left two posts configures the remote panic button operation to activate the panic state, thus providing an output alarm signal. Placing the jumper across the right two configures the operation to reset "EMS" only, thus disabling all output circuits without sending alarm.

Also as shown in area 114 of FIG. 20, and more specifically in the enlarged view of FIG. 20A, jumper wires may be connected (typically soldered) so that only two of the four available input posts at power terminal 37 are used to provide input and operating power. Low voltage wiring is thus routed through tracings on the PCB 70 to both the load and the power supply. This feature enables wiring for the auxiliary output terminal to be readily connected to the 24 VAC power source. As shown in FIG. 20A, two jumper wires 116A and 116B connect the two points in the wire tracings on the PCB 100 at terminal 37. The wire tracings 118A and 118B originate at posts 2 and 3 of terminal 37 (not shown) and terminate at terminals 120A and 120B. Also as shown, tracings from pins 4 and 5 of terminal 37 terminate at posts 122A and 122B.

As shown in FIG. 20B, the selective use of jumper wires 117 in area 124 enables control wiring from the door panel wiring harness connected to the door panel plug 126 to be configured for different purposes. As an example, omitting a jumper wire across terminals 128A and 128B opens the circuit going from pin 130 on plug 126 to the panic input on the PLD (Programmable Logic Device) 108. This will enable the wiring within the door wiring harness to be connected to an auxiliary control switch rather than a panic button, in instances where the panic button assembly is omitted on the door panel. Similarly, omitting a jumper wire across terminals 132A and 132B opens the circuitry to the second ground provided at pin 134 on plug 126 and thus to the door panel assembly. This will enable the second ground wire within the door wiring harness to be connected to an additional auxiliary control switch, in instances where either two auxiliary circuits occur, or where a single auxiliary circuit plus the panic button located on the door panel. Thus, at the door panel, ground connections for all switches would originate from a common ground pin. Also as shown, omitting a jumper wire across terminals 136A and 136B breaks the connection from pin 138 on plug 126 for the key switch 45 on the door panel assembly. Thus, with this arrangement, when the utility controller of this invention incorporates the radio frequency remote control feature as discussed below, two auxiliary circuits plus the panic button on the door panel may be enabled, while omitting the keyed switch.

As also shown in FIG. 20B, the use of jumper wires in area 140 enables the PCB 70 to be configured for standard or "RF" (radio frequency) operation. Jumper wires 142, shown as dashed lines from the center column of posts 144 to corresponding right hand column of posts 146, configure the system for standard operation, while the wires 148, shown as solid lines connected between the center column of posts 144 and the left hand column of posts 150, further enable the radio frequency circuitry to operate the door panel control switches. From plug 126, tracing 150A from pin 152 terminates at 144A (tracing 150B), from pin 154 terminates at point 144B (tracing 150C), and from pin 156 terminates at point 144C. Since the key switch and panic circuitry are intended to operate at either the door panel or by hand-held remote when the system is configured for panic and key operation, as illustrated at area 124 in FIG. 20C, jumpers in area 140, as discussed above, will not be necessary.

FIG. 20C shows the wiring interconnected points on the PCB between these strategic locations and the pulse relay to enable the pulse relay to perform various optional functions. For example, +5 VDC control power is provided at terminal 158, and ground is provided at terminal 160. The enabling signal for the key switch is provided at terminal 162. This point is integrated with the door panel key circuit so that the key switch on the door will activate the pulse relay circuit. The "EMS" signal is provided at terminal 164, and provides "EMS" shut-down of the pulse relay circuit when the "EMS" signal is withdrawn. The switch signal at terminal 132B is integrated at the PCB to the door panel so that an added control switch on the door will activate the pulse relay circuit. Terminal 128B provides a panic switch signal, but only when the panic button 43 has been omitted at the door panel and the jumper between terminals 128A and 128B is omitted. The alarm signal is provided from jumper terminal 166, and triggers the pulse relay for a purge or emergency exhaust configuration. Additional explanation of the uses of these terminals is discussed in the pulse relay descriptive portion of the specification.

The following discussion concerning the design and operation of the radio frequency circuitry of the PCB 70 will illustrate not only its function but also how the omission of components intended for use only when radio frequency is employed will not affect the operation of the PCB when configured for standard operation.

As discussed, adding selected components to the PCB 70 enables remote operation of the system using radio frequency. A five-button hand-held control allows activation and deactivation of the controlled services and also includes a panic button.

As illustrated in FIG. 21, reception of radio transmitted control signal from hand-held control 168 is accomplished through half wave antenna 170. The antenna is mounted exterior of the utility controller enclosure at the bottom surface, and is affixed with bulk-head fitting 172. Coax cable 174 extends from this fitting to connector 176 on PCB 70.

Hand-held controller 168 includes five buttons arranged in a circle, with four of them at the 3, 6, 9, and 12 o'clock positions, and the fifth in the center. The buttons located at the 9, 12, and 3 o'clock positions allow deactivation of the corresponding utility (circuit 1, circuit 2, circuit 3), and the button at the 6 o'clock position is the Key Switch input. The button located in the center is the Panic input. It is noted that a circuit may only be remotely turned "ON" if the Service Control Switch on the door panel is also in the "ON" position. Thus, when the remote Key Switch button is depressed, only the circuits that have the Service Control Switches on the door panel in the "ON" position will be activated. The particular arrangement of the five switches discussed above is, of course, only an example and the various functions could be assigned to any of the five switches as selected by the user.

Figure 22:
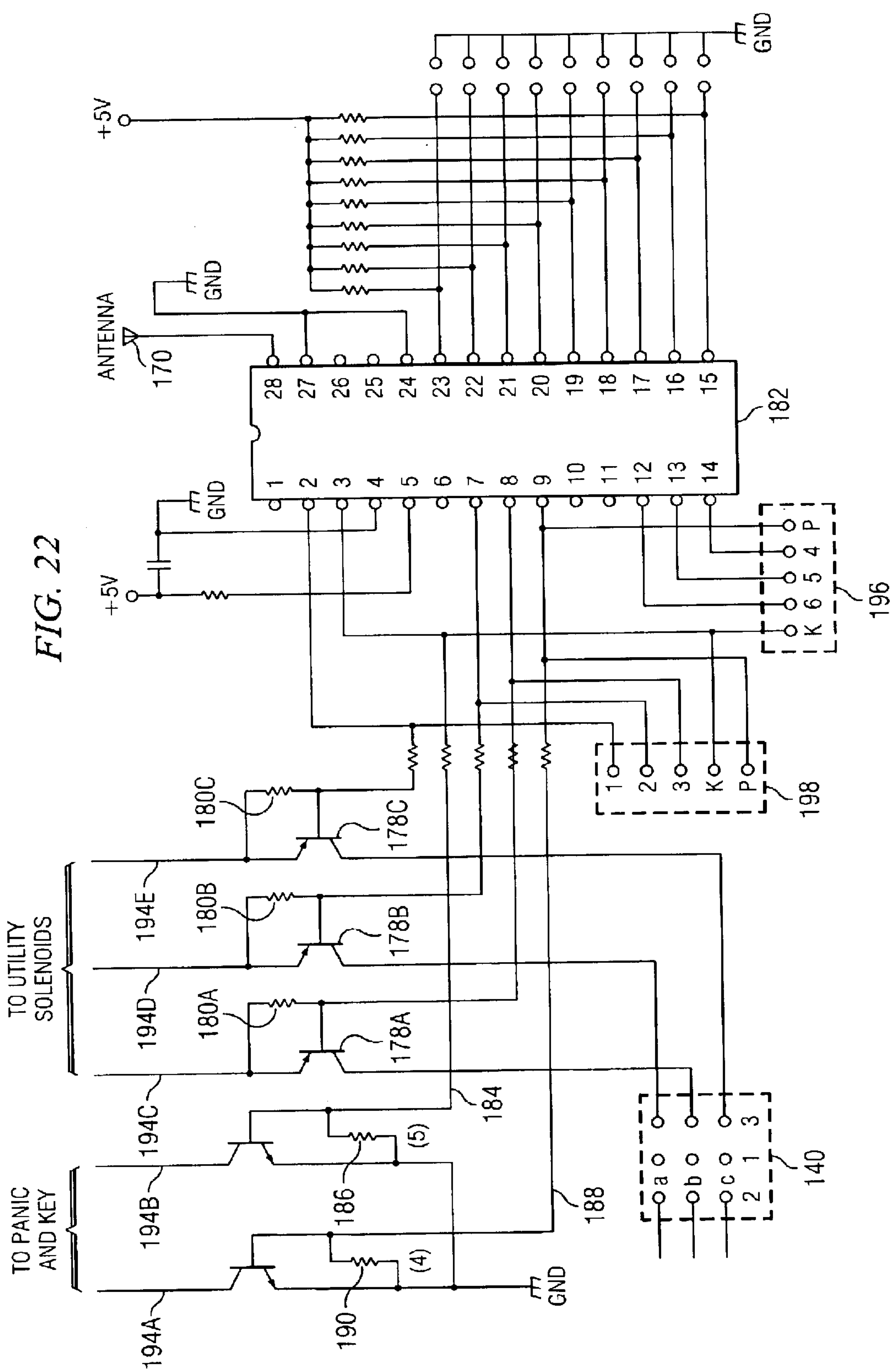
FIGS. 22, 22A, 23 and 24 are various circuit diagrams present on the PC board of FIG. 20.

As illustrated in the wiring schematic FIG. 22 for the RF portion of the PCB 70, the RF decoder outputs are effectively connected in series with the door panel control switch inputs so operation can be controlled by either the switches or the RF controller. Turning either the door panel control switch "OFF" or activation of the corresponding RF switch turns the appropriate transistor 178A, 178B or 178C off which allows the corresponding pull-up resistor 180A, 180B or 180C to take the signal to the logic device 182 high, which in turn switches the utility "OFF".

When the door panel key switch 45 is engaged or upon receipt of the appropriate RF command the input 184 to the logic device 187 is connected to ground. When released, the pull-up resistor 186 returns the signal to a logic high level. The panic switch works in the same way, pushing the panic button or activating the RF transmitter causes a momentary grounding of the input signal on wire 188, and releasing the button allows the pull-up resistor 190 to return the signal to a logical high state.

As discussed above, the user pre-sets the desired utility services or circuits to be enabled by turning on the appropriate Service Control Switches on the door panel. When the key button on the hand-held control is pressed or the door panel key switch is turned to the "ON" position, the PLD 108 will advance to the appropriate state and turn on whichever utilities had their Service Control Switches set to the "ON" position. Turning "OFF" any Service Control Switch that had been previously activated will disable the specific circuit. Likewise, pressing the corresponding button on the hand-held control will disable the circuit. Pressing the key button on the hand-held control will again re-enable the circuit.

The system uses an RF receiver chip with built-in decoder. The decoder can be selectively set to one of a large number of different addresses, (according to one embodiment, 512 addresses are available). The different utility controllers within a building or area are individually addressed. Therefore, a hand-held controller for a particular system would transmit an address set to the same code as the receiver. Thus, a hand-held controller in an adjoining room or area is prevented from changing the state of a nearby utility controller unintentionally. Jumpers at jumper terminal 104 shown in FIG. 20, are either set or removed to program the appropriate address at the RF decoder portion of logic device 182. The hand-held controller uses internal circuit traces that are opened or separated to program the appropriate address.

The RF receiver/decoder outputs an un-buffered active high signal when the address matches the one used on the hand-held control. This active high signal is buffered on the utility controller or PLD 108 by external pass transistors, which operate as switches. As discussed above, for the three circuits being switched, the appropriate transistor opens a connection to ground when activated, and for the Panic and Key Switch inputs the signals are connected through the transistor to ground. For this reason both NPN and PNP transistors are used. PNP transistors are used when the active output of the RF decoder needs to open a grounded connection, and NPN transistors are used when the active output needs to generate a grounded signal. Component designators and descriptions for the RF portion of the PCB are listed in Table 4.

TABLE 4

RF Components

| Reference Designator | Component Type | Function Provided |
|---|---|---|
| 182 | RF decoder | RF receiver and decoder |
| | Transistor | Transistor switch, connecting Key Switch and Panic signals to ground when activated by RF command |
| 180A, 180B, 180C | Transistor | Transistor switch, opening grounded switch signals from circuits when activated by RF command |
| | Resistor | Transistor base current limiting resistor pack |
| | Resistor | Base-Emitter resistor pack, for stability |
| | Resistor | Bias resistor, to lower RF supply voltage |
| | Capacitor | Decoupling/filter capacitor |
| | Jumper | 9-position jumper, used for setting receiver address |
| | Connector | Antenna input connector |

FIG. 22 further discloses area 140 that corresponds to the area 140 as illustrated and described in FIG. 20B. Wires 194*a*, 194*b*, 194*c*, 194*d* and 194*e* of this diagram correspond to wires having the same reference numbers as the schematic FIG. 23 for the logic/input portion of the PCB. Also, areas 196 and 198 are shown. Area 198 does not appear in FIG. 20 because the RF component 182 conceals it from view. These connection terminals along with the terminals in area 196 enable expansion of the RF capabilities of the controller by an additional three control circuits.

For example, there presently exists hand-held controllers capable of communication with the RF receiver which have eight total or three additional key buttons more than the five buttons shown in FIG. 21. The embodiment of the PCB 70, as discussed above, includes only three designated output circuits. This, of course, would limit the number of utilities that can be controlled to three. However, integrating or interconnecting two PCB boards enables additional circuits to be controlled by the RF circuitry.

Figure 22A:
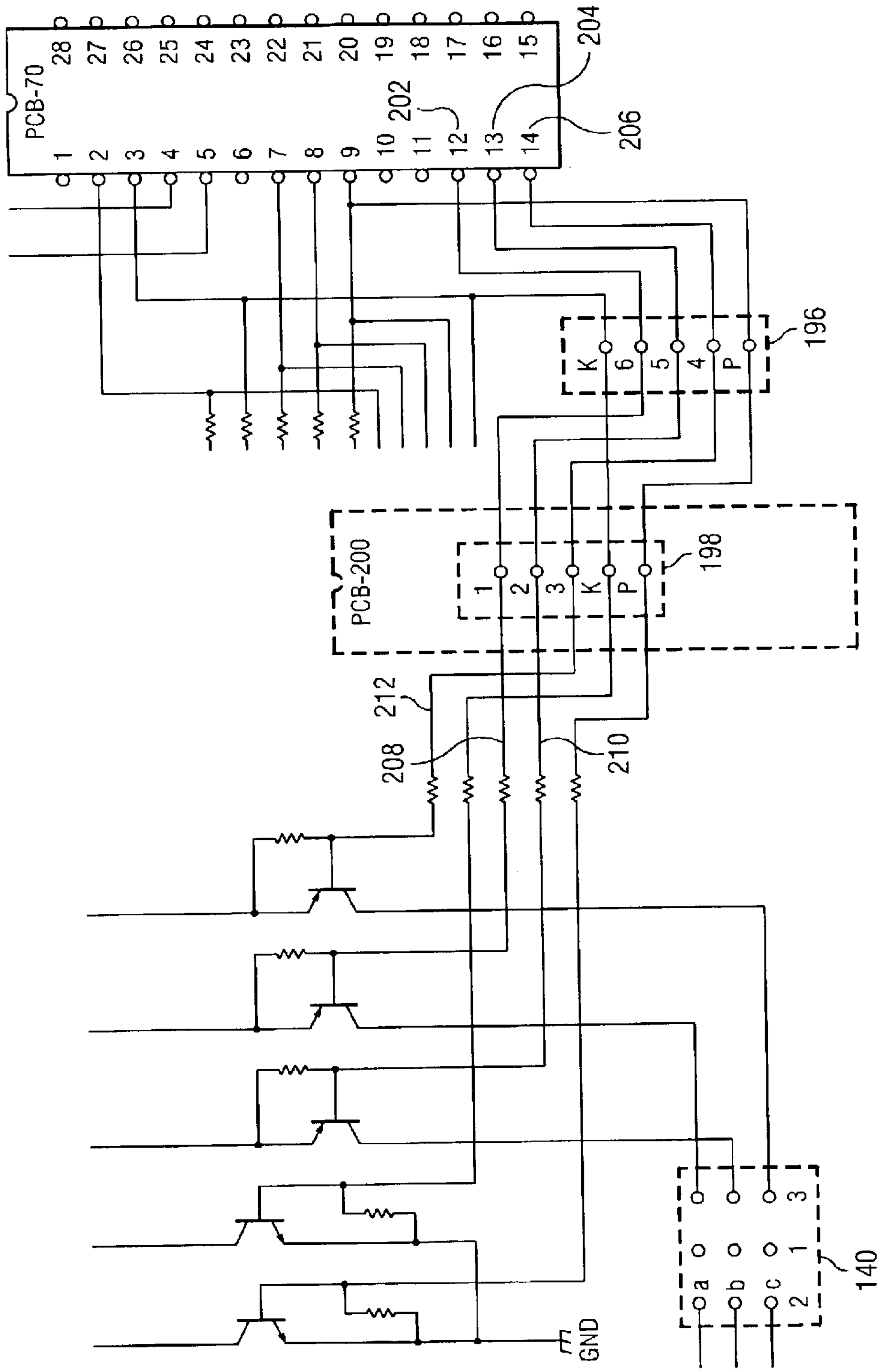

As illustrated in FIG. 22A, providing interconnecting wiring between area 196 on the primary board, PCB 70 to area 198 on the secondary board, PCB 200 enables the additional three buttons on the hand-held control to operate the three output control circuits on the second board. It is also noted that the step of interconnection permits the omission of many of the components on PCB 200 that are incorporated into the RF circuitry of PCB 100. That is, though not fully illustrated in the figure, all components including RF logic circuitry 182 as discussed and illustrated in FIG. 22 are present on PCB 70 in FIGS. 22 and 22A, while PCB 200 only includes those items or components in FIG. 22A that are shown.

The additional outputs 202, 204 and 206 from RF logic circuitry 182 on PCB 70 are connected respectively to the circuits 208, 210 and 212 on PCB 200. Since key and panic operation is common with both boards, these wiring configurations are in parallel as shown.

Figure 23A:
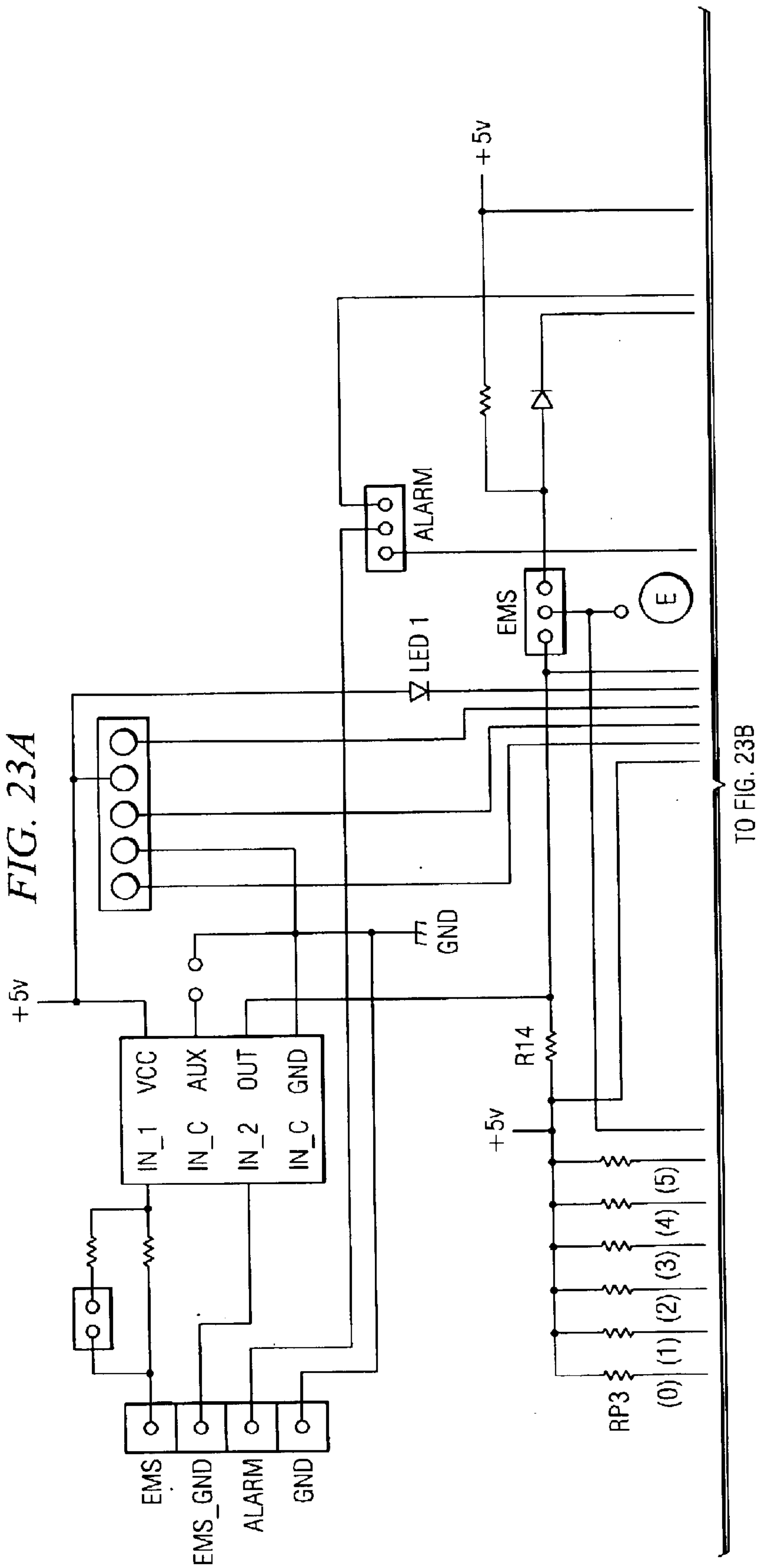
Figure 23B:
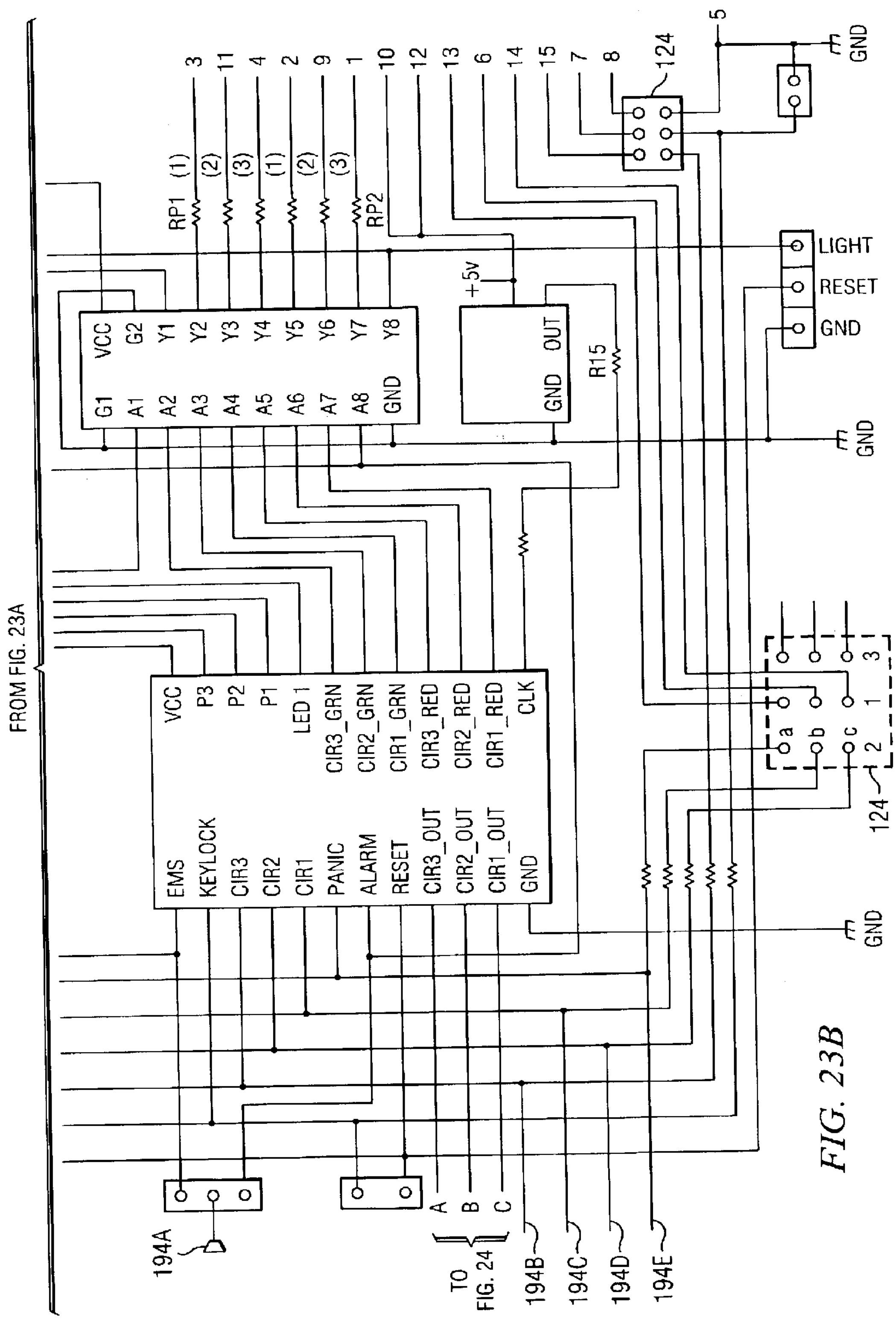
Figure 24:
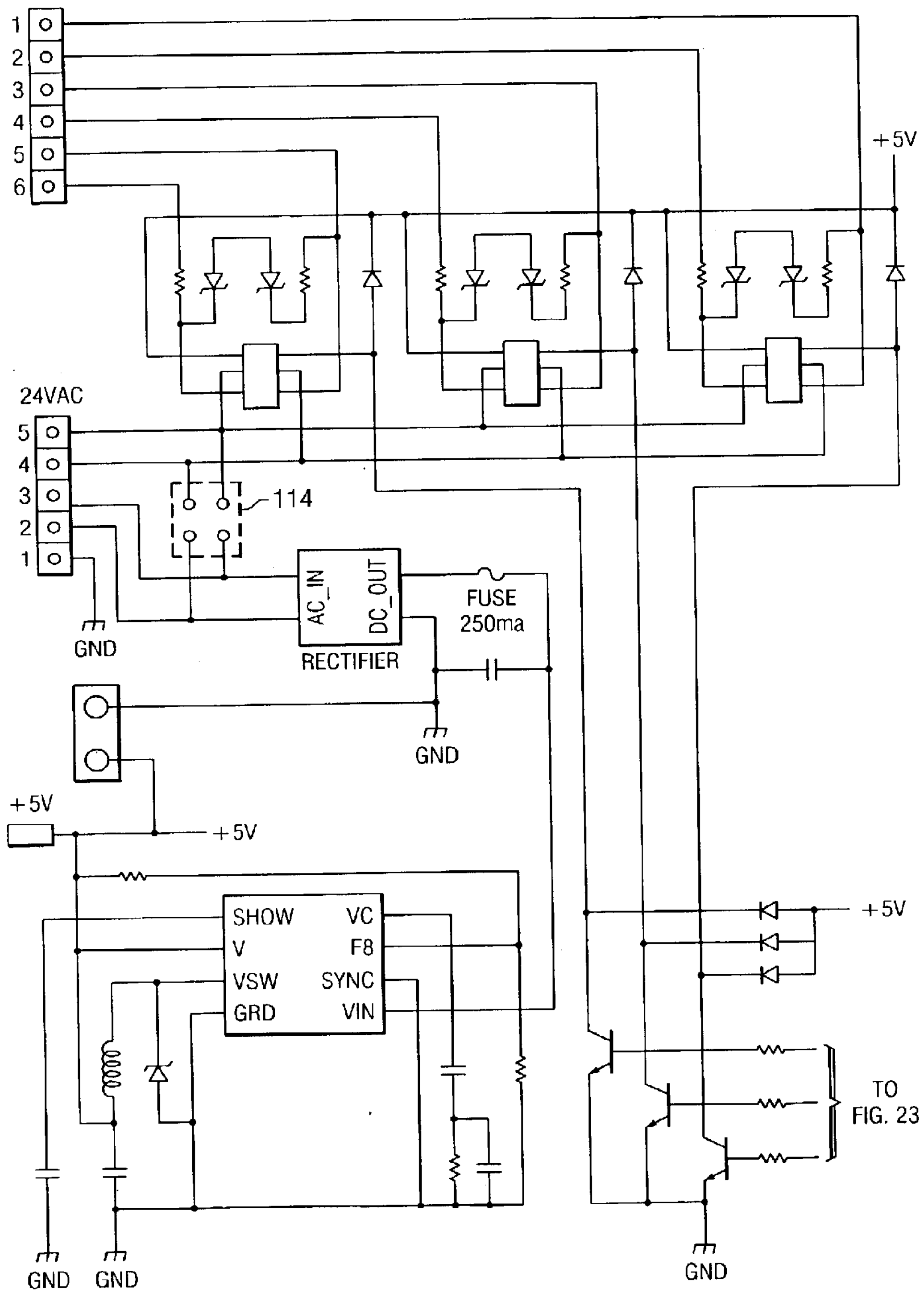

FIG. 23 and FIG. 24 are the wiring schematics for the remainder of the printed circuit board. FIG. 23 represents the logic and input signals to the system while FIG. 24 represents the load and output systems. The areas 114, 124 and 140 on these figures along with interconnections between each schematic are noted.

Figures 1, 25:
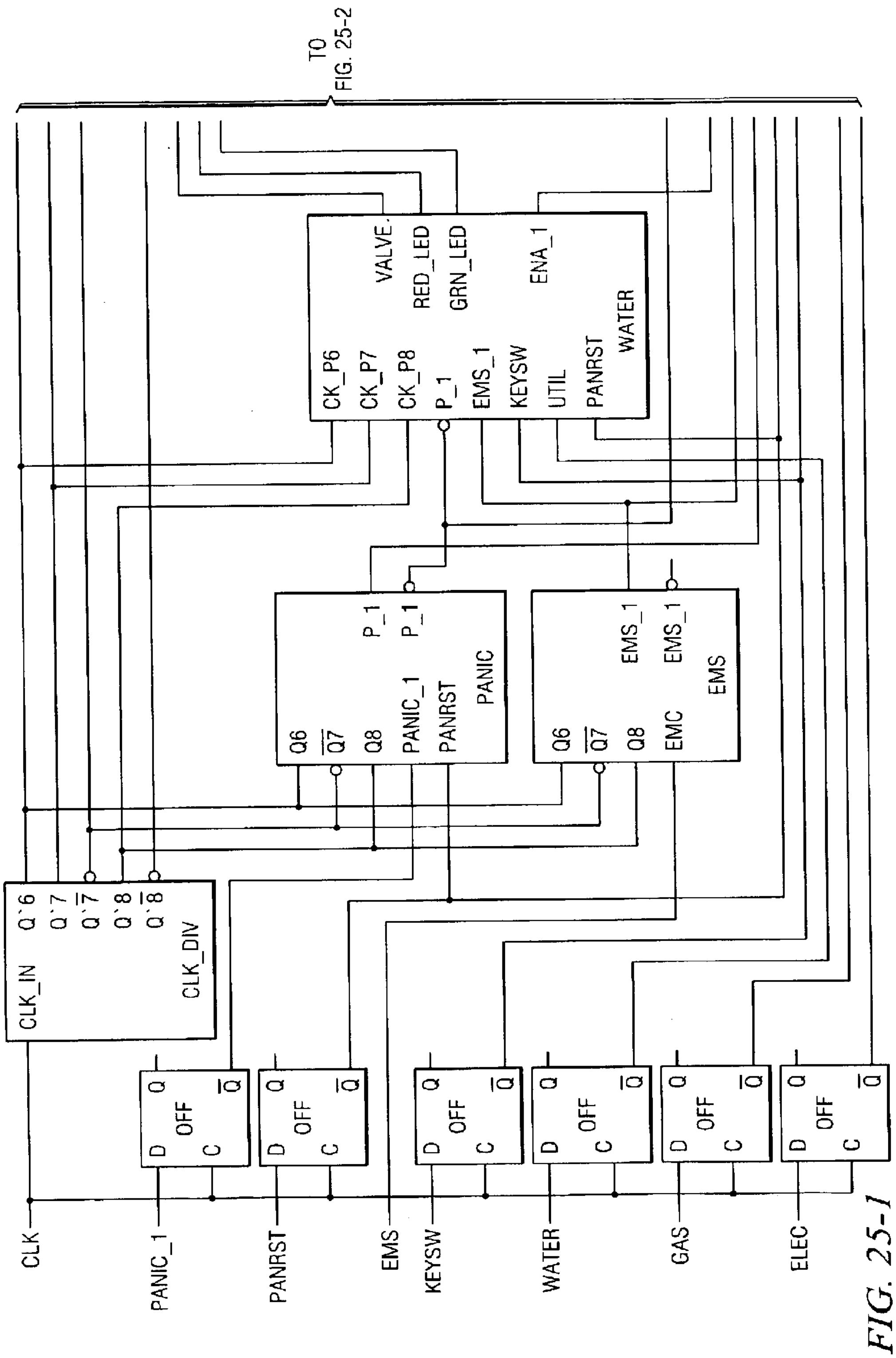
FIGS. 25 through 25D illustrate how discrete logic gates and flip-flop circuits may be used to provide the logic control of this utility controller.
Figures 2, 25:
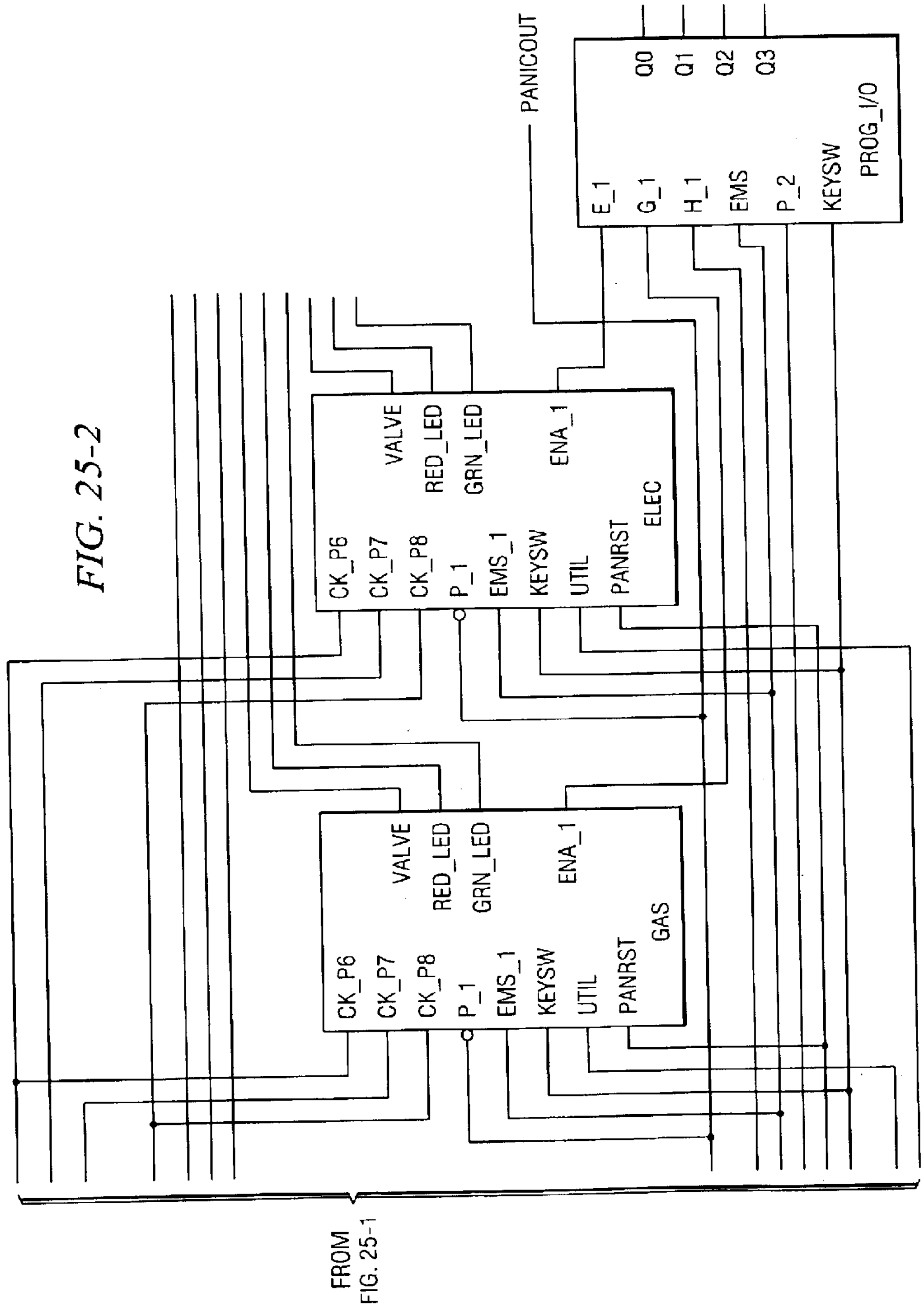
Figure 25A:
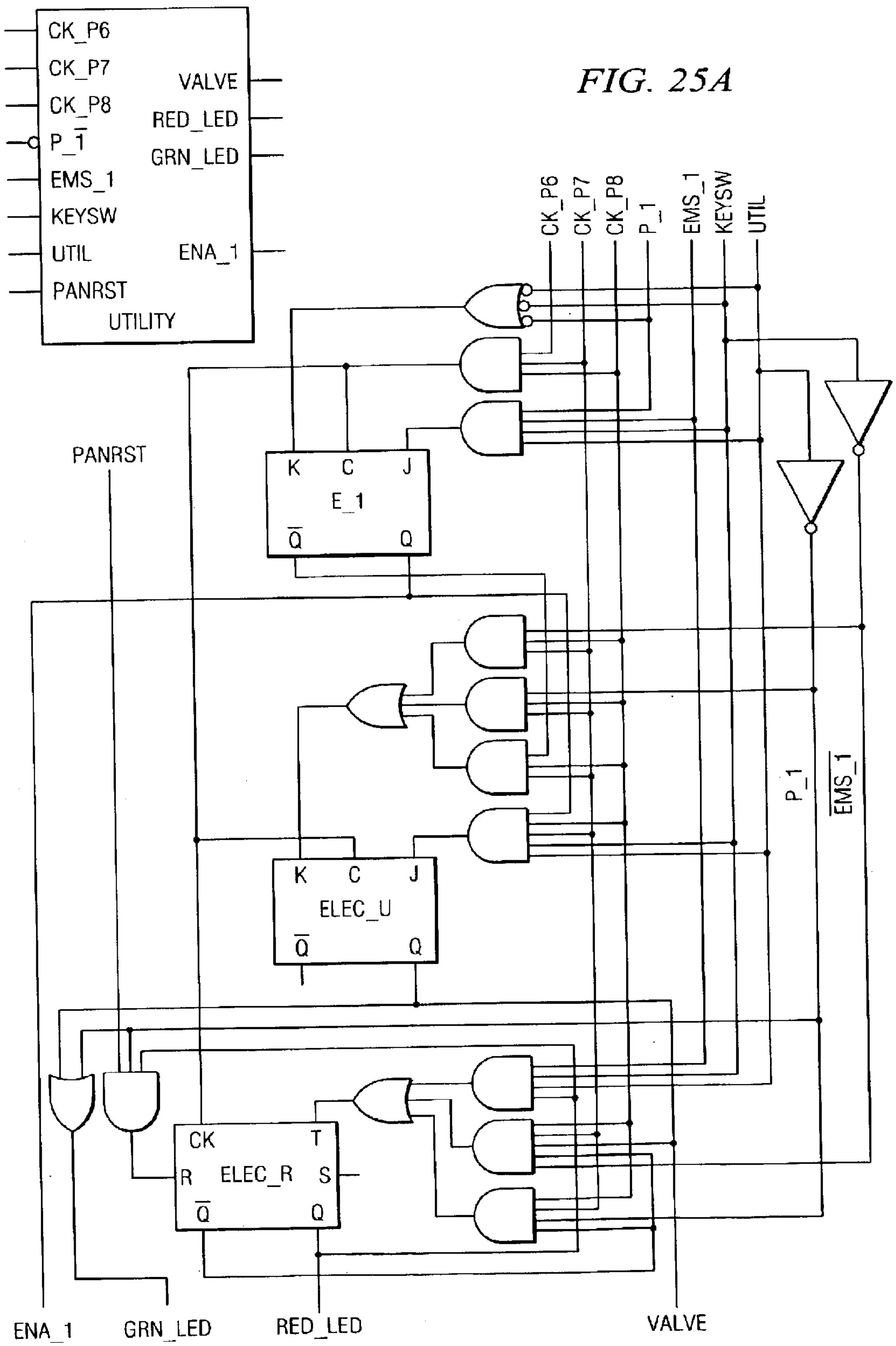
Figure 25B:
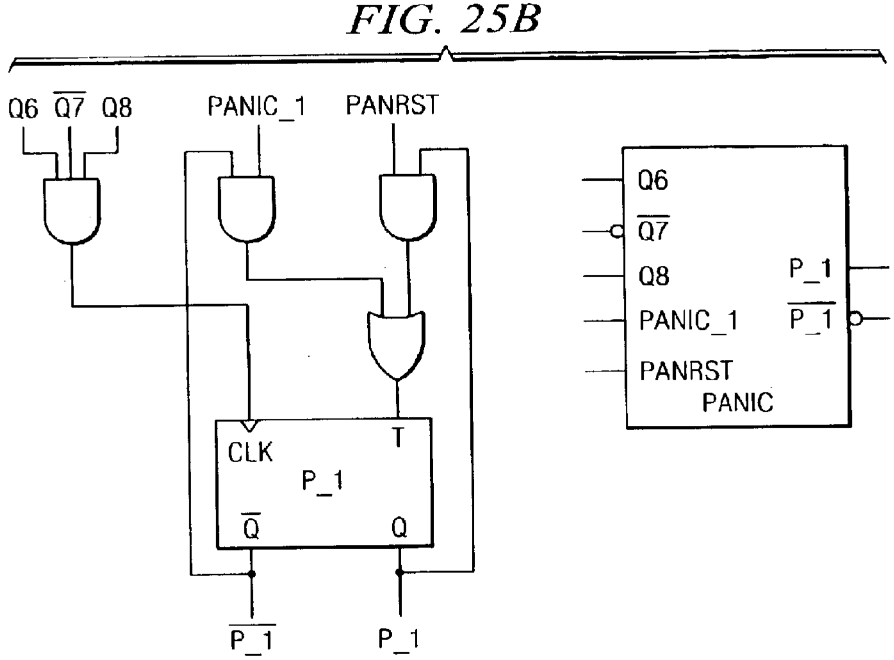
Figure 25C:
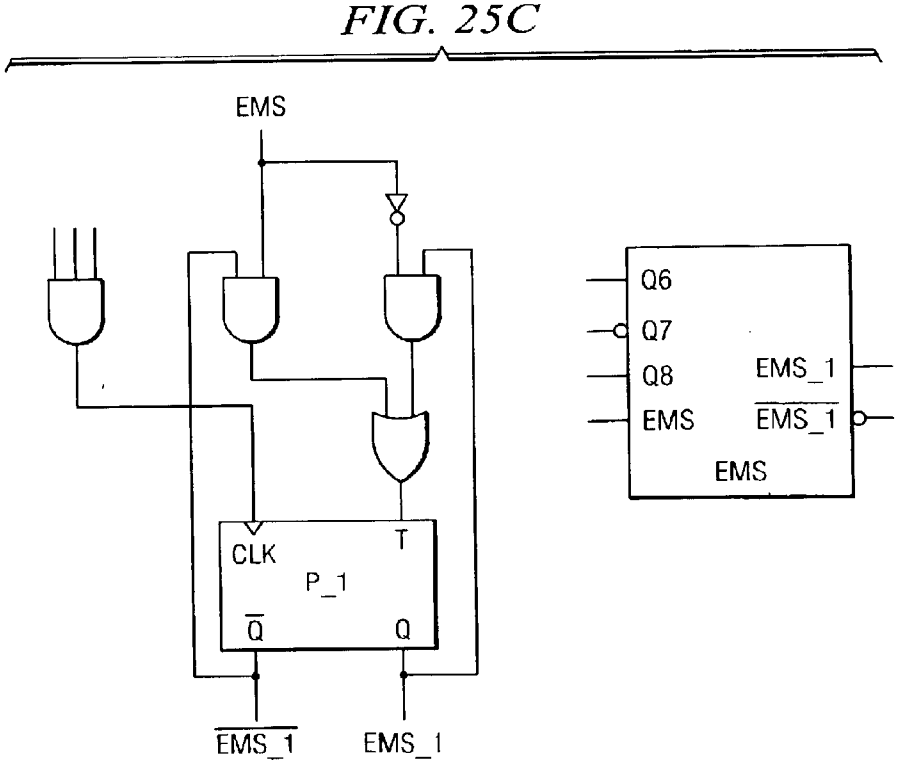
Figure 25D:
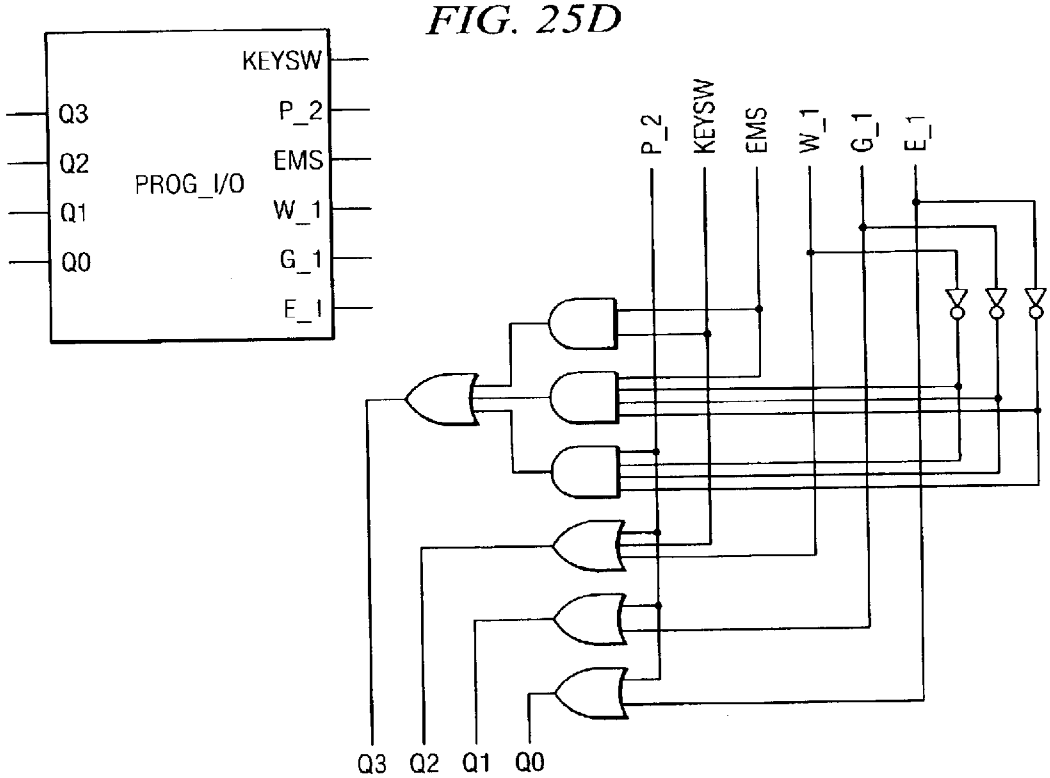

Another method to provide the logic control for the utility controller is by using discrete logic gates and flip-flops. The schematics are shown in hierarchical fashion in FIGS. 25, 25A, 25B, 25C and 25D, whereby smaller logical functions are built into hierarchical blocks that are then drawn as a simple block in a higher level schematic page. The hierarchy of these figures is indicated below:

1. Top level schematic for board
   a. Top level schematic for the logic controller device is FIG. 25. The independent circuits are represented as example only on the schematics as follows: Circuit 1 as ELEC; Circuit 2 as GAS; and Circuit 3 as WATER
2. The "Utility" function (which is replicated three times in the hierarchy)
3. The clock divider circuitry
4. The EMS circuitry
5. The PANIC circuitry
6. The LED output drive circuitry The clock for the utility controller is synchronously divided down to a reduced frequency by the internal clock divider circuitry. Four clock phases are then derived, with each of the three utilities having its own clock phase during which it may change state. This prevents the simultaneous switching of multiple inductive loads. The fourth phase is used to clock the circuitry relating to the "Panic" & "EMS" functions. What this means is that if an EMS condition or a panic condition requires multiple utilities to shut off at the same time, they are actually sequenced in their shutdown by the four phases of the clock. The phases are as shown:

1. Circuit 2 control
2. Circuit 1 control
3. Panic & EMS
4. Circuit 3 control In the example shown in the figure, it is intended to have Circuit 2 control the natural gas utility. Consequently, Circuit 2 was selected to be the first phase for shutdown. The remaining logic is illustrated and shown in the following: FIG. 25A—Utility Logic; FIG. 25B—PANIC; FIG. 25C—EMS, and FIG. 25D—Program Input/Output.

Figure 26:
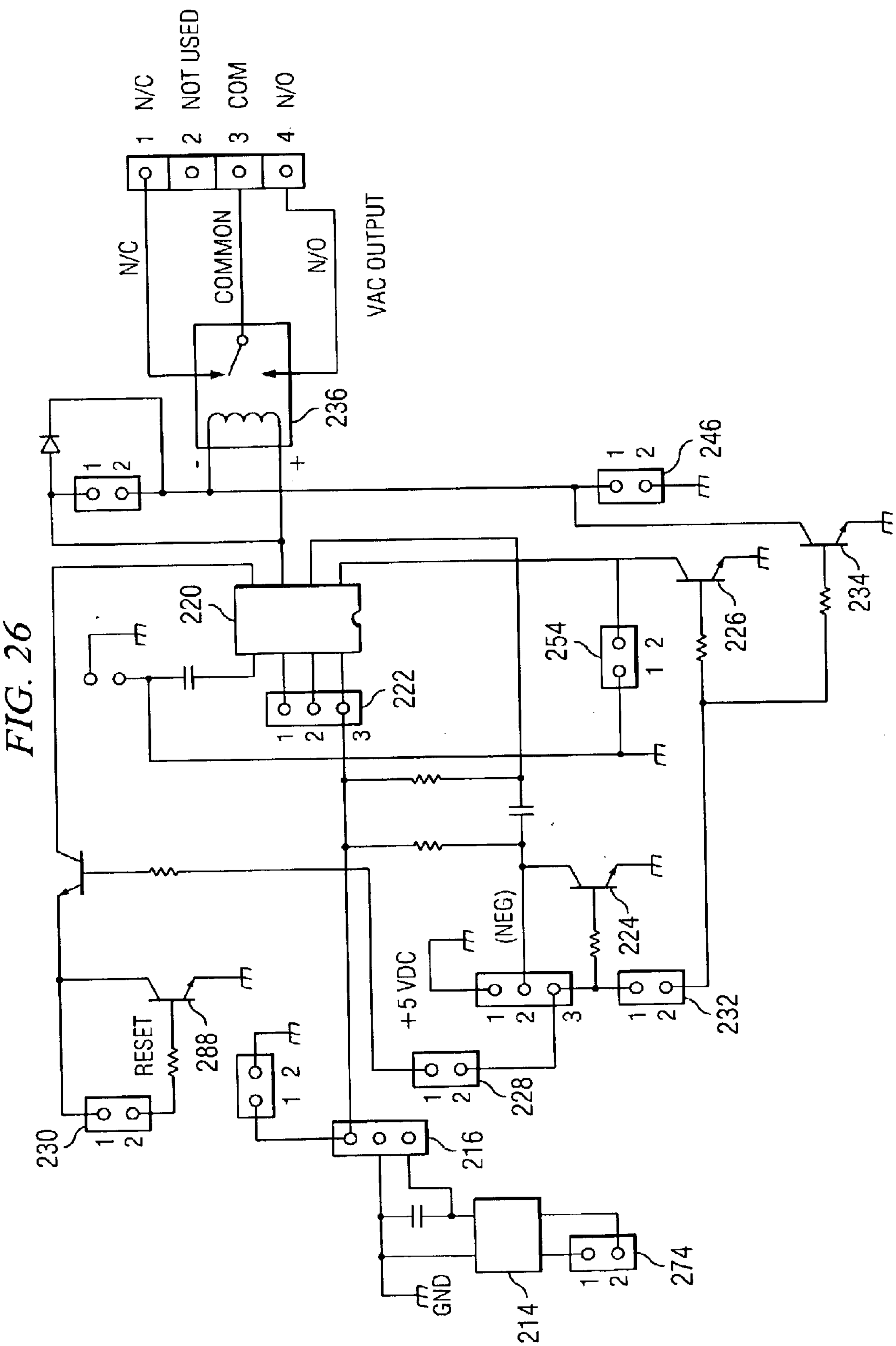
FIG. 26 through FIG. 28B are circuit diagrams illustrating how the placement of various jumpers and connecting wires may be used to program the utility controller to operate according to different requirements.

Referring now to FIG. 26, there is shown a wiring schematic of the pulse relay circuit board. The relay facilitates the use of the auxiliary and remote circuits of the invention as discussed above. The pulse relay can be integrated into the wiring configuration of the utility controller to enable multiple auxiliary and remote circuits which can be controlled by the device. Components for this pulse relay are listed in Table 5. Although not used in a configuration where the pulse provides control of an auxiliary or remote circuit of the utility controller, full-wave bridge rectifier 214 and voltage regulator 216 are available for providing regulated 5 VDC power from a 24 VAC power source.

TABLE 5

Pulse Relay Components

| Reference Designator | Component Type | Function Provided |
|---|---|---|
| 220 | NE 555 | Timer Device |
| 224, 226, 234, 288 | Transistor | NPN Switching Transistor |
| | Transistor | PNP |
| LED 1 | LED | Light emitting diodes with internal current limiting resistors |
| 236 | Relay | 5 VDC SPST |
| 218 | Relay | 5 VDC DPDT |
| 214 | Rectifier | Converts incoming AC voltage to an unfiltered DC voltage |
| 216 | Voltage Regulator | Switch regulates incoming high voltage DC to low voltage DC |
| | Capacitor | Low ESR capacitor providing input bypassing |
| | Resistor | Transistor base current limiting resistor pack |
| | Resistor | Base-Emitter resistor for stability |
| | Resistor | Bias resistor to lower RF supply voltage |
| | Capacitor | Decoupling/filter capacitor |
| | Diode | Flyback diode |
| | Resistor | Energy dissipation |
| | Zener diode | Voltage clamp |

Figure 26A:
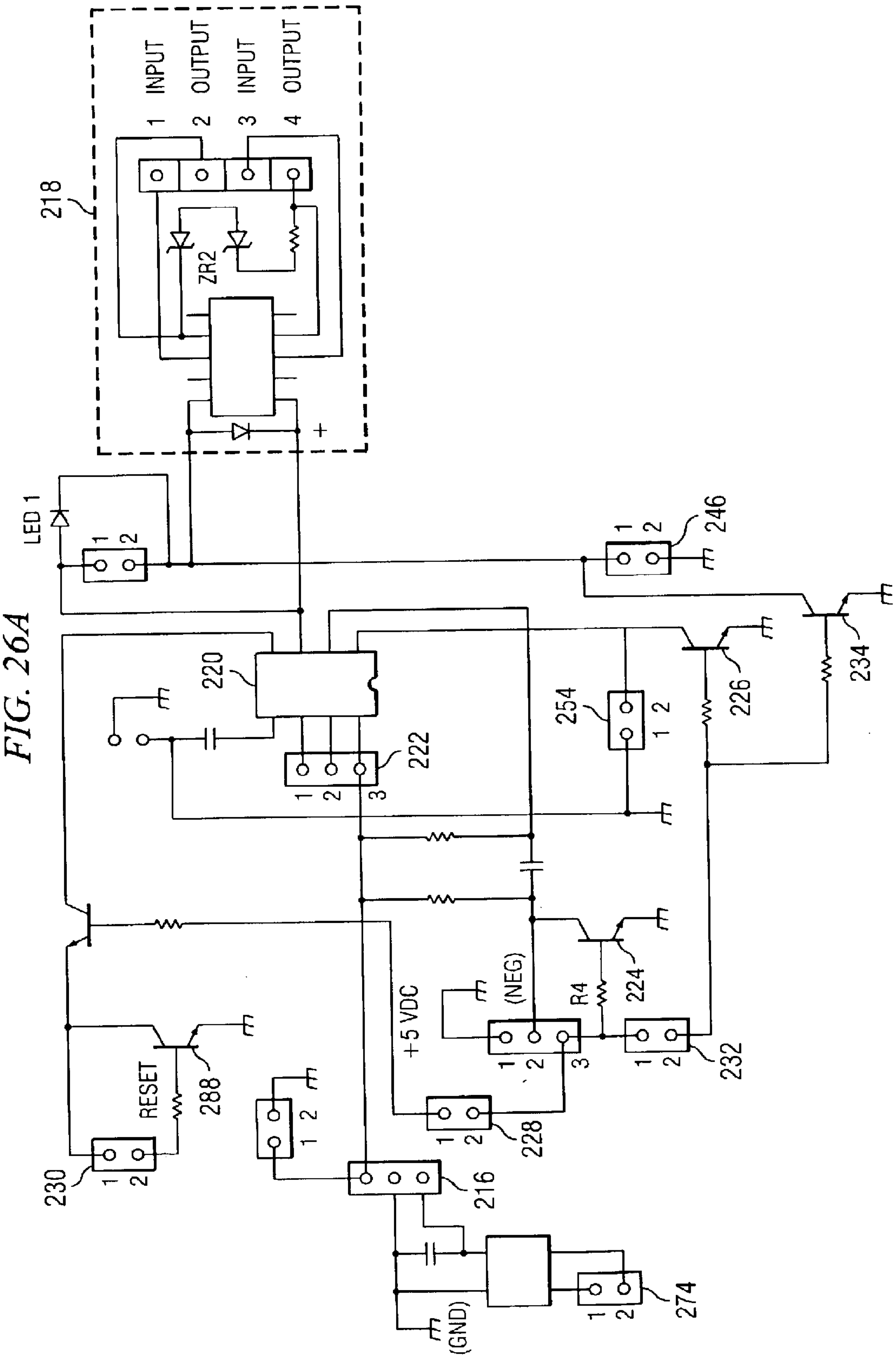

FIG. 26A is similar, except that in this configuration of the pulse relay, snubber circuitry 218 along a double pole relay 219 replaces the relay in FIG. 26. The snubber circuit 218 projects relay 219 from over-voltage due to accumulated energy in the wiring inductance of the circuit when the relay contacts open.

The pulse relay utilizes a timing device 220, such as a common timer. In this configuration, the pulse relay however overlooks the timing function typically associated with this type of timer device. Avoiding the threshold and discharge pins located at jumper terminal 222, the timer functions as a trigger ON—reset OFF device. A control signal triggers the timing device 220, and a reset signal from control wiring resets the timer.

Thus, it is seen that the "pulse relay" operates somewhat similar to a "latching relay". However, unlike a true latching relay that requires current to latch and then unlatch, the pulse relay operates such that either a pulse trigger or a loss of power will unlatch the relay. As mentioned above, a timing device and a normal electrically held relay are combined to accomplish this. A pulse "ON" signal triggers the timing device and provides operating current to the relay. A trip "OFF" signal to the timing device terminates the operating current.

Also, unlike a true latching relay that depends upon a true pulse "OFF" signal to unlatch, withdrawal of current to the timing device will deactivate the relay. This is different than typical applications of a latching relay wherein the loss of control or operating power while the relay is latched (and even if regained) results in the relay remaining latched until a control "OFF" signal is received by the relay.

This feature not only enables a positive shut-off with loss of any control power, but also permits the manipulation of the wiring configuration as described above for several types of switching configurations.

A primary configuration of the pulse relay of FIGS. 26 or 26A permits the output circuit to operate an exhaust fan. As can be seen in these figures, NPN transistors 224 and 226 along with jumper terminals 228 and 230 permit either +5 VDC or ground to either trigger or reset the timing device. Placing a jumper across the pins at jumper terminal 232 along with a +5 VDC signal from a panic button arriving at jumper terminal 228 will drive transistors 224, 226 and 234 to ground, enabling the pulse relay when in any present state to engage, thus activating a purge sequence for the fan. Relay 236 provides load control for the output circuit.

Figure 27A:
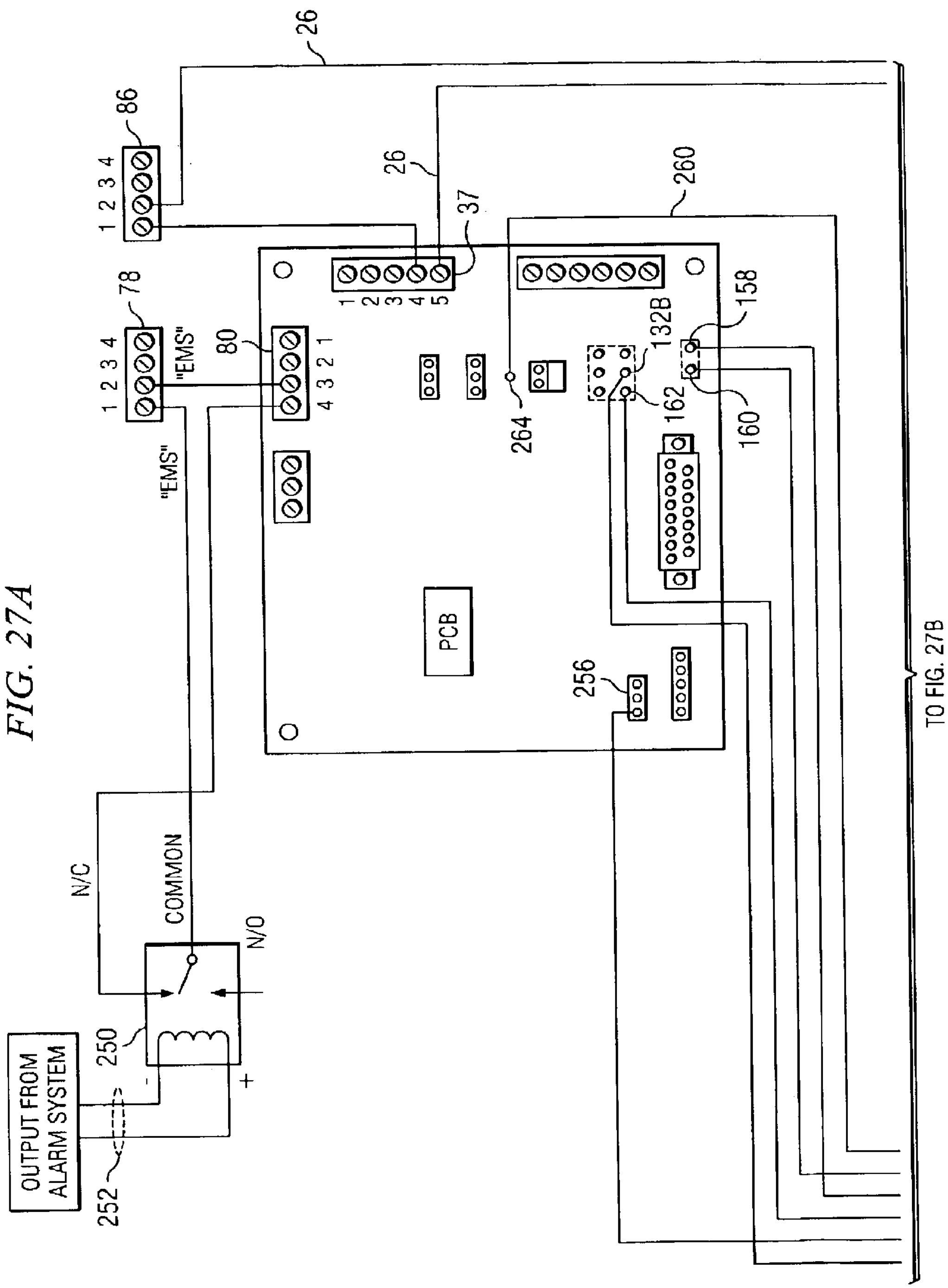
Figure 27B:
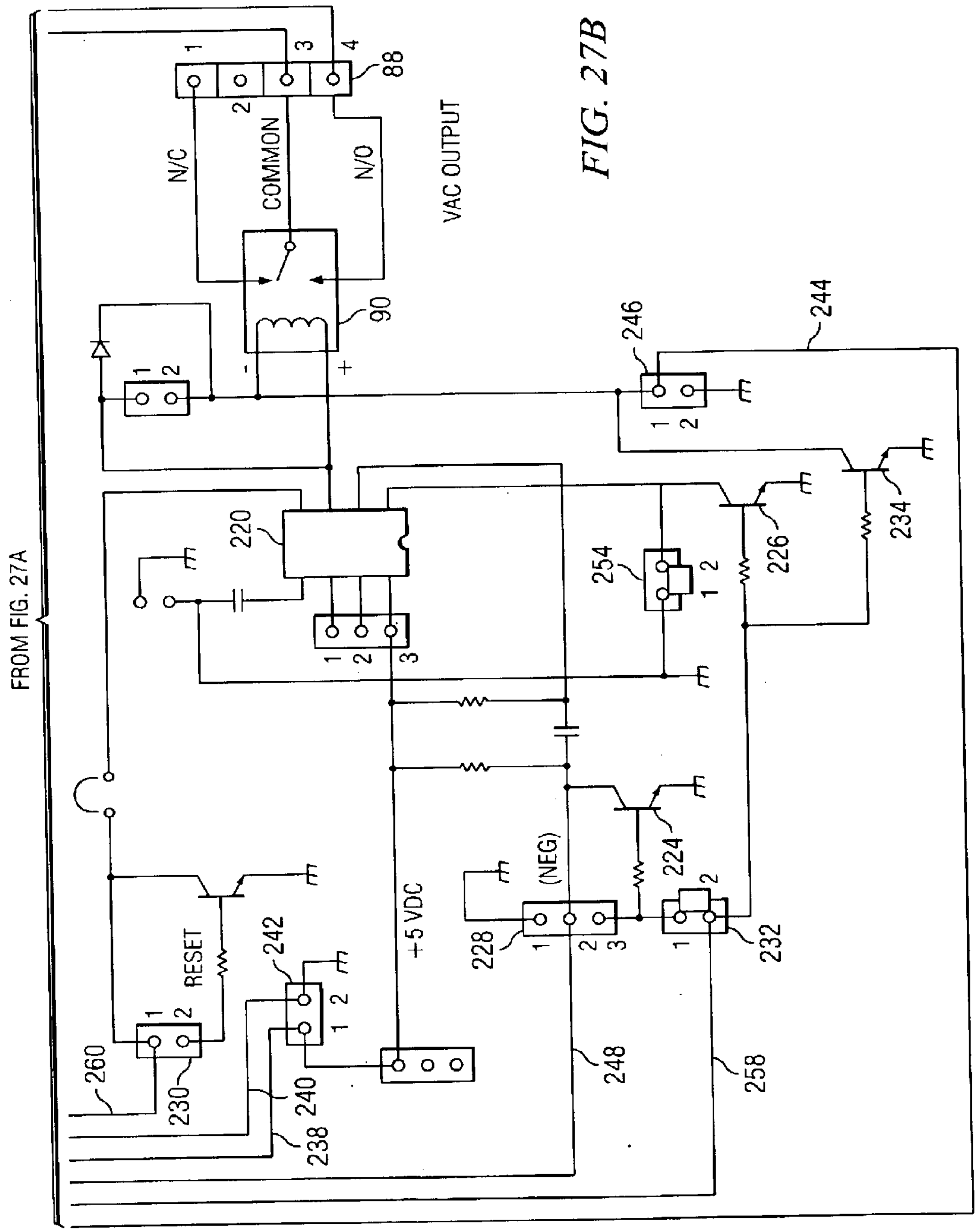

Referring to FIG. 27, a description of such a primary configuration of the pulse relay follows. Components of the pulse relay not required for this configuration are not shown. A +5 VDC and ground are provided at terminals 158 and 160 as shown in FIG. 27 and is provided through wires 238,and 240 to pins at junction terminal 242. A signal from a control switch for an output circuit is provided at terminal 132B and is routed through wire 244 to a pin of jumper terminal 246. A signal for the key switch circuit originates at connection 162 and is routed through wire 248 to a pin of jumper terminal 228. The path of the input "EMS" signals through the normal closed pins of auxiliary relay 250 and the connection of integrated output wiring 252 from an alarm system is shown in FIG. 27. An alarm disrupt signal generated from that system would open contacts at the relay thus interrupting the "EMS" signal which in turn interrupts the system operation. As illustrated, "EMS" wiring passes from integrated systems terminal 78 also shown in FIG. 19, through these closed contacts of relay 250 then to integrated systems connector 80.

Also as shown, low voltage wiring 26 originating at controller power terminal 37 is routed through common terminal at pulse relay 90, output terminal 88, and then through the output of relay 90 to terminal block 88 and finally to termination at a pin of auxiliary output terminal 86. As shown on the drawing, a jumper is placed across jumper terminal 254 to provide a constant ground to timer 220. Thus, upon receiving a first key signal, timer 220 triggers "ON". Therefore, after the first key "ON" signal, the pulse relay can be made active or inactive by opening or closing of an auxiliary switch routed from terminal 132B to jumper terminal 246. A +5 VDC panic signal arriving at jumper terminal 256 and routed through wires 258 to jumper terminal 232 will switch transistors 224, 226 and 234. Transistor switch 226 has no impact on the device since ground is constant to timer 220. However, switching that occurs at transistor 224 and 234 respectively will 1) activate timer 220 in cases where first keying has not occurred; and 2) energize relay 90 in the event that the controlling auxiliary switch is "OFF".

A −5 VDC or ground "EMS" signal arriving at terminal 164 and routed through wire 260 to jumper terminal 230 will reset timer 200 by providing a ground signal. Thus, at the end of an "EMS" cycle, the circuit controlled by the pulse relay will become inactive.

The basic operating sequence of this configuration where the circuit is an exhaust fan is 1) the fan will only become enabled after a first key switch signal. Thereafter the circuit opens and closes by a switch; 2) the fan will always be enabled upon any panic occurring during occupied periods; 3) the fan will always be disabled at the end of occupied periods; and 4) the fan along with all other output circuits will be disabled upon receiving an input from an integrated alarm system.

Other configuration examples of the pulse relay for use as control circuitry for auxiliary and remote circuits are possible and discussed as follows:

Connecting wire 244 to jumper terminal 254 and moving the jumper to jumper terminal 246 forces keying each time the circuit is enabled by the switch.

Omitting wire 248 and connecting wire 244 to jumper terminals 228 and 254 and providing a jumper at jumper terminal 246 allows switching to always be set to "ON".

Omitting wire 244 and connecting wire 248 to jumper terminal 228 and providing a jumper at jumper terminals 246 and 254 results in an "ON" condition at first keying for remote circuits where switching of circuit is performed external of the controller.

Removing wire 258 prevents an alarm from activating the circuit

Remaining wire 260 prevents the loss of an "EMS" signal from deactivating the circuit.

Figure 28:
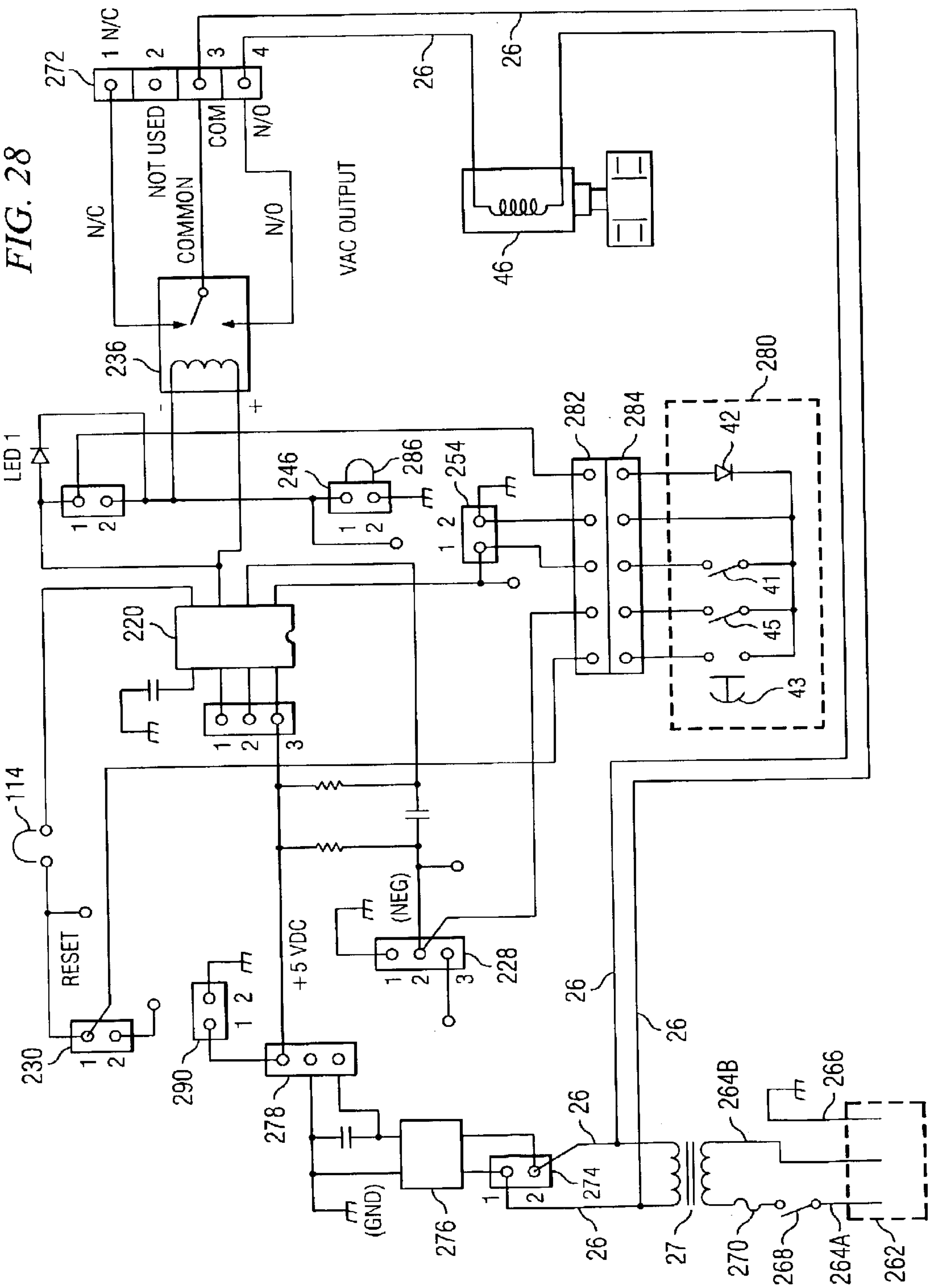

Now turning to FIG. 28, there is illustrated another use of the pulse relay. This illustration demonstrates how the pulse relay may serve as a limited application version of the utility controller in cases where only a single utility or device is required to have limiting control over its use. In this application, the device is housed in an independent enclosure, described further in FIG. 29.

As shown in the wiring schematic, a junction box 262 is included and illustrates the location for in-the-field line wire connections to line wiring leads 264A and 264B. Grounding wire 266 is illustrated as originating within the junction box 262 and terminating at the surface of the enclosure. Main switch 268 breaks the circuit for the load side and a fuse 270 provides circuit overload protection. This wiring terminates at low voltage transformer 27. Low voltage wiring 26 is routed from transformer 27 to both the operating circuitry of the pulse relay as well as the load circuitry at connector 272 and to the controlled device, such as for example, solenoid valve 46.

Connection to the circuit board is through jumper terminal 274, and bridge rectifier 276 and voltage regulator 278 provide the 5 VDC power supply for the circuitry. Switching of circuits is performed at limited application wall panel 280 and is typically a flush mounting metal panel.

A ground is provided at one pin on jumper terminal 254, routed along with other wiring for the panel to service panel socket 282, that connects to service panel plug 284. This socket and plug are of conventional mating pin and socket design with sufficient connection for operation of the unit. At the panel, the ground is routed from jumper terminal 254 through key switch 45 in jumper terminal 228. Switching of the circuit is achieved at control switch 41 to another pin on jumper terminal 254. Panic reset "OFF" occurs by routing ground from panic button 43 to jumper terminal 230. Jumper wire 286 at jumper terminal 246 routes ground continually to relay 236. Indicator 42 also located on the panel illuminates when the circuit is active. This configuration requires operating the key switch each time the output circuit is enabled.

The system may also be configured to function entirely as a stand-alone device, or as an output companion to a utility controller as a remote output circuit. An example of this would be a classroom where the primary circuit controllers are for the water, electric, and natural gas at student work stations but not at the instructor's desk, and the remote circuit would control only the instructor's demonstration desk. In such an instance, the low voltage wiring at jumper terminal 274 would originate at the auxiliary output terminal within the mating utility controller rather than from transformer 27.

Additionally, by having a second series of contact points at the panic button and providing additional wiring from the utility controller to the unit will enable a second panic button to act as a remote panic button for a utility controller by making a connection at connector 110 on a second PCB.

Further enhancements of this limited application controller will enable automatic shut-down of the circuits at the end of the daily occupied period. For example, as shown in FIG. 28A, by routing a +5 VDC signal from the circuit board through the normal closed pins of auxiliary relay 250 and then back to jumper terminal 230, withdrawal of an "EMS" signal would result in the contact opening, thus switching transistor 288 and connecting ground to the reset terminal on timer device 220. In this example, it would be necessary to incorporate the circuitry for transistor 288 that was omitted in FIG. 28.

Figure 28B:
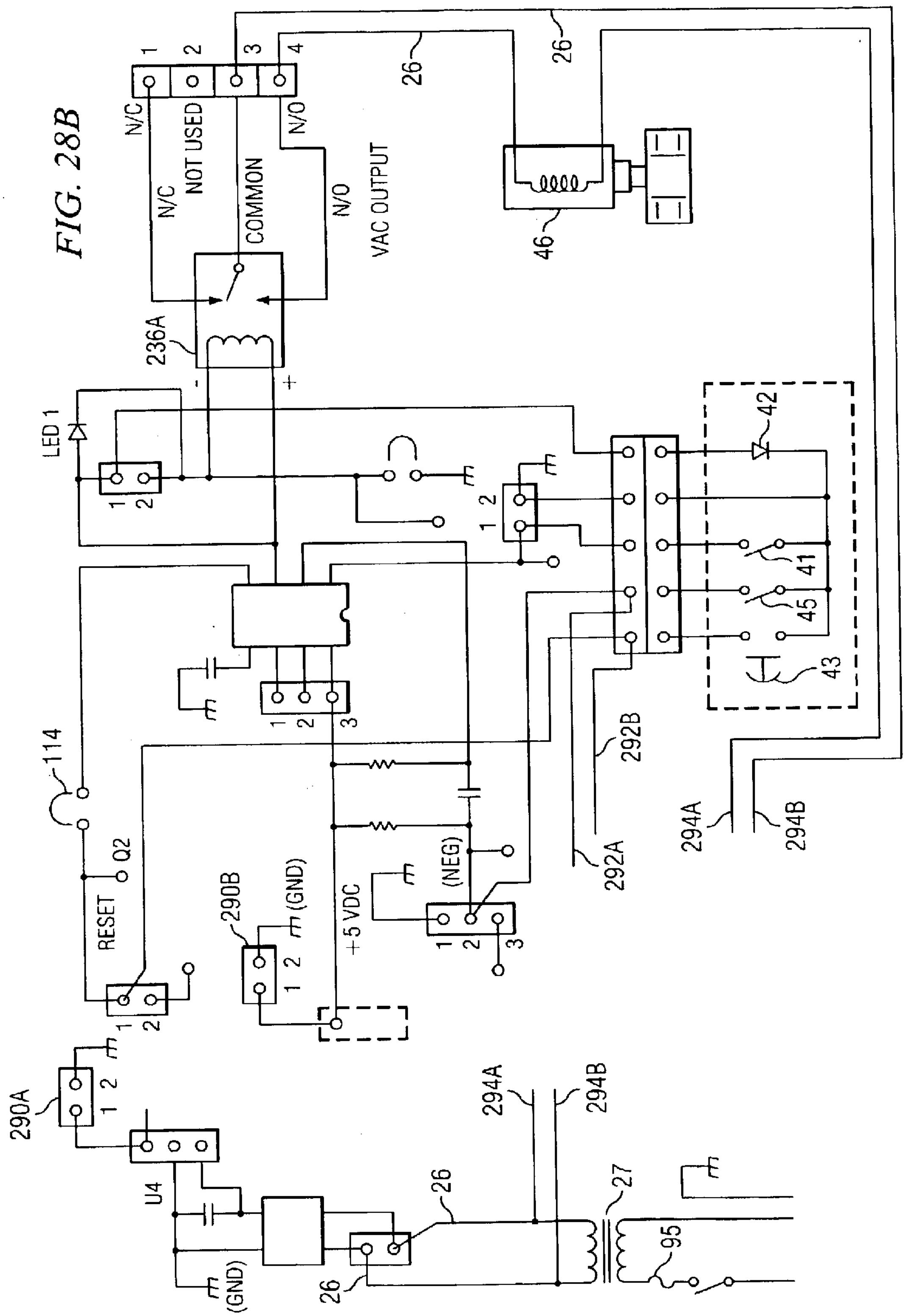

Additionally, a second circuit can also be added in the system. As illustrated in FIG. 28B, a second pulse relay 236A is connected in parallel to the first. Operating power for the second board is also provided from jumper terminal 290A on the first board. Low voltage wiring interconnects both boards at jumper terminals 290 and 290A. The voltage regulator circuit (278 on FIG. 28) and the bridge rectifier circuit (276 on FIG. 28) with other corresponding circuitry and jumper terminal 274 can be omitted from board two. Wires 292A and 292B illustrate parallel circuitry from both boards for the panic button and the key switch. Wires 294A and 294B represent the interconnection of low voltage control wiring from the transformer to the output circuitry of board two.

As shown in FIG. 29, the enclosure and service panel components of this limited operation embodiment of the device is illustrated. This limited application enclosure 296 is of conventional design, made from formed sheet metal. Junction box 298 houses the line voltage wiring connections. Main switch 268 and a fuse holder for fuse 270 are shown along the side of this junction box. Wiring is shown extending from the box 298 to transformer 27. Other wiring discussed with respect to FIG. 28 is not shown here for the purpose of clarity.

Pulse relay 90A is mounted to the inner surface of the enclosure by conventional means. Service panel socket 300 rests in a socket support that is affixed to the enclosure 296 along with a mounting bracket 302. The enclosure 296 can thus be field secured to wall studs or other structures by affixing the bracket 302 to the stud with sheet metal screws or other common attachment devices. Knock-outs 304 permit operating power wiring, control wiring and output circuit control wiring to enter and exit the enclosure.

Additionally, as illustrated, front panel 306 houses the switches for this unit. As demonstrated, control switch 41B, key switch 45B, panic button assembly 43B, and indicator 42B are mounted to the surface of the panel. The wiring for these switches is harnessed into service panel plug 308.

Another embodiment of the invention permits much more ease in retrofits of the device, and would typically be used where a facility desired to upgrade the control of the utilities.

Figure 30:
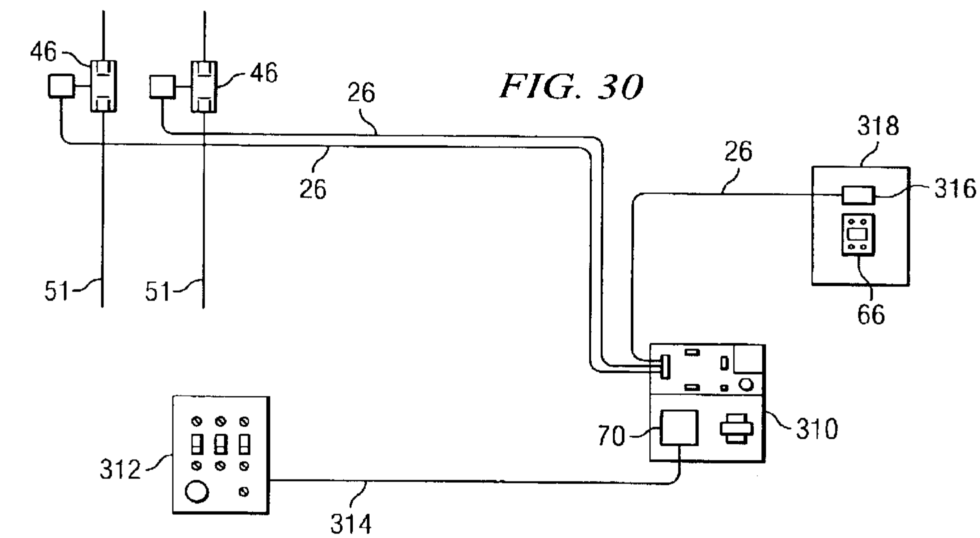
FIGS. 30 and 30A illustrate arrangement of the system of this invention wherein the utility enclosure is located remotely from wall panel control switches.

FIG. 30 illustrates the system application for the Remote Application of the invention. As shown, utility uontroller enclosure 310 is located remotely from wall panel 312. Control wiring 314 extends from the wall box to PCB 70 located within the enclosure. From this point, output low voltage wiring 26 extends to each controlled device. In this illustration, solenoids 46 at service piping 51 and interface relay 316 at secondary enclosure 318. This enclosure is of suitable size and of common design to permit installation of this interface relay along with remote relay 66.

This interface relay is of common electrical double throw (N/O-N/C) design so that control wiring can latch and de-latch the remote relay. In this illustrated application, a common mechanically held electrical contactor is utilized to provide circuit control to the electrical outlets at the station or area serviced by the Remote Application Controller. This interface is energized with current through its N/O contacts to the latching coil on the contactor. Likewise, when the control signal is withdrawn by the controller, N/C contacts provide current to the de-latching coil.

Figure 30A:
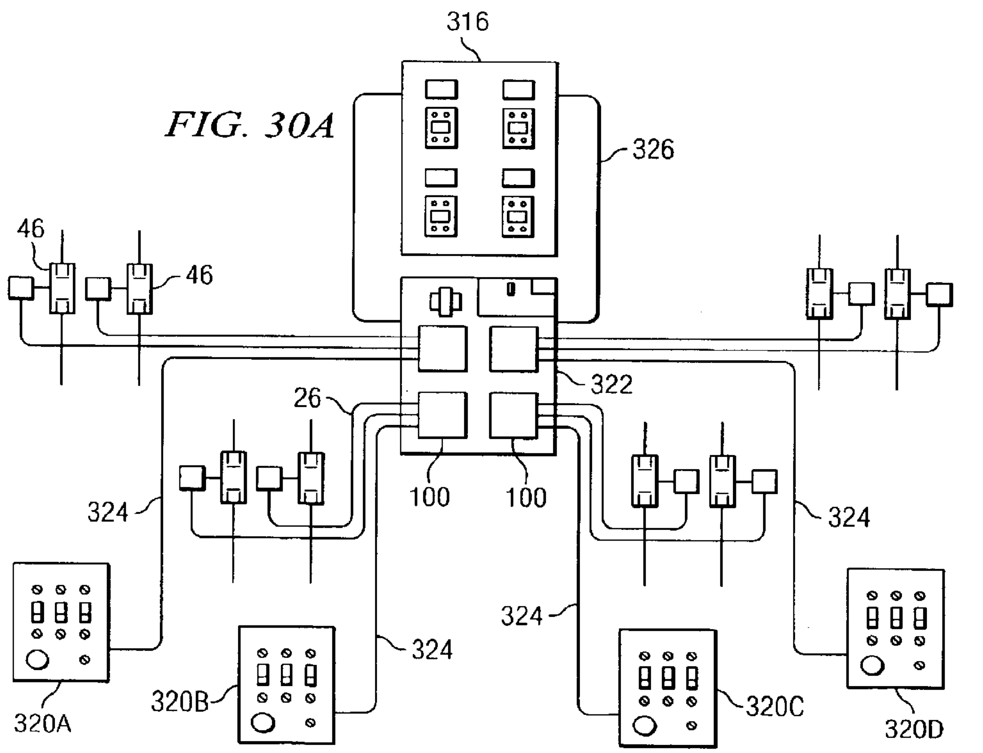

FIG. 30A demonstrates another advantage of the Remote Application Controller. In this example, four independent wall panels 320A, 320B, 320C and 320D, located in four independent classrooms are used to control the services within each. A common Multi-Station Controller 322 is located remotely from all of the wall panels. Control wiring 324 extends from each panel to the controller. Likewise, low voltage wiring 26 provides control wiring to each controlled device or service. In this instance, the four remote relays 66 along with interface relays 316 are housed in a common secondary enclosure 326.

Although the main focus of discussion of the various uses of the invention have been in the realm of science classrooms and such, the service panel and utility controller have usage in many varied applications. For instance, as discussed above, the utility controller can be remotely mounted from the service panel, then it has the capabilities of service in a stand-alone application. In retrofitting or renovating existing facilities where there already exists the controlling solenoids and/or electrical relays, the utility controller replaces existing switching while leaving in place the solenoids and relays.

In other instances where electrically powered equipment such as saws, grinders, pumps and presses are utilized (e.g. within a school shop classroom), the utility controller can provide the same level of secured activation as that provided in the science classroom. This is accomplished by activating remote electrical relays in lieu of solenoids. Though relays have been shown thus far as 24 VAC or 110 VAC, the electronic controller can be suited for a DC signal to be sent as well.

In instances where water or other liquids are required to be regulated and controlled with convenience as the priority rather than security, then the utility controller can provide this regulation and control. Such instances would be public shower facilities.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A utility control system comprising:

an enclosure having a limited access interior region;

at least one utility actuator for switching between an "ON" state and an "OFF" state to control the availability of a utility;

at least one readily accessible utility switch having an "ON" position and an "OFF" position for providing ON and OFF request signals respectively to control circuitry;

a limited access switch for providing a temporary activate signal to said control circuitry;

the control circuitry mounted on a printed circuit board within said interior region for providing an "ON" control signal to said at least one utility actuator to switch said at least one utility actuator to said "ON" state, said "ON" control signal being provided only when both said "ON" request signal and said temporary active signals are present, said control circuitry further including a multiplicity of terminals, selected ones of said multiplicity of terminals adapted to be connected to other selected ones of said multiplicity of terminals for selectively programming the operation of said utility controller;

a readily accessible emergency shut-off control for providing a shut-down signal to said control circuitry, and said control circuitry further adapted to provide an "OFF" control signal to said at least one utility actuator to switch said at least one utility actuator to an OFF state, said shut-down signal continually disabling said utility actuator until said utility control system is reset; and a reset switch mounted inside said limited access interior region for resetting said utility control system.

2. The utility control system of claim 1 wherein said enclosure includes a cover and further comprises a locking apparatus cooperating with said cover for limiting access to said interior region.

3. The utility control system of claim 2 wherein said locking apparatus is a key actuated lock for securing said cover to said enclosure.

4. The utility control system of claim 1 wherein said at least one actuator controls one of gas, air, oxygen, hydrogen, electrical, and water utilities.

5. The utility control system of claim 1 wherein said at least one actuator comprises at least three actuators, one each of said three actuators controlling one of gas, electricity and water utilities.

6. The utility control system of claim 1 wherein switching said utility switch to an OFF condition disables said utility switch until again enabled by a temporary activate signal from said limited access switch.

7. The utility control system of claim 1 further comprising at least one indicator showing the state of said at least one actuator.

8. The utility control system of claim 1 wherein said limited access switch is a key switch mounted on said enclosure.

9. The utility control system of claim 1 wherein at least one of said utility actuators is remote from said utility control system.

10. The utility control system of claim 1 wherein said control circuitry provides a control signal to place said actuator in the OFF condition in response to an EMS (Energy Management System) signal.

11. The utility control system of claim 1 wherein said control circuitry comprises a state controller such that said control circuitry remains in a selected state until the state of the control circuitry is changed by an input signal.

12. The utility control system of claim 1 wherein said control circuitry maintains said at least one utility actuator in the OFF state after said control system is reset following an emergency shutdown such that said at least one utility actuator can only be set to the ON state when said temporary activate signal and said ON request signal are again present at the control circuitry at the same time.

13. The utility control system of claim 1 further comprising a remote transmitter for providing RF signals for generating ON and OFF request signals and wherein said control circuitry further comprises circuitry for receiving said RF signals.

14. The utility control system of claim 13 wherein said remote transmitter further provides an RF signal for generating said enabling signal.

15. The utility control system of claim 14 wherein said remote transmitter further provides an RF signal for generating said shut-down signal.

16. The utility control system of claim 15 wherein said remote transmitter comprises a plurality of switches for providing selected RF signals.

17. The utility control system of claim 13 wherein said remote transmitter further provides an RF sign for generating said shut-down signal.

18. The utility control system of claim 13 wherein said remote transmitter comprises a plurality of switches for providing selected RF signals.

19. A utility control system comprising:

an enclosure having a limited access interior region;

a first and second set of utility actuators, each actuator of said first set for switching between an "ON" state and an "OFF" state to control the availability of a selected utility, and each actuator of said second set for switching between an "ON" state and an "OFF" state to control the availability of another selected utility;

at least one readily accessible utility switch for providing at least one first ON request signal and at least one first OFF request signal to a first control circuitry;

at least another readily accessible utility switch for providing at least one second ON request signal and at least one second "OFF" request signal to a second control circuitry;

a limited access switch for providing a temporary activate signal to said first and second control circuits;

first control circuitry mounted within said interior region for providing at least one first "ON" control signal to at least one actuator of said first set of utility actuators to switch said at least one actuator to said "ON" state, said first "ON" control signal being provided only when both said "ON" request signal and said temporary activate signal are present at the same time;

second control circuitry mounted within said interior region for providing said at least one second "ON" control signal to at least one actuator of said second set of utility actuators to switch said actuator of said second set to said "ON" state, said second "ON" control signal being provided only when both said "ON" request signal and said temporary activate signal are present at the same time, said second control circuitry further coupled to said first control circuitry;

a readily accessible emergency shut-off control for providing a shut-down signal to said first and second control circuits, said control circuits adapted to provide "OFF" control signals to said first and second set of actuators to switch said utility actuators to an "OFF" state, said shut-down signal continually disabling said utility actuators until said utility control system is reset in response to a reset signal; and a reset switch mounted in said limited access interior region to provide said reset signal.

20. The utility control system of claim 19 wherein said enclosure has a cover, and further including a locking apparatus cooperating with said cover for limiting access to said interior region.

21. The utility control system of claim 20 wherein said locking apparatus is a key actuated lock for securing said cover to said enclosure.

22. The utility control system of claim 19 wherein switching said utility switch to an off condition disables said utility switch until again enabled by a temporary activate signal from said limited access switch.

23. The utility control system of claim 19 further comprising at least one indicator showing the state of said at least one actuator.

24. The utility control system of claim 19 wherein said limited access switch is a key switch.

25. The utility control system of claim 19 wherein at least one of said utility actuators is remote from said utility control system.

26. The utility control system of claim 19 wherein at least one of said first and second control circuitry further comprises a "state" controller such that said control circuitry remains in a selected state until the state of the controller is changed by an input signal.

27. The utility control system of claim 19 wherein said first and second control circuitry maintain actuators in said OFF state after said control system is reset following an emergency shutdown such that said utility actuators can only be set to the ON state when said temporary activate signal and said ON request signals are again present at the same time at said first and second control circuits.

* * * * *

UNITED STATES PATENT AND TRADEMARK OFFICE

CERTIFICATE OF CORRECTION

PATENT NO. : 6,757,589 B1 Page 1 of 1
DATED : June 29, 2004
INVENTOR(S) : Parker et al.

It is certified that error appears in the above-identified patent and that said Letters Patent is hereby corrected as shown below:

Column 29,
Line 37, delete "sign" and insert -- signal --.

Column 30,
Line 19, insert -- further -- between "circuits" and "adapted".

Signed and Sealed this

Fifth Day of October, 2004

JON W. DUDAS
*Director of the United States Patent and Trademark Office*